United States Patent
Bjontegard

(10) Patent No.: US 9,338,622 B2
(45) Date of Patent: May 10, 2016

(54) CONTEXTUALLY INTELLIGENT COMMUNICATION SYSTEMS AND PROCESSES

(71) Applicant: Bernt Erik Bjontegard, San Diego, CA (US)

(72) Inventor: Bernt Erik Bjontegard, San Diego, CA (US)

(*) Notice: Subject to any disclaimer, the term of this patent is extended or adjusted under 35 U.S.C. 154(b) by 38 days.

(21) Appl. No.: 14/040,677

(22) Filed: Sep. 28, 2013

(65) Prior Publication Data

US 2014/0171039 A1    Jun. 19, 2014

Related U.S. Application Data

(60) Provisional application No. 61/709,710, filed on Oct. 4, 2012, provisional application No. 61/882,593, filed on Sep. 25, 2013.

(51) Int. Cl.

| | |
|---|---|
| H04L 29/06 | (2006.01) |
| H04W 4/18 | (2009.01) |
| H04L 29/08 | (2006.01) |
| A63F 13/65 | (2014.01) |
| A63F 13/216 | (2014.01) |
| A63F 13/213 | (2014.01) |
| A63F 13/217 | (2014.01) |
| A63F 13/92 | (2014.01) |
| A63F 13/79 | (2014.01) |

(52) U.S. Cl.
CPC ............. *H04W 4/185* (2013.01); *A63F 13/213* (2014.09); *A63F 13/216* (2014.09); *A63F 13/217* (2014.09); *A63F 13/65* (2014.09); *A63F 13/79* (2014.09); *A63F 13/92* (2014.09); *H04L 29/06034* (2013.01); *H04L 67/22* (2013.01); *H04L 67/306* (2013.01); *H04L 67/38* (2013.01)

(58) Field of Classification Search
CPC .... A63F 13/213; A63F 13/216; A63F 13/217
USPC ............................................. 455/414.1, 456.1
See application file for complete search history.

(56) References Cited

U.S. PATENT DOCUMENTS 8,700,009 B2 * 4/2014 Quy ....................... H04W 4/00
                                                        455/414.1
2010/0262464 A1 * 10/2010 Monteforte et al. ........... 705/10

(Continued)

*Primary Examiner* — Qun Shen
(74) *Attorney, Agent, or Firm* — Lewis Brisbois Bisgard & Smith LLP; Jon Hokanson

(57) ABSTRACT

A contextually intelligent communication system and processes acquire and processes data on the current context of a user who is using a connected mobile communication device such as a smart phone or tablet by using various sensors, image recognition or augmented reality residing in the connected device; providing additional data to define the user's current environment; combining the contextual data on the device with the additional data to define the user's complete, relevant context; gathering the user's current context data and updating the device by uploading the data via a wide area mobile network to a contextually intelligent server in the cloud, matching the user's current contextual data with the user's past and historical data and then downloading updated data back to the device, with the updated data including any of a variety of contextually relevant information such as feedback, experiences, recommendations, offers, coupons, advice, tactile feedback, content such as visual and audio representations, augmented reality, and other audio/visual displays to the device of the user that is predictably useful and relevant to the user's current context and future context as the user enters a new context.

18 Claims, 29 Drawing Sheets

(56) References Cited

U.S. PATENT DOCUMENTS

| | | | | |
|---|---|---|---|---|
| 2011/0028160 A1* | 2/2011 | Roeding | ............... | G06Q 30/00 455/456.1 |
| 2011/0065451 A1* | 3/2011 | Danado | ............. | H04M 1/72569 455/456.1 |
| 2011/0306326 A1* | 12/2011 | Reed | .................. | H04L 67/1097 455/414.1 |
| 2012/0122476 A1* | 5/2012 | Lee et al. | .................... | 455/456.1 |
| 2012/0246244 A1* | 9/2012 | Mallet | .................... | G06Q 50/01 709/206 |
| 2013/0117719 A1* | 5/2013 | Bender | ................ | G06F 9/4443 715/866 |
| 2014/0022587 A1* | 1/2014 | Coccia | .................... | G01S 19/14 358/1.15 |
| 2014/0364092 A1* | 12/2014 | Rose | ................ | G06F 17/30887 455/414.1 |

* cited by examiner

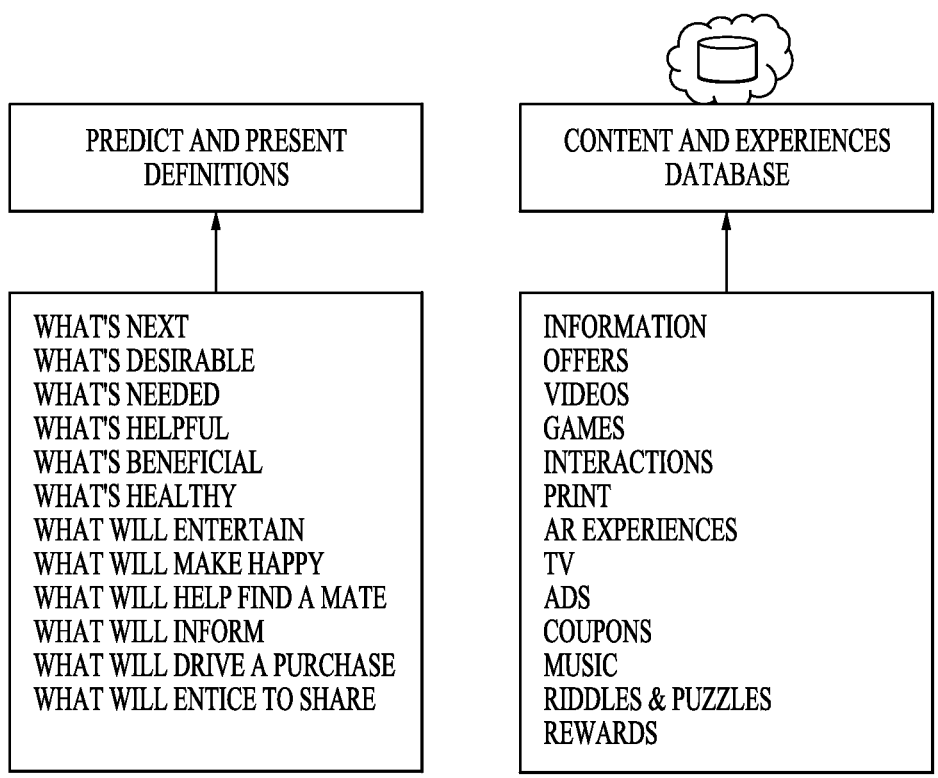

PREDICT AND PRESENT DEFINITIONS

WHAT'S NEXT
WHAT'S DESIRABLE
WHAT'S NEEDED
WHAT'S HELPFUL
WHAT'S BENEFICIAL
WHAT'S HEALTHY
WHAT WILL ENTERTAIN
WHAT WILL MAKE HAPPY
WHAT WILL HELP FIND A MATE
WHAT WILL INFORM
WHAT WILL DRIVE A PURCHASE
WHAT WILL ENTICE TO SHARE

FIG. 6

CONTENT AND EXPERIENCES DATABASE

INFORMATION
OFFERS
VIDEOS
GAMES
INTERACTIONS
PRINT
AR EXPERIENCES
TV
ADS
COUPONS
MUSIC
RIDDLES & PUZZLES
REWARDS

FIG. 7

CONTEXTUALLY INTELLIGENT COMMUNICATION SYSTEMS AND PROCESSES

CROSS REFERENCE TO RELATED APPLICATION

The present application claims the benefit of priority of U.S. provisional patent application 61/709,710, filed Oct. 4, 2012, and of U.S. provisional patent application 61/882,593, filed Sep. 25, 2013.

FIELD OF INVENTION

The presently described systems and processes relate to the field of contextually intelligent communications that acquire and process data related to a user who is using or connected to a mobile communication device.

BACKGROUND

High tech mobile chip companies like Qualcomm and Broadcom, mobile device manufacturers such as Apple, HTC, Nokia and Samsung, mobile network operators such as AT&T, Verizon and Orange, mobile app developers and publishers such as Trigger and thousands of others build, develop, create, invent, manufacture and/or publish products and processes in the field of electronic or telecommunications. Augmented reality (AR) software solutions such as Qualcomm's Vuforia™ brand software application and others such as Aurasma, image recognition (IR) solutions such as Qualcomm's Gimbal™ application, peer-to-peer communication solutions such as Google's NFC application and Qualcomm's AllJoyn™ brand application, mobile payment solutions such as Qualcomm's Pay™ brand application and Google's Wallet™ brand application, and context awareness solutions such as Qualcomm's Gimbal™ brand application also play a role in the field of electronic communications and mobile applications. Sensor fusion companies such as Virtual Eye, stadium and venue solutions such as provided and developed by Cisco also play a role in the field of electronic communications and mobile applications. Customer relationship management (CRM) systems hosted in the cloud are offered by companies such as Salesforce.com, Oracle and Parallel6. Research facilities such as PARC, MIT and Qualcomm continue to fund and conduct research and development in many of the facets and features of the field of electronic communications.

The present architecture, systems and processes do not depend on any specific chip, mobile device, technology, operator or user. They work regardless of what AR or IR technology, CRM or sensor fusion system is used.

The present architecture, systems and processes are based on combining currently existing technologies and blending them with traditional marketing and sales methodologies to form integrated solutions. They work with known technologies, and are adapted for and are adaptable expected new technologies, devices and use-cases as they become commercially available.

This is the first time a simple to manage solution has been created by combining complex and cutting edge technologies, combining it with real-time contextual data, including past historical data on user's behavior to present solutions, offers and assistance to the end user based on their current context and situation, past behavior and preferences and predictable next actions and desires.

This overview will present a summary of the state of the art of the various technologies described above.

The present description details numerous embodiments and exemplary, detailed use cases. There are numerous combinations and sub-combination for the presently described systems and processes.

Numerous patents exist in each of the sub categories described below. The presently describe systems and processes is not dependent upon any specific such patent. Typically providers of technologies such as Qualcomm's Vuforia SDK allows for patents to be filed based on their underlying technology.

Context Awareness

Contact awareness is a well-known discipline, and has significant, current R&D in progress. There is a lot of R&D in this space, at universities (MIT), research facilities (PARC, SRI, Freuenheuser) and commercial corporations (Qualcomm, Apple). Qualcomm has just released a beta version of a SDK called "Gimbal", which is the closest to the invention. It features aspects of the invention, but does not include sensor fusion with other devices, input from other devices and does not include a commercial CRM back end that enables integration with historical demographic data as a stand-alone solution.

Context Intelligence

There is a lot of research in this space as well, but no known commercial solution available at this time. Same entities as above are the strong players in this space.

Mobile Marketing

Numerous companies are doing marketing to the mobile devices. Some use location based services, others include social media status and integrations, and others use a CRM back-end. No one have a complete solution that enables a brand to gather real time context information, combine it with historical data and automatically deliver messages to the mobile device based on these.

AR

Numerous companies have technologies in this space, ranging from Layar which started using GPS for AR, to Nokia's new solution for Windows 7 phones, to Sony, Blippar, Aurasma, Dekko and numerous others that have their own technology solution. The biggest player in the space is Qualcomm with its Vuforia SDK. No one use AR to discover and verify context, and no one has yet to include a marketing back-end CRM system and enable brands to have their own solution. The invention can use any of the AR technologies mentioned.

IR

Image recognition is an aspect of AR, and many of the AR technologies use their own algorithms to create the AR experiences. Qualcomm's Gimbal SDK offers a free IR component. It does not include sensor input from devices in proximity, or a marketing CRM back-end database.

Location Based Services

Many companies are offering Location Based Services (Placecast, Place-IQ and many others) that feature aspects of the invention. None has integrated Context and sensor input.

Coupon Delivery

Groupon and numerous others have various solutions for delivery of coupons and offers. None have a complete solution like the invention yet.

CRM

Salesforce.com, Oracle, Parallel6 and numerous others have cloud based CRM systems. The invention is the first to include complex re-time contextual information and combining it with historical and demographical data.

Push Technology

There are numerous solutions that enable messages to be pushed to a mobile device—some are fairly sophisticated.

Mobile Payment Solutions

Google Wallet, Qualcomm's Pay and numerous others are working on various solutions for mobile payments. None have full integrated with a cloud based CRM solution like the invention.

Mobile Devices

The invention is not dependent upon any specific mobile device, and anticipates that the form factors of mobile devices will change radically with new system and devices developed.

Peer-To-Peer Communication

Numerous companies are working on standards and new means for peer-to-peer communications, with Qualcomm's open source and free SDK "AllJoyn" being the most diversified cross platform, cross standards and cross device solution.

Stadium/Venue Solutions

Cisco, Virtual Eye and Sporting Innovation have a series of solutions for venue enhancements. None include the total solution for the venue and sport team owners as the invention does.

Sensor Fusion

Numerous companies spend a lot of money and resources on R&D for sensor fusion, with many starting to present and sell SDK solutions. These include Kinect, Qualcomm, Nokia and many others.

Ball and Player Tracking

Virtual Eye and Hawkeye have solutions that can track and verify ball trajectories in sports such as soccer, baseball, tennis and golf. None are using this information to drive AR experiences as the invention covers.

There is therefore a need to provide a method that allows establishing a user's context, create a definition of context and contextual awareness, communicate this to a database of known past behavior, combine these and then deliver content from the cloud directly to the user's connected device(s) to enable delivery of content that is relevant, appropriate and helpful for the end user, and present this at the right time and location, thus creating contextual wisdom creating a contextually intelligent communication solution

SUMMARY

The presently described architecture, systems and processes are directed to an electronic eco-system that is built upon a combination of diverse technologies, and together is sometimes referred to as a "solution". While substantial R&D efforts are underway globally in the fields of electronic, wireless and mobile communications the present system is believed to be the first such eco-system that is built upon a combination of diverse technologies. Qualcomm's technologies are offered as licensed and open source code, with the ability to create IP that is supported by their technologies without restrictions as long as their underlying technology is not changed in any way.

The present systems and processes provide a complete end-to-end communication platform that includes a series of currently, but separately existing technologies. The inventive combination of the features wherein mobile communication devices becomes sensor gathering devices that determine the user's current context, then report this context to a customer relationship management system and communication platform residing in the cloud, combine it with historical demographic data then enables communication back to the users mobile devices, presenting the right message and content to the right user at the right time and location while the user is in a specific context does currently not exist.

The presently described embodiments are simple to manage and combine complex and cutting edge technologies with real-time contextual data and, optionally with past historical data on a user's behavior. The combined data is used to present solutions, offers and assistance to the end user based on the user's current context and situation, past behavior and preferences and predictable next actions and desires.

The presently described architecture, systems and processes comprise a preferred contextually intelligent communication platform (CICP) system and a variety of preferred methods for its use. In one aspect the CICP is used for acquiring information from various sources to facilitate a recognition of one or more objects or images using sensor data transmitted to an augmented reality (AR) system mobile application software and/or an image recognition (IR) mobile application software. Using a camera of a mobile device with the AR and or IR application and the device's camera, the recognized image or object is matched with an existing data file for a known image or object preferably residing in an image/object server in the cloud. A server in the cloud is herein defined as a computer server located elsewhere, hosted and managed by some entity, such as for example Amazon's web services. The AR system of a CICP can be used as a method for delivering an augmentation to a user of the CICP. An Augmentation is the overlay of a digital experience such as an animated or still 3-D model, an animation sequence, a video overlay, link to another website or information superimposed on the AR target as seen on the mobile device display screen. Representative, exemplary sources for an AR system include Vuforia™ brand software available from Qualcomm, Inc., San Diego, Calif. IR applications are also, preferable used to recognize an object, match the image with a known image in the cloud based image server and present an overlay of information superimposed on the image and displayed on the mobile device display screen. Several preferred commercially available IR applications "Gimbal", available from Qualcomm Labs, Inc., San Diego, Calif. A connected device is preferably a mobile communication device such as a smart phone or a tablet, and also includes other electronic communication devices such as desktop computers, laptops, AR glasses or contact lenses, and the like. Such hardware may be connected to a communications system such as for example, the internet, satellite communications, mobile telephone systems, Wi-Fi and the like. The present system is adapted to process various information obtained from the sensor activity(s) including for example, a location, a time, an activity, a speed and direction of travel, an anxiety level assessment, a social media status, a gender, a relationship status, an ambient sound or a light level, an air quality, or various other environmental aspects of the user. The gathered and shared information flows through the system and is used intelligence activity by which the CICP processes a plurality of data files relating to a contextual environment of the user of a connected device. The information acquired by the CICP about a particular user has immediate and future benefits for that user. The contextual environment of a user of a connected device is defined as the environmental circumstances that form a setting for an event, a statement or an idea for the user and in terms in which the user's environment can be understood and assessed by the user. This includes discovery of other devices and people in proximity, detection of any sensor system embedded in the physical world around the user, any sensor system worn or embedded in other persons or other devices or equipment. It also includes the time, day and location as well as the activity in which the user is currently engaged. The contextual environment of the user of a connected device is termed and defined as a context bubble. The context bubble of a user of a connected device influences the user as a bubble of influence. As other people or devices enter this contextual bubble of influence, either by moving into it, or the user moving that the user's bubble of influence encompasses the new entity(s) within the user's bubble, these devices will be detected, acknowledged and contact established when appropriate.

In a second aspect, the CICP is used as a method for predicting a future contextual environmental setting for the user of the connected device.

BRIEF DESCRIPTION OF THE DRAWINGS

The foregoing aspects and the attendant advantages of the present systems and processes will become more readily appreciated by reference to the following detailed description, when taken in conjunction with the accompanying drawings, wherein:

FIG. 6 is a listing of exemplary, preferred variables and questions that may be posted, collected and used to determine the predictions and what to present next;

FIG. 7 is a listing of exemplary content, experiences and information that may be gathered, stored and used on the content and experiences database of the FIG. 1 embodiment;

FIG. 19 provides a schematic overview of how the present system can be used by a user to detect and verify the broadcast TV, film, movie or internet content the user is watching, and how the system can then present relevant, appropriate and supplementary content to the user's connected mobile device based on the content the user is consuming or interacting with;

DETAILED DESCRIPTION

Figure 1:
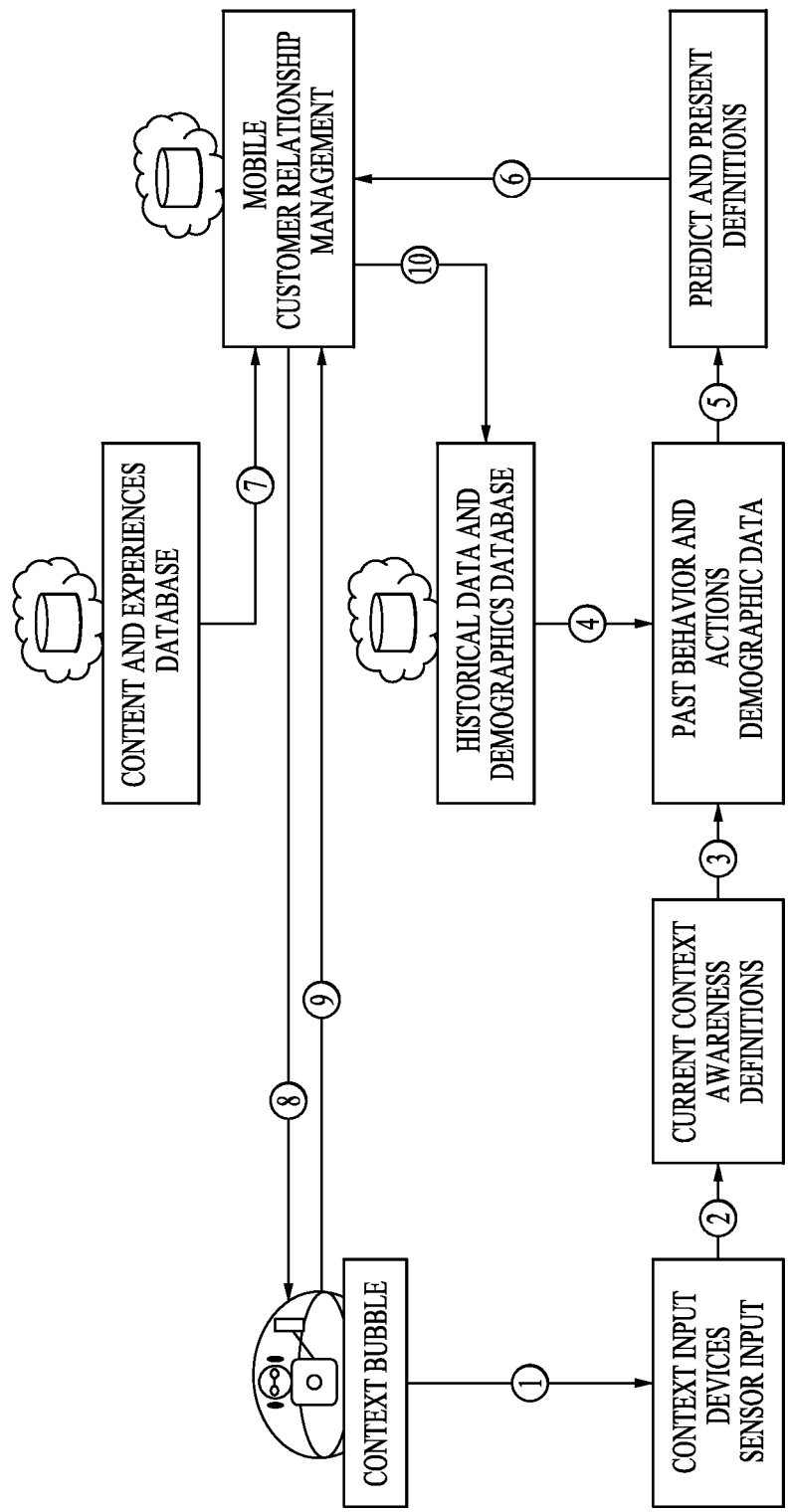
FIG. 1 is a schematic overview of a preferred embodiment eco-system architecture including a context or virtual bubble.

The present inventions relate to contextually intelligent communication architecture, platforms, systems and methods of use. The systems acquire and process data regarding current context of one or more users who is/are using or connected to a mobile communication device such as a smart phone or tablet—or any connected conventional or future devices such as augmented reality glasses or contact lenses, personal communication hubs, connected clothing, jewelry, shoes and or accessories, or any embedded communication devices. Current context data is obtained using various sensors, sensor input, devices, image recognition or augmented reality residing in the connected device(s). Additional data from other devices, sensor systems, users and users' devices and/or physical locations may be added to define the environment that any user is in. Combining the contextual data on each connected device with data gathered from other such sources in the environment and/or proximity around the user(s) preferably define the complete context that the user is in for the purpose of the present inventions.

Context is defined herein includes but is not limited to the activity, location, mental state, physical state, mode, direction and speed of travel, level of engagement as well as the surrounding environment the user is within, other person(s) who may be present or nearby, what other mobile devices are present or nearby, including other connected devices, equipment, vehicles, tools, computers, displays, point of sale systems, ticketing systems, inventory systems, video and audio capture sensors, ball(s), object and other tracking systems and other sensor system(s), devices and/or equipment that can communicate via a Wide Area Network or any other methodology directly to one or more end users or through a back-end cloud based network connected to a cellular or WiFi network or any future method of communication capable of such communication.

The current context data gathered on an end user's device is preferably updated via a wide area mobile network or local area network to a contextually intelligent server, preferably a "cloud" based server. The server matches the current context data provided by the device with the user's past and historical data that has been collected previously via, preferably by other means and that is included in the cloud based database. The server communicates with the connected device(s) concerning a variety of contextually relevant information such as, for example, feedback, experiences, recommendations, offers, coupons, advice, tactile feedback, and content such as visual and audio representations, augmented reality, and other audio/visual displays. Preferably the information communicated between the device and the server is useful and relevant to the user's current context and likely to be useful to the user as the user enters a new context.

Optionally, identity information of each user is matched with past historical data and the current contextual data of each user, respectively, in a customer relationship management system connected to a content server containing, for example, offers, videos, audio files, augmentations, 3D models, games, coupons or advice.

A cloud based customer relationship management system able to communicate with mobile devices delivers relevant information to the connected device while the user is in a specific, determined context and updates the information as the user moves to a next context, to a next context and so on as the user continues to move from one context to another context.

An image recognition systems such as Qualcomm's "Gimbal" and/or Augmented Reality systems such as Qualcomm's "Vuforia" preferably are used to capture and verify what product, image, ad, video, TV broadcast, billboard, poster and or display the end user is interacting with.

The physical distance between the image and the communication device preferably is used to capture the interaction preferably is used to control the volume of audio feedback, strength of any tactile feedback and the level of any other feedback delivered to the device.

Privacy settings on the device may be used to ensure that the user controls the nature and level of detail that is shared. End User License Agreements (EULAs) define the use of the data collected. Details collected on the mobile device initially may reside on the device itself and then be transmitted, preferably anonymously, or, optionally other data can be gathered and shared with the cloud-based system in a manner where the device and/or user is identifiable, in accordance with local and international laws, rules and regulations regarding privacy laws and storage and use of such information.

Mobile devices as intended for use in the present systems and processes include mobile phones and tablets. It is envisioned that in the future numerous products will include electronic, communication capabilities, such as glasses, eye contact lenses, personal communication hubs, watches, jewelry, accessories, shoes, hats, sports equipment, entertainment systems both visual, audio and tactile, apparel, devices in electronic equipment that is placed in specific geographical locations to enable communication with an end user, with a mobile device as well as to sensors and devices embodied in a human body.

AR and IR experiences are currently available on the mobile device display screens and are therefore adapted for use in the present systems. The present systems also have the capability to be used in conjunction with soon-to-be-released AR enabled glasses such as Google's Glasses™ brand AR project and others, as well as other AR enabled contact lenses that are in various stages of development. The present systems are also adaptable to work with other anticipated display system such as reflective and interactive clothing and cloth materials, as well as with displays in fixed location(s) in the environment as well as displays in various modes of transportation such as vehicles, planes and trains.

Cloud storage is the concept of storing data and information on a server or a combination of servers that resides in other geographical locations. Numerous commercially available cloud storage solutions are commercially available through companies such as Cisco and Amazon.

Big Data is defined as the collection of the data gathered in one or more of numerous cloud based servers using one or many databases. Many such databases are commercially available, such as for example, Hoodad™ brand and Mongo™ brand databases.

As each user moves around that user's surrounding context of the user will change. During use of the present systems, information as defined above will be collected and as the user moves, the corresponding, changing information will be delivered to the cloud based serves(s) so that each user's context is always relevant and current, i.e., real time.

As a user moves along through various environments, inducements and contests can be presented and offered, at the right time and location with relevant prizes and offers, to the user. One such game can be a "scavenger hunt" or "treasure hunt" where the user is presented quizzes and puzzles that are relevant to the user's context and the prizes provide value to the user based on past behavior and preferences of that user. As the user travels through the environment and solves the puzzles, riddles and quizzes, new clues are revealed based on such criteria as location, whether an image has been found. IR or AR recognizes when the user is at that specific location, and then another clue is unlocked and the user is presented an opportunity to solve the next quiz, riddle or puzzle. This sequence repeats until the user ends at the final location or has found the right item that triggers the unlocking of the final prize. The final prize can be, for example, a ticket to an event, back-stage passes, VIP treatment, coupon, exclusive content, physical or digital merchandise, games, video or audio content.

As the user continues through the physical environment, automatic updates to the user's context and surroundings may be shared with others based on the user's permissions. Optionally these updates would be to the user's social media status such as on FaceBook and Twitter for individual users.

The system also includes use of AR tags in connection with geo-fence areas by AR targeting by users and offering and displaying experiences when and relevant to a user's crossing a specific geo-fence. These can be personalized and be made available to the right user based on the user's data in the MCRM.

The system can also be used by law enforcement, military, first responders, natural emergency crews, security guards, border patrols, homeland defense, TSA and other personnel where a need to verify a user's health and safety is of interest. Contextual input such as audio detection of a gun-shot can automatically be collected and reported together with other vital information such as location, health, rate and direction of travel that can also be immediately collected upon such an event and reported to the cloud-based server where an alarm will automatically alert to the situation. The user's context will then be immediately available and appropriate supportive action can be taken as directed by a superior or support group.

In other instances, the system can be used to detect what broadcast TV program, video, DVD, web delivered content and motion pictures such as movies the user is currently watching. The system uses IR and AR technology to recognize certain images/frames/sections of the content and matches this against the cloud based image recognition database. Once a match is made, the CRM system delivers relevant information to the programming that the user can engage with such as updated stats, information on the participants in the content such as players and/or actors, associated and relevant games, fantasy games, ability to purchase items that are shown, ability to order products and food shown, and the delivery of these items are based on the user's current location, context and past behavior. Secondary content that is relevant to the content optionally may be displayed on the user's device such as a different point of view (POV) or camera angle during a sporting event.

Other items such as clothing and/or markings/logos or hangtags attached to the clothing can also act as the target for an AR/IR experience. Hangtags can trigger display videos of runway fashion shows, models wearing the clothing, the designer describing the apparel, showing features of the apparel and or the designer describing his motivation behind the creation of the design. AR overlays can be superimposed on the clothing directly, or can be added upon the person wearing the clothing. One such example may be a hat with a logo of an American Football team that triggers the display of the same team's helmet superimposed upon the hat and the wearer of the hat. All these interactions are preferably collected on the device and reported to the cloud based CRM.

Should the context include a retail location that is also part of designated system in accordance with the present inventions, direct communication between the retailer and their POS system can enable a mobile payment solution using a convention payment process, such as Qualcomm's "PAY" system. This system preferable is automatically activated on the user's mobile device as the user enters the physical context in which the system is active. The user then has the option to accept the use of it, or decline. Additional offers and delivery of coupons and incentives to purchase the product with potential discounts are available should the retailer want these delivered.

Should there be other end-users in the proximity to an end-user and all have at one time downloaded one of the applications that use the present methodology, an ad-hoc peer-to-peer communication can be established using technologies such as Qualcomm's "AllJoyn" application. One preferred embodiment of the presently described inventive processes is use of for visitors to locations, venues or events where there is a long line waiting to enter—such as at a theme park where people line up for roller coaster rides. In such a context, a location based game can be triggered and end users that have the solution on their devices can be connected and start playing against each other. As an incentive, the winner may get a front of the line pass if he wins, for example. As people move away from the location, they will drop out of the game, and others will be invited to join as they come into proximity. The game could be set up so that it can be played only by users that are in the specific location or predetermined distance from the gate, which criterion is the context defined by the back-end MCRM system according to the theme part owner or operator.

As a person is moving around their surroundings, images can become roadmaps and markers. These can offer directional feedback to the end-user. They can be simple logos, arrows, or any images that the IR/AR technology recognizes as a directional sign as matched against the cloud based target database. The image can indicate to one end user to go left based on that person's desired destination, the same image can indicate to another user to go right based on the person's desired destination that differs from the first person's destination.

Another embodiment of the presently disclosed processes is the creation of type set such as fonts with specific features, characters and signs that are efficiently recognized by AR/IR and can quickly provide a dynamic feedback, such as a "STOP" sign is recognized as an action to "STOP" because of its shape rather than the individual letters "S-T-O-P".

Other posters, images, flyers can also be customized to appeal to the person viewing them. This is achieved by using the cloud based image recognition database. Once an image is recognized, it will be matched with an associated AR or IR overlay. A selection of different options to be presented and the AR/IR overlay displayed is based on the end-user's preferences, gender, age and past behavior.

In sporting events where the players in the game use equipment, shoes or clothing with sensors that gather information such as direction and rate of speed, G-forces in turns or upon impact, video and audio feedback, and other sensors measuring the player's health and physical status, corresponding data can be collected, stored and processed in accordance with the principles of the presently disclosed inventions. When an end user is wearing a connected device, glasses, gloves, body panels or sits in a connected chair with feedback display abilities such as impact, sound, shake, G-force simulation, the event can be replayed with a combination of these feedback aspects in addition to traditional content display such as broadcast TV.

In once such embodiment helmets worn in high impact sports with G-force sensors and mouth strap sensors are adapted to include sensors. Should a player experience an impact with a G-Force that is deemed unhealthy in accordance with predetermined criteria, a message can be sent through the system to a responsible person, such as the team trainer or a coach of the team. Should the mouth strap or other means to secure the helmet not be correctly closed, locked or engaged, another message could also be conveyed, as yet another example of use.

Geo-specific messages are also enabled by the presently described systems and processes. One such example is in a stadiums or fields where youth play any such high impact sport, such as middle—and high schools, colleges and universities. By establishing geo-fences of these locations, messages can be delivered as users enter the geo-fences around these locations. These could be messages such as messages from professionals playing the sports to "play safe, buckle up your chin strap" and that are delivered to users as they cross the geo-fence.

Additional sensors at a sporting event or on other equipment such as on boats and on cars, can gather other information from the event. This information includes, for example, ball trajectory, player positions, speed and direction of travel, and telemetry information from a race car or sail boat, both as it relates to the individual player, ball, car or boat but also how it relates to others in the event—competitors, team mates and official and other points or areas of interest. The information gathered can be used to display the activity in an AR replay of the actual event—such as superimposing the trajectory of a baseball pitch in a 3D-AR environment, or displaying soccer game with real-time ball and player representation on a target in AR.

Another preferred embodiment of the presently described systems would be for business promotion and networking where a company's logo is the AR/IR target. Once recognized by a sensor, and processed, the system will bring up any of a variety of information, such as information superimposed on the logo about the business, show content, display catalog of products, introduction by the CEO, 3D-graphic animation of products and/or any aspect of the business that the business wants displayed. Connections to LinkedIn, Twitter, Facebook and corporate websites can be displayed as interactive buttons. Once the end user activates the AR experience, that user's corresponding information is retained in the cloud based CRM system so that the company can remain in contact with that user.

Corporations that have multiple departments, divisions, subsidiaries or other complex hierarchy and organizational charts including management structures, AR can be used to showcase the management hierarchy, with reporting and responsibilities superimposed on each level. The structure can be displayed in 3-D and paths can be evaluated, highlighted and focused on.

Another embodiment of the presently described systems and processes is use of a company logo as an AR marker in the lobby or entry of a corporation. Once the AR experienced is triggered by the visitor to the corporation, a video of the CEO will appear in AR welcoming the guest. The event is captured, reported to the cloud based CRM system and then information about the guest is sent to the corporation. They then have information about their guests and can easily follow up with them in the future.

A company can also use the system to assist in making meetings between employees and their customers, suppliers, clients and/or other entities they interact with and have physical meetings with. Using the invention back-end system, each participants of the meeting is in the same context. Proximity based communication between the participants can then be automatically engaged. Automatic recording of the event can be enabled on each participant's device and reported back to the MCRM system. Each participant can then at a later stage review the information gathered. The system also enables communication between the participants directly as well as with other devices in the same physical or nearby locations such as displays, printers, AC/HVAC/Window Shades systems that control or influence the environment. As the participants leave, and others enter, the context of each user changes, but the physical contextual bubble of influence generated for the specific meeting remains the same until the MCRM system has been set up to end the event.

Another embodiment of the solution is to create "360 degree" fan experiences. In this example a fan of a sporting team purchases a ticket and downloads the team's mobile application. This application features an AR or IR component that creates an AR or game experience superimposed on the ticket as part of the use of the presently describe ecosystem systems and methods. This interaction is captured by the cloud based MCRM system verifying that this is a fan that is coming to a game, as well as the identity of the device and the location of the user. Once the user is in transit on the way to the stadium, the mapping feature of the application detect that the user is coming close to the stadium. If there is a game that day it is likely that he is heading to the game. A relevant offer to a participating retailer close to the stadium can be presented as the user approaches. Once the user crosses a predetermined geo-fence around the stadium, as selected by the operator of the MCRM system, it is likely that the user is going to the game, and offers related to the game and venue such as coupons for team merchandise or concession stands offers can be presented to the user's mobile device, and if applicable, past historical data will be combined to ensure relevance and high desirability of the offer to the user. An offer to enter the stadium via a VIP entrance can be presented. While in the stadium, engaging and entertaining games can be presented such as proximity based games can be presented, proximity based AR replays of last week's game can be displayed at specific locations. These games and experiences can only be played while in the stadium and during certain time slots such as before game starts and in breaks in game play. The MCRM system can also communicate with the stadium systems such as big screen displays such as "Jumbo Tron" displays. The results of the games played by the fans can be displayed. Exclusive content from the game such as alternative camera angles or different point of view video feeds such as from a driver's seat or a referee's cap that has a video camera embedded can be presented to the fans in the stands. As the fan leaves the stadium, the fan's connected device will cross the established geo-fence and a "thank you for coming" message can be displayed. This can include an interactive button with an offer and a call to action such as "come back Thursday night—buy now and get 2 tickets for the price of one", for example. Once the fan has returned home, content such as exclusive high lights from the game can be presented, with another offer to purchase tickets for a future game. The process then will be repeated based on the new tickets. Frequent visitors can be rewarded and loyalty programs can be created, all managed by the MCRM.

While attending a sporting event in the stadium, another game can be triggered as an AR feature where the user takes a photo with a virtual AR representation of one of the players on the team. By taking the photo, the MCRM system captures the interaction.

A suggestion to share this on social media such as FaceBook with friends to win a prize is yet another example of use. Those who share with a pre-determined number of friends will win a prize, for example. The one who shares with the most will win the grand prize. Each photo could include a suggestion to download the team's application with a possibility to win a prize if the recipient of the photo does so. The back-end MCRM system is programmed to capture each such interaction and is capable of automatically delivering the rewards based on pre-determined action levels.

As the user who is in the stadium and has had the application downloaded approaches a concession stand, the ad hoc proximity peer-to-peer system will create a connection with the concessions stand's mobile device/and or connected point of sale (POS) system. The menu from the concessions stand will be displayed on the user's mobile device. The user can select the menu items and the order will be transmitted to the concessions stand's mobile device and/or connected POS system. Once the order has been placed, a cloud based mobile payment system such as Qualcomm, Inc.'s "PAY" solution or near field communication (NFC) payment solution such as Google "Wallet" can be used to complete the transaction. When "PAY" is used, the users purchase is captured and retained in the MCRM system.

In another embodiment, a "360 degree retail experience" can be created, managed and operated using the present platform. In this instance, the entry point to the experience is the retailer's advertisements such as a printed "circular" advertisement inserted in newspapers or traditional ads in newspapers and magazines. Using the retailer's mobile app that has been enhanced with an embodiment of the presently disclosed systems, AR and or IR is used to register the user's interaction with the ad or specific sections of the ad. AR experiences demonstrating the product for sale, or content that tells a story about the product can be displayed and superimposed on the ad. Additional information and or coupons can also be displayed. As the user approaches the retailer who has used the MCRM to create a geo-fence around its physical retail locations, offers and coupons that are relevant to the user will be presented as the user enters the geo-fenced area and is ready by the time the user enters the retail establishment.

If a story is displayed as content in AR, the beginning of the story preferably will be superimposed on the ad. To learn what happens next, the user has to go into the retailer's physical retail location and locate another AR trigger. Once this has been located, the next chapter of the story will be revealed, and a coupon or other reward will be presented. Once the user has purchased the item, taken it home and opened it, and another chapter will be revealed and the story concludes. The story line content was created once and uploaded to the cloud based content database for playback on the relevant user's mobile devices.

The present systems and methods can also be used to record and store a user's wish list of products. The user can "tag" an item the user would like, upload it to the MCRM, and store who else the user want to inform of the desire to receive the product. Once this other user enters the location where the product was originally tagged, or another physical location that has the same product, the second user will receive an alert that there is a product that has been tagged and put on a wish list by the first user. If there is a connected POS system in the location, this will also be alerted to the presence of the 2nd user.

AR can also be used in the retail location to showcase what's inside the packaging. Once tagged by the user as desirable, the MCRM will record this and remind the user if the user delays the purchase to another later time.

In another embodiment, an advertiser and/or advertising agency can measure the effectiveness of its print and advertising campaigns. A mobile app with the AR/IR capability and the MCRM back-end system enabled, the advertiser can measure length and frequency of ad interactions. If call-to-actions are presented in the ad or in the app itself, the effectiveness of these will be captured by the MCRM system. If a call-to-action is for the user to enter a specific physical location such as a bar, restaurant, retailer, venue, mall, cinema, sports venue, expo, conference center, business establishment or hotel, the MCRM system will map the user and verify when the user enters the location. This is called Contextually Driven Proof of Presence. If there are items displayed for sale, a "buy now" button can be integrated and the sale will be tracked and verify by the back-end system. If there are promotions for an event, a movie, or concert, the date, location of the nearest theater, show times and "buy ticket now" including directions to the theatre can be displayed.

There are currently a few MCRM systems commercially available such as Parallel6's CaptiveReach™, and the inventions described herein are not dependent upon a specific MCRM solution.

Another use case for the systems is for the use of crowd control. In locations such as a theme park, the treasure hunt game can be created so that it drives the users participating to a specific location at a specific time. For instance, it can end up in the middle of the park at 5 pm, and as the user is walking towards the exits, offers and coupons for discounts in restaurants will be presented as the user is walking past them inside the park. The likelihood of the visitor leaving the park at such a time is lower and it's beneficial to the park owner to have their visitors dine inside the park rather than after exiting its gates and dining at another non related establishment.

While AR can be simple video overlays, the presently described systems include AR interactive games. One such embodiment is an application where an interactive penalty kick soccer game is displayed in "half AR" mode which is the definition of an experience where half the viewing display of the mobile device is displaying real-life surroundings, while the other portion is displaying a virtual world where the game is played. This can therefore effectively be played during breaks when attending a soccer tournament, with the arranger of the tournament controlling and presenting branded targets that trigger the experience. The game can be branded with specific team jerseys and uniforms worn by the avatars in the game. The game can also serve as a tool for the team for fund raising efforts. This can be achieved by offering sponsors the ability to purchase ad space in the game. In addition, the interaction with the game can be collected by the MCRM system and when the user is in proximity at certain times to other sponsors of the team, offers and coupons can be delivered to the user. One such instance can be a local pizza parlor that sponsors a youth soccer team. After the game as the team players and their families are leaving the game and in proximity of the aforementioned pizza parlor, an offer to come in and save on the purchase of a family meal may be delivered. The team will receive a portion of the pizza parlors cost of using the system.

Using the AR as a way to focus the user's attention on a specific products is achieved by creating a "ghost" image of the object to be found with a washed out and transparent image of the target to be found, as is conventionally known. Once the image is found and "locked" on, an UI animation can simulate the "lock-on" in the UI of the device.

When using AR in real life, the ability to maintain the AR target in view at all times is not always feasible and the AR experience will typically lose traction and the overlay will no longer be displayed. The presently described system includes the ability for an AR overlay to be triggered and started by the target, but if the target has been noted in the database as one that will be allowed to break the visual connection needed to be superimposed, it enables the AR experience to be ported onto the viewfinder or display on the device and continue to be displayed.

By using AR targets as posters in real life locations that are recognized as targets in the cloud based target database when it is in the view finder of a mobile device and that target is recognized, the user's mobile device is recognized as being interacting with the target by the MCRM system. Using the knowledge of the user from the data collected in the MCRM and the historical data inserted and included in the MCRM, the AR overlays are selected from another database. The AR overlays in this database have been specifically created based on the user's parameters such as gender, age, interests, ethnicity, past behavior, preferences and other pre-determined aspects. The AR displayed on the user's device will be tailored to the user's known parameters to present a personalized experience. The same poster will therefore present a different experience for a single young male user as to an older mother of two. The effectiveness of the differentiation can be measured and captured by the length of the interaction. If there is product displayed for sale, a "buy now" button can be integrated and the sale will be tracked and verify by the back-end system. If there is a promotion for a movie, movie schedules for the nearest movie theater can be displayed, directions to get there and "buy ticket now" feature integrated.

Another use of the systems is the AR enhancements of comic books and magazines, as well as catalogs used to present and sell merchandise where pages are divided in sections in a similar fashion to the comic book layouts. An AR avatar of one of the figures in the comic book or a representative or model featured in the catalog can emerge out of the book or catalog. This avatar can become interactive and guide and lead the user reading the book/catalog as the user progresses through the book. The avatar in the comic book can add games, show hints, additional content and other information that is relevant to the story line. The avatar in the catalog can present specific products, remember what the reader likes, collect a wish list, present related products, suggest going to a retail store, suggest and enable the user to purchase products instantly and present other relevant games and or content and or information relating to the products shown.

The AR games can also be triggered by targets such as collectible cards. These can be displaying avatars of known athletes such as NFL players or fantasy figures from games, TV series or movies. The characteristics of each player/character can be displayed on the card and incorporated in the AR display of the character/player. This can be dynamically updated such as in the case of the NFL player where real life stats can be updated and become a part of a fantasy league. Strengths, weaknesses, mode of battle, agility and other characteristics of fantasy figure can also be displayed, both static or dynamically. When more than one card is present, the AR experiences will be collected and recorded by the MCRM system. Dynamic interactions can be created and used to control the AR displays of the avatars based on this information. When more than one user is present, any ad-hoc peer-to-peer communication solution such as Qualcomm's All-Joyn or Blue Tooth can enable game-play between the users based on the cards present. All of the user's devices will communicate with the back-end MCRM system that will capture each interaction both on the physical cards, as well as interaction with the AR dynamically controlled avatars.

The AR experiences can also be triggered by targets that users create on their own. By having a target with known characteristics on the borders and or corners, the center of the target can be blank. One embodiment of this feature is the ability to enable a child to draw an image of the child's favorite carton or TV character that is associated with the target and the target is a piece of paper with borders and perhaps the name of the character. The parent of the child can explain to the child that the target is specific for a specific character such as Sesame Street's Elmo, for instance. The child then draws the child's rendering of Elmo in the center of the sheet of paper. Once the target is recognized by the borders and corners, an AR 3-D model of the character is displayed on the connected mobile device.

Another embodiment of the solution is for use in education. Text books and other printed material can trigger puzzles and problems to be solved. For example, these can vary from placing AR cubes with "A", "B" and "C" in the right order, or performing a virtual AR dissection of a frog in 3-D where mistakes in the sequence are noted. Once performed correctly, this is reported to the MCRM system. Another subsequent problem or puzzle to solve is presented on the same target. Only upon successfully completing this, the next puzzle or problem to be solved will be presented. The MCRM system will track and verify each step of the learning process. Results and progress can be gathered and presented to a teacher's mobile and/or connected device. Individual results and progress can be reported to the caregiver and/or educator of the child or student.

Another embodiment of the solution is the use of proximity based games in venues and locations such as bars, nightclubs, sporting venues and places where users would come to mingle and interact socially. The location based proximity games that are powered by the ad-hoc peer-to-peer communications will be triggered by a target that is common for all the players such as a restaurant menu, logo, beer coaster or other specific image. Once triggered and the users are in the same location, the game will start. Each player will see what the other player(s) is doing as displayed on their own device. A simple game such as a virtual "musical chairs" can be played where each player has to perform a function within a certain time and virtually flick to the player sitting next to the user before the music ends. Harder tasks and shorter time allotment will make the game increasingly hard to play. Once a winner emerges the time and other scores are reported to the cloud based MCRM system. Leagues, loyalty programs, leader boards and games across location, cities, countries and continents can be enabled. In-game and in-app sponsorships and ability to purchase digital power-up in-side the game can be enabled. The game can be specifically branded for specific locations, brands, teams or countries. The game can be specifically tied in to a location or specific locations. In-game experiences, scores and results can be shared via social networks. The MCRM system will capture these and reward those that meet the licensee of the game's criteria.

In another embodiment of the solution, an offer for a free drink is presented to male patrons that are inside a specific bar that uses the MCRM system to present the offers directly to patrons inside the bar. However, in this instance, for example the offer for the free drink could be limited to a female patron and a short time duration. The bar owner has thereby encouraged their male patrons to engage with female patrons with a limited time and specific offer to create social interactions between the patrons of the bar.

The presently describes systems and can also be used with instruction manuals, how-to guides and cooking books. The present systems add the ability to present step-by-step instructions then verify that they user has correctly followed the steps. It tracks and verifies the user's interaction with the printed material and collects additional contextual information. Based on the knowledge that the user is engaged in an activity such as assembling a piece of furniture, repair a car or cook a meal, combined with the user's location and past preferences and behavior, relevant and helpful additional information can be presented. In addition, the awareness of the user's context will enable the delivery of highly relevant offers, tips and other content. If purchase of a related product is considered to be worthwhile, then a "buy now" button can be integrated and the sale will be tracked and verified by the back-end system.

Interactive, personalized and dynamic content can also be presented using the present inventions. The content is customized and personalized. One such embodiment is the display of weather forecasts in a newspaper. The weather section of the newspaper would be the target for the AR application for the newspaper with the system. Instead of presenting the static national weather that the printed version presents, hyper-local weather forecast is presented based, on the user's current location. The MCRM system will gather the information and match with dynamic weather forecast data from any of the many commercially available weather forecasting services such as from www.weather.com.

Another embodiment of the present inventions is the creation of dynamic updatable printed magazines and publications. Sections, features and ads can be designed and created so that they depict images that represent the first frame of a video. Once the phone is held over the image, the mobile phone's camera recognizes the image and the video starts. This could be from a fashion show, from a movie, DVD, video tape, or any other motion capture display methods. The interactions are captured into the MCRM. Dynamic and updated content can be created and displayed at later time. The printed material is therefore becoming the portal to continued updated material.

Printed comic books and graphic books can also be enhanced with the solution. Using the AR and IR capabilities to recognize sections and or panels within the book, additional AR and or videos or animations can be superimposed on the selected images. These can be served up in a random fashion or sequences can be controlled by the MCRM system. If the comic book is associated with a video, TV program and or motion picture, video clips can be superimposed. If there is content for sale, a "buy now" button can be integrated and the sale will be tracked and verify by the back-end system. If there is a motion picture, movie schedules for the theater nearest the user can be displayed.

Catalogs of products for sale can also be enhanced and tied into a retailers commerce channels. Initially an AR avatar can emerge and provide guidance and advice, showcase features and make recommendations to the user. Demographic and past contextual data can be used to make recommendations. The user's behavior during the review of the catalog will be collected and recorded. If the user spends a longer time on a specific product, the avatar can be programmed to focus more on this category of products as the user goes through the catalog. The user can create a "wish list" of the products the user likes and wants. The MCRM system will record this and remember it. If the user goes to one of the catalog owner's retail locations, the list will be presented. If the retailer has a POS system that is connected with the cloud, the MCRM can push the wish list to the store POS where the sales staff can be alerted of the user's presence and desired items. The MCRM system will also allow the user to share the "wish list" with friends and family—both directly from the app as well as through the user's social media network. The concept of a 360 degree retail experience can be accomplished by having the avatar present the beginning of a story that will be completed once the user enters one of the retailer's physical retail locations. Completing the story will be accomplished by purchasing a product. A complete mobile payment solution such as Qualcomm's PAY can be used in the retail store to complete the transaction without the customer needing to approach the check-out register.

Another embodiment uses the AR targets as communication channels. Images placed on items such as, but not limited to, apparel, photos, ads, logos, products, packaging, posters will become a distribution channel of digital content that can be superimposed onto the target. This information can be content such as news, updates, announcements, entertainment, encouragement, supportive messages, reminders and alerts that are relevant to the product that has the image on it or is depicted in the image or is associated with the image. Personalization of the content can be created by the MCRM back-end system that drives and delivers the messaging in the AR experience from the AR database, combined with the user's current and past contexts and past behavior, preferences and behavior.

Traditional maps can also serve as dynamic AR targets. One such instance is a tourist map such as those frequently given away at hotels and airports at tourist destinations. Once the target is recognized by the user and the user is no longer in the user's home town, the MCRM system will recognize that the user is in a new location. AR experiences will be presented on the map that are relevant to the users past behavior, known likes and desires and most likely predicted wishes. The AR overlay of the same map will therefore be customized and personalized to the end user's past preferences—and will differ from user to user. The content database will store the information and will be connected with the map, the user's mobile device and controlled by the MCRM. For instance, consider a user who lives in New Your City, arrives at San Diego airport and uses his mobile device on one of the tourist maps available at the airport. The MCRM system records the new location and recognizes the tourist map and then concludes that the user is most likely on a vacation. The MCRM system knows the user is frequenting steak houses in NYC and will present offers and directions to participating steak restaurants in San Diego and that may also be super-imposed on the map. As the user moves around in San Diego, offers that are relevant to his past behavior, preferences, desires and history are presented at the right time and locations.

Another use example is creation of interactive, dynamic and personalized AR experiences superimposed on the printed map. This use can feature information, offers, coupons and details about locations and retailers and it can provide directions to locations and present highlights on the route chosen.

The AR map can then be ported onto the device and remain on the device with the user's location updated as the user proceeds along the selected route.

Another use example is creation of automatic check-in and registration for users that enter a specific location where a payment, registration or notification of the user's presence is required. One such use may be the registration of guests in a hotel lobby, participants in an expo or attendees at a concert. Here the user would have registered prior to arriving, and optionally previously could have experienced an AR enhancement associated with the booking of the hotel, expo or event. The MCRM system registers this booking, and when the user crosses the geo-fence established by the location, the MCRM registers this and sends a message to the order, booking, and registration and/or ticket office system at the physical location, thus completing the check-in process automatically. The user could additionally be presented with an option to do this automatically upon the initial AR engagement, or reminded to do so or have to do so manually when crossing the geo-fence.

In certain physical locations where GPS signals are weak—such as indoors, event centers, casinos and in large shopping malls—the present systems enable AR/IR targets to become virtual guides and sign posts. By recognizing targets that are placed in a known physical location, the MCRM system will capture the target and match it against the target database. Since the physical location of the target is known, the user's location is also known because the user needs to be in front of the target for the AR/IR to recognize it. The MCRM system can then send information about other known physical places in proximity to the current AR/IR target. Information such as directions, landmarks, distance, features of the location and offers from the location can be displayed. These will be superimposed on a digital map and would be unlike the traditional AR experiences, where the user holds the phone up against the horizon. These conventional systems are typically dependent on GPS coordinates of the user and the AR overlays and do not work indoors. The present system uses a combination of the user's known location, the MCRM database of known and defined locations, the MCRM's knowledge of AR/IR target's locations, and if a known number of these AR/IR targets are recognized as dynamic directional markers, directional arrows can appear as the user moves through the environment guiding the user to the desired end location. Other use cases for this can be in military environments where the markers can become hidden directional and warning signs or in disaster areas where vision and other directional signs and senses are hampered.

The presently described systems and processes also enable creation and commercial delivery of widely adaptable human body area networks. A central hub provides communication with the cloud based MCRM system. It collects data from numerous sensors, some embedded within the body, others worn directly on the body, others worn in apparel, jewelry, accessories, hats and shoes, others placed on electronic devices, others placed inside vehicles of transportation, others placed in the environment. Data collected is based on the user's context, collected by the hub and transmitted to the MCRM system. Data from other sources that is relevant to the user will also be collected by the "Big Data" database of the MCRM system. Based on the user's current context including health and mental state, location, activities, desires, past behavior and preferences, information will be sent to the hub. The hub will then send the information in the appropriate format to various feedback devices such as glasses and contact lenses that can display images and AR, audio devices that can play back sounds, tactile feedback sensors that can provide feelings of touching, bumpers that can be worn to simulate impacts in sports events, clothing items such as sleeves that can display images, and accessories that can display images.

The communication hub functions as a thin client connected with the cloud for storage. The battery power on the device is used for computing power and low power communication with sensor input and display output. Storage information is preferably retained in the cloud database.

As the user moves into an environment where there are display devices that are connected, a connection directly between the hub and the devices may be established by a variety of methods, and information from the hub and the cloud based databases can be displayed on the displays.

The solution also enables digital signs to display relevant information as a user moves through an environment. The display sign is connected with the MCRM system in the cloud. Once a user's context bubble enters the "sphere of influence" of the digital sign, the user's mobile device will recognize the event. The MCRM system will recognize the event from both the digital display as well as the user. The MCRM will send an appropriate message to be displayed on the display based on the users past preferences, current state of mind, the user's likely next destination as well as any recorded activities in the future. The display will be connected to a content database in the cloud that is controlled by the MCRM system. This enables the display to present the content that is relevant to the user as the user is in proximity to the display.

Another embodiment of the solution is the ability to serve as a contextual browser. By combining AR and IR for visual input and replay of search results, the system's ability to capture contextual data from numerous users simultaneously enables the system to create a search for the user for a context that meets the user's desires. Once such use case is where the user is in a new town Saturday night and wants to have dinner in a place that presents coupons and offers, has loud music and a high density of people of the opposite gender within an age group similar to the user. A traditional web search will list locations close by, but without real-time contextual data. When a restaurant is using the invention, the number of patrons using the system, their data and preferences and other data that they have opted in to share are captured by the MCRM system. A real time contextual representation of the state of that specific location is thereby gathered. If that matches the initial user's desired context, and it matches the user's past preferences and desires, that location will be presented as a recommendation by the system to the initial user.

Another embodiment is for monitoring, verifying and tracking the user's health, the user's benefits from consuming specific health related products, medications and treatments, and the user's behavior as it relates to the user's health. By combining information about the user's health condition as collected by a variety of sensors worn, placed upon skin and/or embodied into the user's body, the information is be collected by the user's device, recorded and communicated to a separate HIPA compliant database. This database features security measures and the user's device only collects health sensitive data that it can verify as the user's specific personal data, and biometric systems are used to verify. Numerous database systems such as these are commercially available as are numerous biometric personal recognition systems with the present systems not being dependent upon any specific conventional system, application or process. The database that collects the medical data is linked with the MCRM system, where the user's identity is combined, not the medical data. The user's context is recorded by the MCRM system, and information that is relevant to the user's health is reported to the medical database. This can include contextual data such as distance walked during a day, frequency, number of and lengths of time spent at fitness and spa locations, activities in sport, and stationary time at the office and at home in front to TV, video games or computer. Reminders, encouragements and advice can be sent to the user if user's behavior is not healthy, for instance as a user is approaching a fitness center that uses the MCRM system of the invention, an offer to come in for a free class may be presented with a reminder to the user that it has been X number of days since the user last exercised.

The solution can also track and verify the benefits of medicine, treatments and products that have claimed health benefits. The consumption of the products and medicine can be captured and verified by AR capture of the products as the user is about to consume it. This can be achieved by having the outside label of the packaging as one AR target that triggers the system to initiate data collection from various sensors monitoring, capturing and recording the users health conditions and stats. Once the user opens the packaging, there may be another AR trigger inside the cap of the bottle containing the product, and this triggers another AR experience that also is captured and used as verification that the product has been consumed. Rewards, reminders and encouragements can be displayed on the product to entice the user to activate the recording of the use. When the user wears sensor systems that measure health conditions, the AR can trigger the sensors to record the user's condition before consuming the product, then at certain time(s) thereafter. Activity levels and heath conditions will be recorded and stored in the approved medical database.

A commercially available product with perceived but unproven health benefits can also be enhanced with the present system. The user's consumption of the product and the verification thereof, the daily recording of activities, the reminders and encouragement to live a healthy life style can all be presented as an overall solution by the producer and owner of the commercial product. In such an instance, there would not be any claims to the product's benefits other than for marketing purposes and only in compliance with local and international regulations, laws and policies related to proclaimed health benefits. By using a secure database that is in compliance, any data that is personal and can be construed as needing to be in compliance with medical health record policies will be ensured as this data is retained and stored separately from the MCRM.

Another embodiment is the use for nutritional information on food and liquid products. For each participating product, their label/packaging will be stored in the content database. When the user is displaying an AR experience on the product, the nutritional information is overlaid upon the product. The user then is prompted to answer whether the product is to be consumed or has been. If consumed, the calories, the vitamins and nutritional elements of the products and other relevant characteristics that have been entered into the database associated with the product will be recorded in the user's medical database. A summary of the daily consumption will be presented to the MCRM and will be reported back to the user at the right time and location. This can be used by the system to verify, record, remind user to take medications or warn users against over dosage.

The ability to record a user's daily context and replay it at a later time is another embodiment of use of the present systems. Simple displays of the summary of a user's day can be replayed and presented at the end of the day, or when certain pre-determined levels are met, over or under the amount. For instance the system can verify how far the user has walked in a day, and if the level is below the user's desired daily walking distance, it can send the user a reminder after dinner to talk a walk at the distance that will bring the user's daily walking distance to the desired level. Suggested routes may also be presented.

In the future, it is envisioned that the user can display an avatar of the user in a digital format and superimpose this avatar into AR experiences that the user replays or shares with others real time or for replay at a later time. Other's avatars that are in the same contextual environment can also be superimposed into the virtual experience. The MCRM system will capture the initial context; interact with the AR databases and the replay systems to recreate the context experience with the user's avatar inserted. Data collected by the user's mobile hub establishing the user's complete context will be collected and used to re-create the contextual situation of the user and display on the avatar.

A user's current context can also be defined by the user's location. There are numerous means to define and record this, and the solution is not dependent upon any specific method.

One specific embodiment of the solution can create hyper sensitive locations of the user. By having a controlled environment that has been pre-recorded and defined by the MCRM system, numerous specific Wi-Fi beacons in highly accurate locations, can be used to precisely locate the user in that specific location and context.

One such implementation can be used to determine if a user wearing a connected device is sitting in the passenger seat or driver seat of a vehicle. The vehicle will have predetermined beacons installed either from the factory or installed at a later time. For instance, the specific vehicle Wi-Fi signature will be recorded and retained by the MCRM. Once the user enters the vehicle environment, the mobile device will receive the foot print of the signals and make a match to locate the device. If the user is in the driver seat, certain functions can be enabled, other disabled. For instance, if the device is AR glasses or contact lenses, the display can present the driver directional and other information in an overlay fashion. Likewise it will disable tactile input such as keyboard texting, and replace it with voice input only. Furthermore, if the user is a passenger in the car, tactile information will be accepted as input and vehicle information disabled.

As the user is moving about in the physical world, the user's context will constantly change. The user can use the MCRM to specifically record certain aspects of the context and share it with others. One such embodiment is to place a tag on the specific location a user is in, and then share this location with others either directly to one other person, or to that person through social media, or share with a group of others. This can be used for social interactions, but also for military, special forces, law enforcement, disaster relief workers where there is a benefit to let others know your location.

Interiors, other surroundings and environments can be enhanced with AR overlays. These can be educational in locations such as museums, or at entertainment in places such as movie theaters, venues, bars and restaurants, informative in hotels, casinos and shopping malls, or encouraging, relaxing or stimulating in private homes. The AR overlays will adapt to the user entering into the environment and enhance the context that the user is in. The AR overlays will also change based on time of day and the objective of the AR experience. In a retail environment, the AR enhancements can be used to encourage sales of specific products. In museums the AR can highlight specific art pieces with information that is not interfering with the physical presentation of the piece of art.

Another embodiment is use for live performances such as concerts, circus acts and theater performances. Aspects within the performance such as props, stands, displays, mannequins, statues, dolls can serve as AR markers and pre-recorded acts can be superimposed on them during the performance. This can be AR overlay that is common and seen the same way by all in the audience, or it can be customized to be randomly displayed or specifically presented based on the end user's demographics such as age and or gender. The theater or venue that the live performance is in can also be enhanced with AR superimposed content that can be same for all the users in the audience, randomly presented or customized for specific audience members.

Certain locations can be enhanced with contextually specific features. One such example is an AR experience that enables and enhances betting and wagering within horse race tracks or casinos. Offers that are specific to such locations can be automatically presented to users that are in such a context and have a desire to receive them.

Within other venues, behavior that is beneficial to the venue can be rewarded. Loyalty programs, special front of the line entrance and other VIP treatment can be awarded to users that are in the context and promote to their social network that they are there. Should their friends respond in a way that is beneficial to the venue owner, such user will receive the benefits, status and loyalty rewards.

As the user moves through the physical world, the context will be recorded by a variety of sensors. In the future, it is anticipated that the complete environment can be recorded including sounds, ambient noise, visual and audio experiences, smell, temperature, light levels, wind and breeze, and that this complete context can be recorded. Once the user enters an environment where there are control systems that can control the environment, this information can be used to control and re-create the context in this new environment.

Users that have large social networks and have become known to be social influencers will receive a specific status. Upon entering a context location where the owner of the location desires to reward social influencers, the MCRM will automatically reward and entice the user to share and promote the experience. The MCRM system will reward the user based on success or number of messages, invites, blogs, links, "likes" etc. and the user may in some cases receive free merchandise and products.

The presently described system accept current mobile device user control interfaces without depending on any specific methodology. In the future, controlling the devices and their interface will be achieved with gestures of arms and fingers as captured by a variety of gesture recognitions systems. Other methods include body tracking and eye tracking as means for controlling the communication devices.

The present inventions include a simple way to control the communications a user would like to receive at any time. One such features is that by placing the device with the display facing down, the device will recognize this as an input and command to not be contacted except in emergencies. This can be used when the user is in a meeting and does not want to be disturbed with messages, offers or calls. This desired state of "do not disturb" will be retained by the MCRM and messages and offers will be placed on hold until the user changes the mode of the phone.

The ability to record video in 3D and display video in 3D on mobile devices, AR glasses and contact lenses is also be enabled and supported by the solution. By capturing an event or person with a 3D camera, the context associated with that recording will also be captured. Once replayed by the person making the recording or anyone else the user wants to share this with, the 3D replay will also replay the context and display this in the manner a connected context replay system will be able to display and recreate the context.

The application is a complete system and communication solution. It is envisioned that it will be used by numerous entities under their brand names in a variety of business arrangements such as "Platform as a Service" (Paas), "Software as a Service" (Saas) and or "Mobile as a Service" (Maas). It can also power a new ways for institutions, unions, sports leagues, schools, political parties and clubs to drive sponsorships and fund raising. By creating a simple AR game or experience that can be customized for the entity, the entity can have its teams, supporters and or members sell and promote the sale of the application through the variety of means an app can be sold such as Apple's "App Store" and Google's "Play". A portion of the sale will be allocated to the entity. In-application sponsorships, advertisements and sales of digital goods will add revenues to be shared by the creator, publisher and the entity. In addition, the fund raising entity's membership can bring in local retailers, restaurants and merchants that want to present offers and coupons to the entity's membership creating a loyalty program between the location's patron's and customers, the patron and the fundraising entity.

The way to commercialize the system can be a combination of pay for service levels. These can include the cost of developing the front end applications on a mobile device, then and additional fee to connect these applications with the MCRM system. Whenever a message, information, offer, coupon or advertisement is sent from the MCRM system, a fee will be collected from the company sending the message. If the message is opened and viewed by the user, the system will recognize and record this and another fee will be collected by the sender of the message. If there is a call to action embedded in the message and this is acted upon, the system with recognize and record this and another fee is charged to the sender of the message. If a user enters a location that is owed by a client user of solution as a result of the clients use of the system, this is consider a proof of presence event and the MCRM system will recognize and record this event, and the client will be charged another fee. Should the communication presented and initiated by the system result in a sale, a portion of the sale will be paid to the operator and owner of the solution. The management of and use of the system can also be charged as a fee to the clients using the system to communicate with their end users. The use of the system in specific geographical areas or within specific vertical markets can also be arranged to be a "master license" arrangement with associated usage length of time compensation. It is envisioned that end user will not be asked to pay for any of the services, solutions or offers they receive.

The presently described systems can be used by organizations that have subsidiaries, franchisees or sports leagues that have teams under their umbrella management. In the case of a franchise operation, the back-end system can be programmed so that the franchisor controls the complete solution. They can drive and manage national or global marketing efforts and promotions from their master dashboard control system of the MCRM. These efforts can still be based on locations and context awareness and can be specifically targeted to user segments or locations, or sent to the whole user database that is under the corporation. Local franchisee owners and operators may have access to a lower level set of data displayed on their own unique database dashboard interface. This will be limited in its ability to deliver messages to their specific geographical territory they have approval to communicate within. The master franchise operator will be able to monitor, assist, encourage and stop messages and content delivered by the individual franchisee operators. One such use case is a national fast food chain that will use the master dashboard to access every person who has downloaded and used the application on their mobile devices. Nationwide advertisements will be displayed and managed by the franchisor. Local marketing campaigns that are specific for a region such as warm coffee to owners in Idaho during winter and milkshakes to operators in Florida during the same time frame can thus be operated, performed and managed by each franchise operator with oversight by the franchisor company. Another use case is a national or global sports league that has teams in specific locations. The master control of the back-end system with access to all the members regardless of team affiliation or location lie with the sport league owners. The owners can thereby send nationwide or global messages, sponsored content and ads to the whole universe of fans, regardless of their physical geographical location and or team affiliation. Individual teams will have access to limited set of functions of the MCRM system via their dashboard interfaces that are restricted to their geographical area, with the ability to reach their proven fans that may reside or travel outside their geographical area.

The system can be used to drive sales by retailers, manufacturers of products, creators, enablers and owners of content, owners and operators of venues, hotels, malls, offices, restaurants, night clubs, sport teams and leagues. It can be used to create loyalty for sport clubs, musical and theatrical actors and performers as well as their management and distributors. It can be used to entertain by broadcasters of TV programs, video and movie producers. It can be used by advertisers, advertising agencies and marketing companies. It can be used by publishers of printed materials such as magazines, publications, periodicals, newspapers and greeting cards. It can be used by designers of product packaging and retail store environment. It can be used by interior decorators, architects and designers. It can be used by local, state, federal, domestic and foreign governmental management of cities, states and countries. It can be used by government agencies such as police, military, disaster and first responder personnel and agencies. It can be used by educators, creators and publishers of text books, educational agencies and institutions. It can be used by sport teams, leagues and sport venue and event owners. It can be used performers, actors, athletes, politicians. It can be used by medical institutions, doctors, pharmaceutical and producers of other heath products. It can be used by corporations, employers and agencies. It can be used by creators and developers of technologies, sport equipment, real estate developers and manufacturers of vehicles and other mode of transportations.

The solution relates to a contextually intelligent communication platform (CICP) system and a variety of methods for its use. In one aspect the CICP is used for acquiring information from various sources to facilitate a recognition of one or more objects or images using sensor data transmitted to an augmented reality (AR) system mobile application software and/or an image recognition (IR) mobile application software. Using the camera of the mobile device with the AR and or IR application and the device's camera, the recognized image or object is matched with an existing data file for a known image or object residing in an image/object server in the cloud. A server in the cloud is herein defined as a computer server located elsewhere, hosted and managed by someone else such as Amazon's web services. The AR system of a CICP can be used as a method for delivering an augmentation to a user of the CICP. An Augmentation is the overlay of a digital experience such as an animated or still 3-D model, an animation sequence, a video overlay, link to another website or information superimposed on the AR target as seen on the mobile device display screen. Several sources for an AR system are known. One such AR software is Vuforia™ (Qualcomm, Inc., San Diego, Calif.). IR solutions can be used to recognize an object, match the image with a known image in the cloud based image server and present an overlay of information superimposed on the image and displayed on the mobile device display screen. Several commercially available IR solutions exist including "Gimbal" offered by Qualcomm Labs, Inc., San Diego, Calif. In one process of the present solution, a user of a connected device receives and feeds data from one or a plurality of sensors that share relevant information with the user and a contextually intelligent server in the cloud. A connected device is a hardware including a Smart phone, a tablet, a computer, a laptop, AR glasses or contact lenses, and the like. Such hardware may be connected to a communications system such as for example, the internet, satellite communications, mobile telephone systems, Wi-Fi and the like. The presently described systems and processed, also referred to as the "solution" can process various information obtained from the sensor activity(s) including for example, a location, a time, an activity, a speed and direction of travel, an anxiety level assessment, a social media status, a gender, a relationship status, an ambient sound or a light level, an air quality, or various other environmental aspects of the user. The gathered and shared information flow is an intelligence activity of the CICP which processes a plurality of data files relating to a contextual environment of the user of a connected device. The information acquired by the CICP about a particular user has immediate and future benefits for that user of the connected device. The contextual environment of a user of a connected device is defined for the present invention as the environmental circumstances that form a setting for an event, a statement or an idea for the user and in terms in which the user's environment can be understood and assessed by the user. This includes discovery of other devices and people in proximity, detection of any sensor system embedded in the physical world around the user, any sensor system worn or embedded in other persons or other devices or equipment. It also includes the time, day and location as well as the activity the end user is currently engaged in. For the present solution the contextual environment of the user of a connected device is termed a context bubble. The context bubble of a user of a connected device influences the user as a bubble of influence. As others people or devices enters this contextual bubble of influence, either by them moving into it, or the user movement so that his bubble of influence encompasses the new entity(s) within the bubble, these will be detected, acknowledged and contact established when appropriate.

In a second aspect, the CICP is used as a method for predicting a future contextual environmental setting for the user of the connected device.

Figure 2:
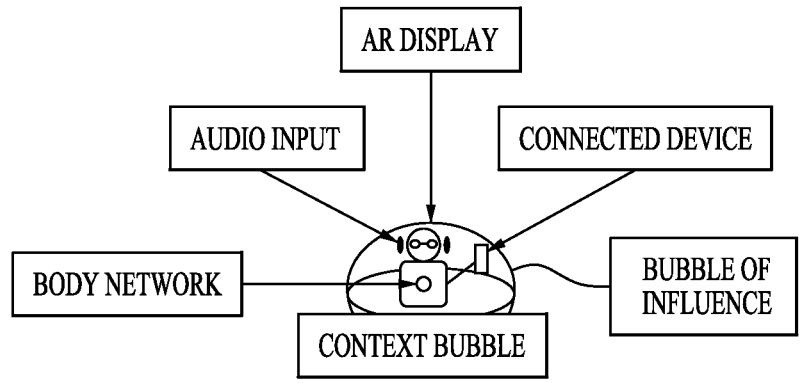
FIG. 2 is a schematic representation of the FIG. 1 showing preferred exemplary connected devices.
Figure 3:
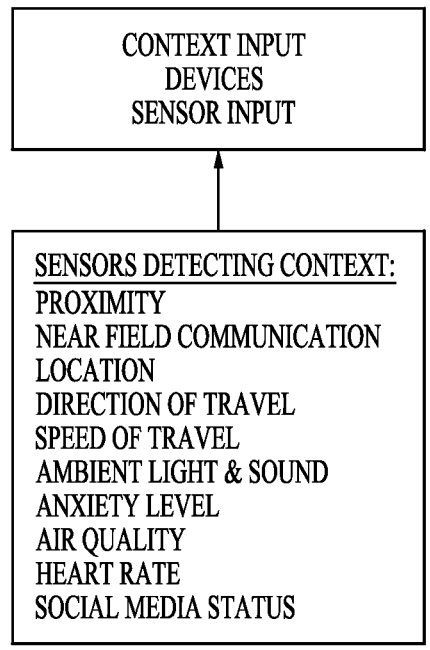
FIG. 3 is a listing of exemplary, preferred categories of variables and information that may be collected and used to determine current context for the FIG. 1 context bubble.
Figures 4, 5:
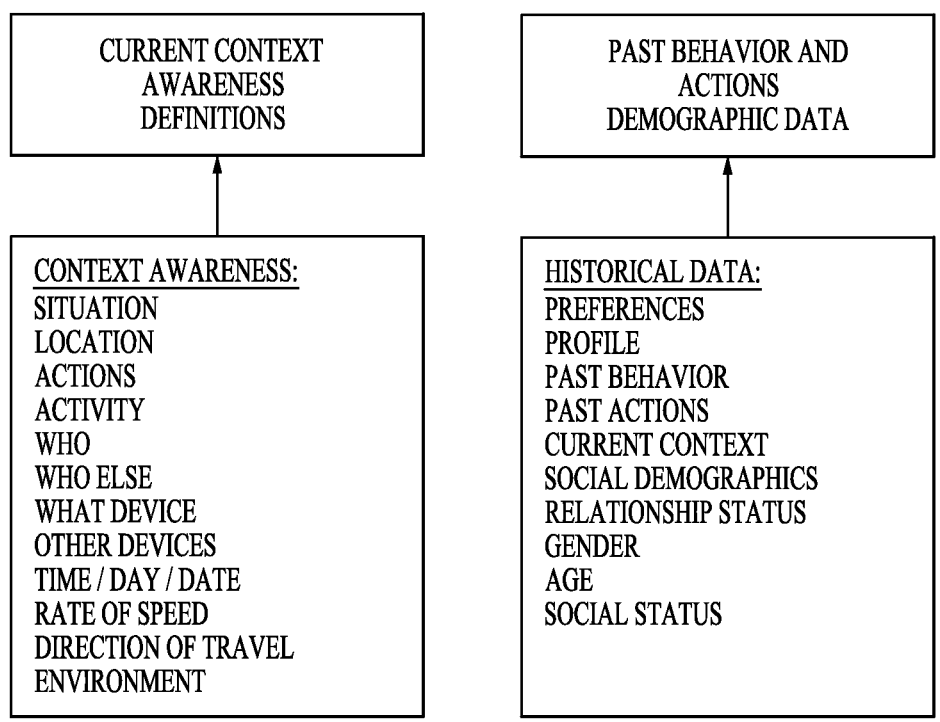
FIG. 4 is a listing of exemplary, preferred categories of variables and types of information that may be collected and used to define the current context and create current content awareness.
FIG. 5 is a listing of exemplary, preferred categories of variables and types of information that may be collected and used to determine past behavior and action.
Figure 8:
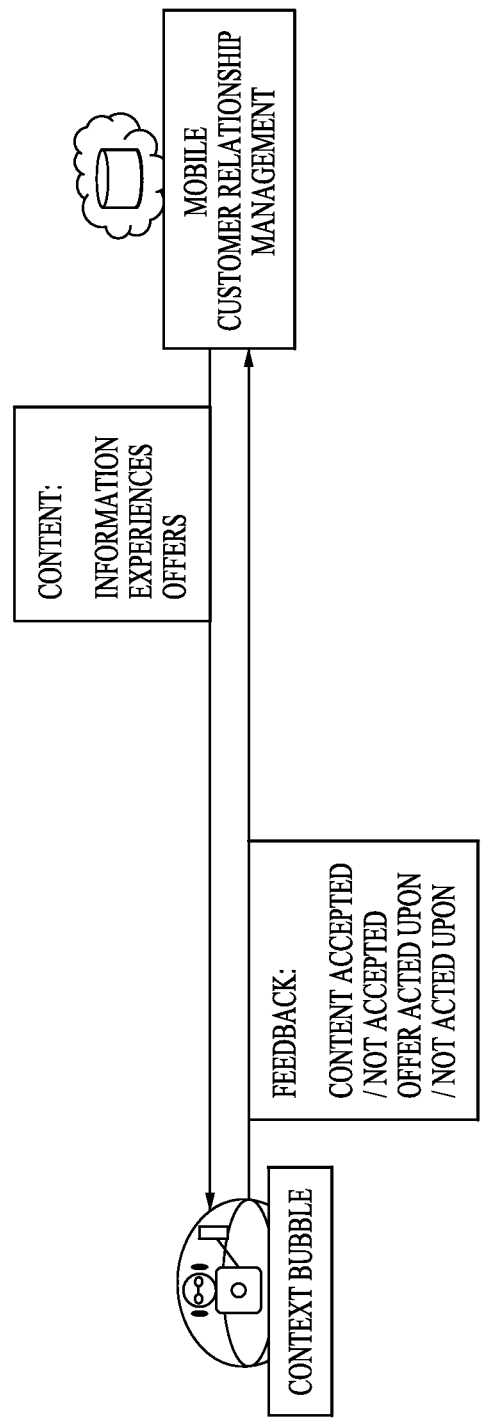
FIG. 8 is a schematic presentation of delivery of content from a cloud based customer relationship management system to the FIG. 1 context bubble with a feedback loop to determine the usefulness of the content delivered.
Figure 9:
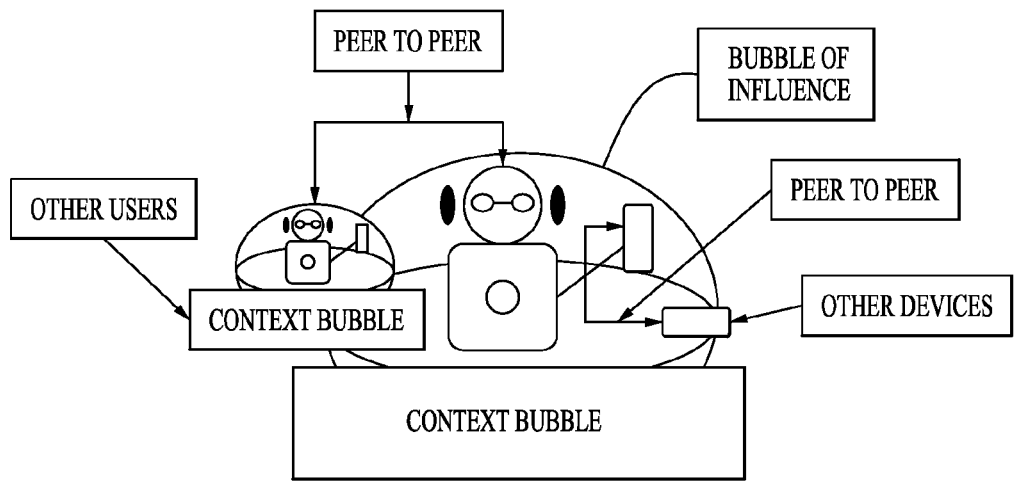
FIG. 9 is a schematic presentation of two users who are connected with each other at the intersection of their respective context bubbles and how devices that are in their context bubbles, respectively can establish peer-to-peer communication.

An example of a CICP system of the present solution is depicted in FIG. 1 to illustrate its possible eco-architecture comprising a plurality of data processing stages in boxes functionally labeled and having a plurality of data transmission connections, in this example, numbered 1 to 10. A user can have a connected device such as a smart phone and may have a combination of other additional sensors and connected devices such as glasses that are AR displays, headphones or other sensors that transmit sound—audio input and a body area network (FIG. 2). A mixture of interrelated sounds, images and sensory data experiences creates a context bubble around the user and the context bubble becomes a bubble of influence of the user, FIG. 2. The context bubble stage is depicted in FIG. 1.

In FIG. 1, various devices within the context bubble stage send data to a context input devices-sensor input stage using connection 1. Context input devices—sensor input data is sent and translated to a current context awareness definitions stage using connection 2. Past behavior and actions-demographic data stage may be created using matched information sent using connection 3 and connection 4. Data matching between a current context awareness definitions data and a historical and demographic data, results in data being sent from the historical data and demographics database using connection 4. When historical data matches current context awareness data, then the match data is sent to predict and present definitions stage using connection 5. Predict and present definitions data is presented as a mobile customer relationship management (MCRM) system stage in the cloud using connection 6. In FIG. 1 the MCRM system in the cloud will then bring in relevant content or information data from the content and experiences database stage in the cloud using connection 7. The MCRM will then present relevant content or information from the content and experiences database (CED) in the cloud to the user of a connected device in the context bubble using connection 8. The result of presenting the relevant content or information from the CED to the user is reported back to MCRM using connection 9.

FIG. (3) depicts some of the sensors, variables and information that may be collected and used to determine the current context in FIG. (1). FIG. (4) depicts some of the variables and information that may be collected and used to define the current context and creating current context awareness in FIG. (1). FIG. (5) depicts some of the variables, input and information that may be collected and used to determine the past behavior and actions in FIG. (1). FIG. (6) depicts some of the variables and questions that may be posted, collected and used to determine the predictions and what to present next in FIG. (1). FIG. (7) depicts some of the content, experiences and information that may be gathered, stored and used on the content and experiences database in FIG. (1).

The solution then calls for this real-time contextual information about the user's present and current context to be used to determine contextual awareness for the user. This contextual awareness includes information such as the user's current situation, location, activity, actions, motion, speed of travel, direction, time/day/date, who the user is—with either a fully personally identifiable tag if the user has opted in to the service—or via a not personally identifiable tag if the user has not opted in—as well as who else is in the user's proximity and/or what other devices is in the user's proximity. This can be provided by technologies such as "Gimbal™" as provided by Qualcomm or other context aware solutions and/or a combination of use of augmented reality and image recognition systems see FIG. (3) for various sensor input and information that can be used to detect context further than described and depicted in FIG. (10).

Some current communication solutions based on location based technologies rely on GPS and other methodologies to determine a user's location. Others require manual "check-in" at locations to "tag" and identify the user's location. This solution combines all of the above with real time contextual knowledge such as the user's activities, situations, mood, preferences and past behavior and preferences and does not rely on the end user actively "check in" or "tag" their location. The solution combines all the information to deliver content that is contextually relevant to the user, real time, to the user's mobile device and/or other connected devices the user may have and or wear. The solution can use technologies such as Vuforia™ as provided and developed by Qualcomm, or other similar augmented reality solutions such as provided by Aurasma™, Stringar™ and/or Layar™. The input, content, information and devices used in the system are depicted and defined in FIG. (3), FIG. (4), FIG. (5), FIG. (6)

The ability to monitor, verify and measure a user's activity and interaction with a predetermined object and or image through the use of image recognition and/or augmented reality on the user's mobile device and or other connected devices the user is using or wearing provides the owner of the image and/or object information about the end user's interaction with the image and/or object. The solution monitors these interactions real time and may make the information about the interaction such as the length of engagement, location of engagement, as well as subsequent actions after the interaction available to the owner of the image and or object. This is shown in FIG. (10) where a connected device with a camera such as a smart phone, a tablet computer with a camera such as an iPad2™, or future devices such as augmented reality glasses and contact lenses that has image recognition software solution installed. The solution architecture provides for selected images to be distributed to visual displays such as TVs and computer monitors where the content can be broadcast TV, DVDs and/or videogames with sections or all of the imagery on the screen is known and stored on the target database FIG. (10). This is shown as connection FIG. (10) "1". The device will match the images in connection FIG. (10) "2" and seek a match with known images on database FIG. (10) as shown in connection FIG. (10) "3". Once a match is made, the target database FIG. (10) connects with augmented reality database FIG. (10) which contains the augmented reality experiences that will be delivered to the device and displayed on it as shown on connection FIG. (10) "5". The uniqueness of the innovation is the connection FIG. (10) "1" with the known content displayed on the visual display and how the recognition of content delivers new content from the AR database server to any connected device with a display that enables playback of augmented reality content. It has thereby created a connection between the broadcaster or creator of the video, TV or movie content, publisher, advertiser or marketer of the printed material and/or the owner, creator, distributor, and/or retailer of the object directly to the user of the device.

Figure 10:
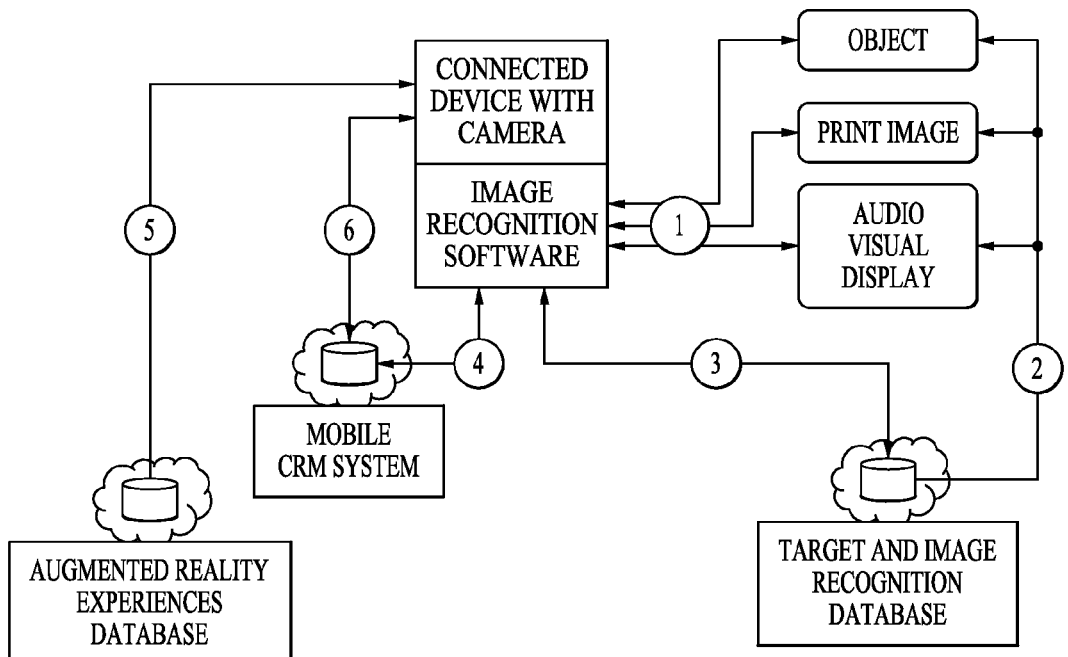
FIG. 10 is a schematic presentation of a mobile communication device with installed software that enables image recognition through its camera and how this can establish and verify that the user of the mobile device is interacting with a real life object, image or video/audio feed that is pre-captured and stored in a cloud based target and image recognition database, while connected to a cloud based or in a device-augmented reality experience, and that the whole experience and activity is recorded, reported and captured on a cloud based customer relationship management system that may be integrated with the FIG. 1 embodiment.
Figure 11:
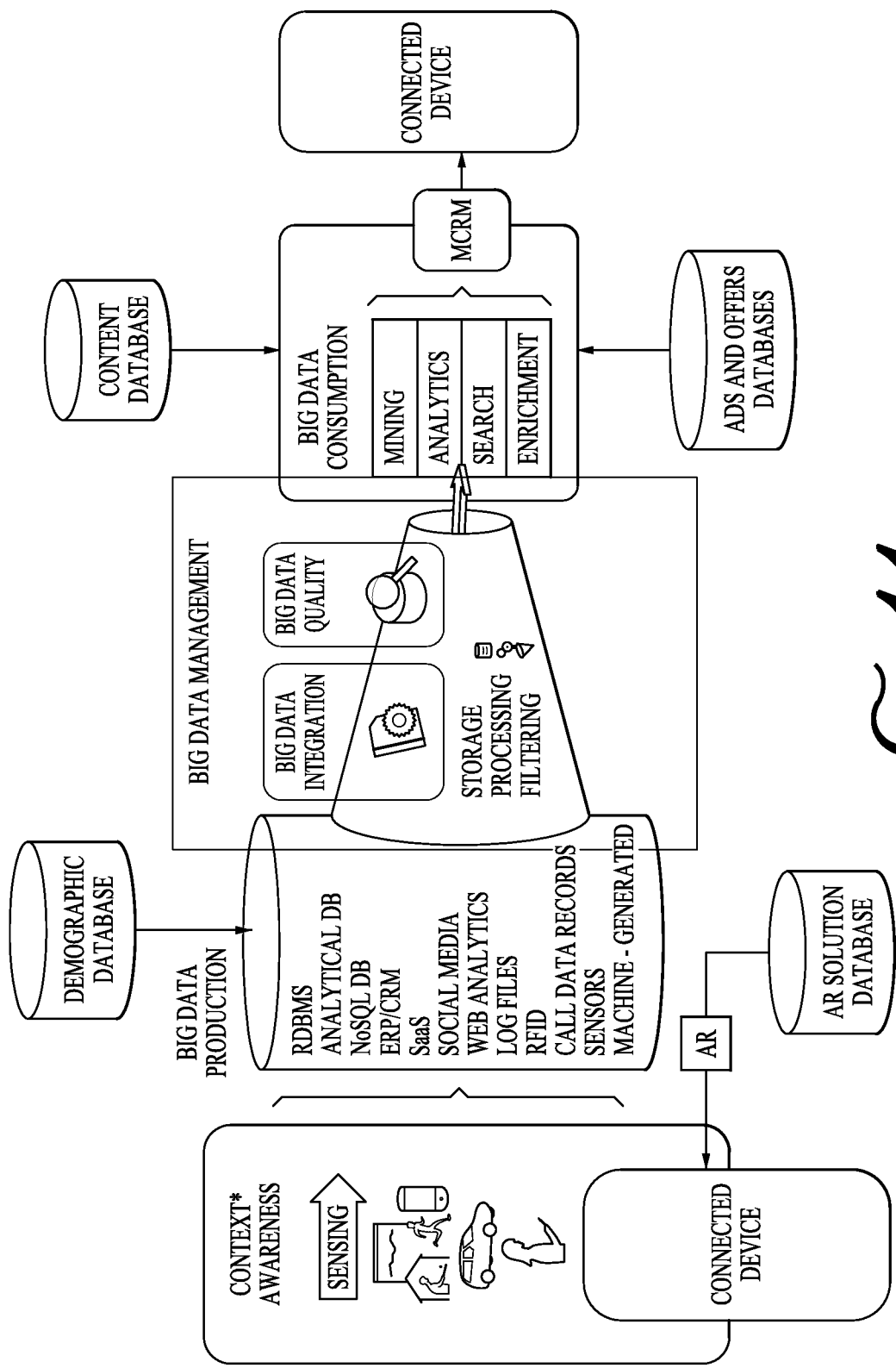
FIG. 11 is a schematic presentation of an alternate embodiment communication system and information flow process that captures context information on a connected device, combines an augmented reality overlay displayed on the device and superimposed on a product, aggregates and reports this information from the mobile device to a cloud based database system that combines analytics, storage, processing and filtering, combining demographic past behavior data, combines this and match it against relevant content, advertisements and offers into a mobile customer relationship management system that mines, analyses, search and enrich the data, then based on the collective information presents relevant content back to the connected device.
Figure 12:
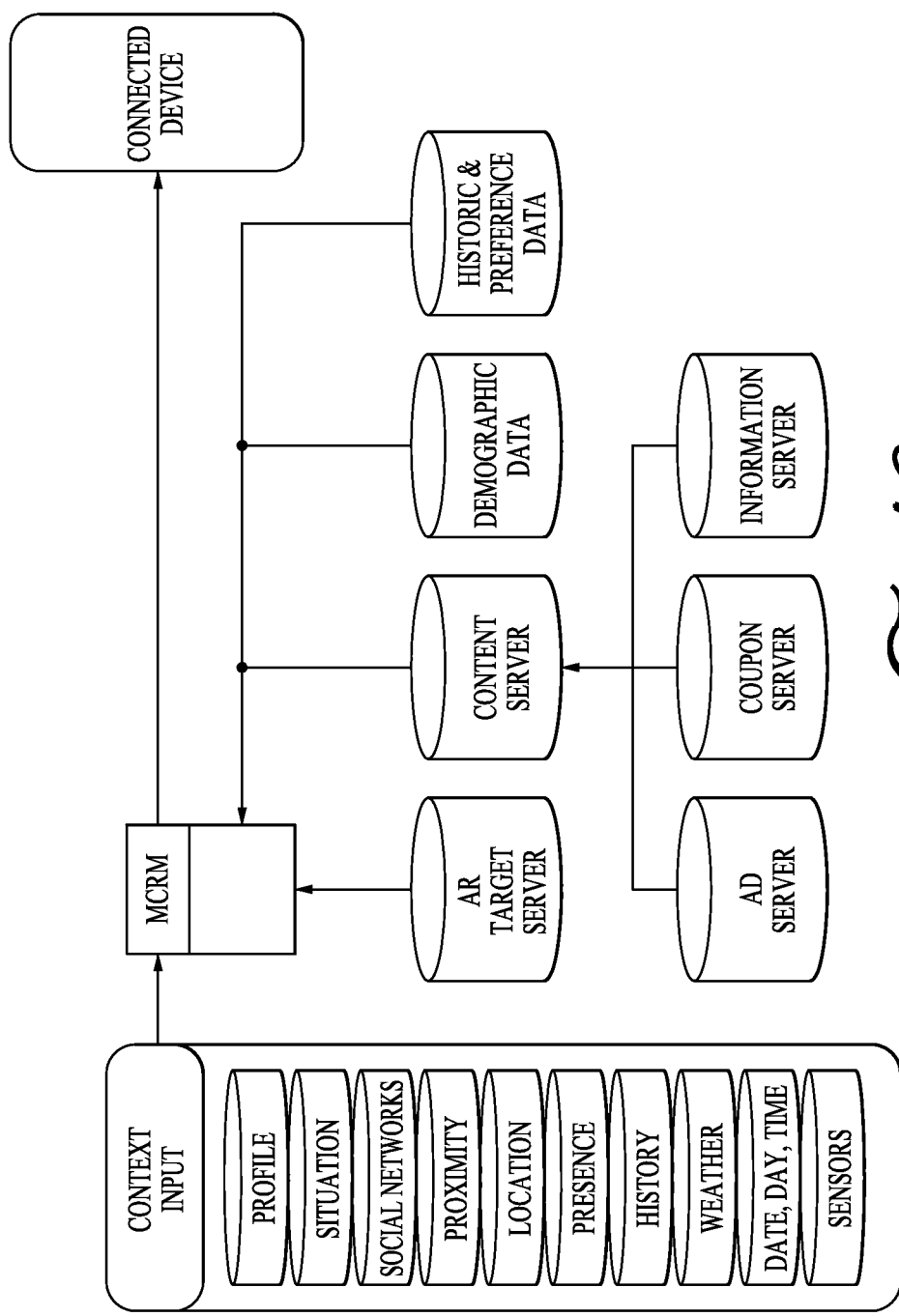
FIG. 12 is a schematic presentation of preferred system that includes exemplary servers that report to the mobile customer relationship management system including the context input detected, recorded and reported from a connected device and then how the augmented relationship target database server, content database server, demographic and historical database server and the past and inferred historical and preference database server provides input to the mobile customer relationship management system, and the content server is presented information and content from advertisement database servers, coupon database servers and information database servers, and how a preferred mobile customer relationship management system combines all of the above to present the relevant information, content and offers directly to a specific mobile device.
Figure 13:
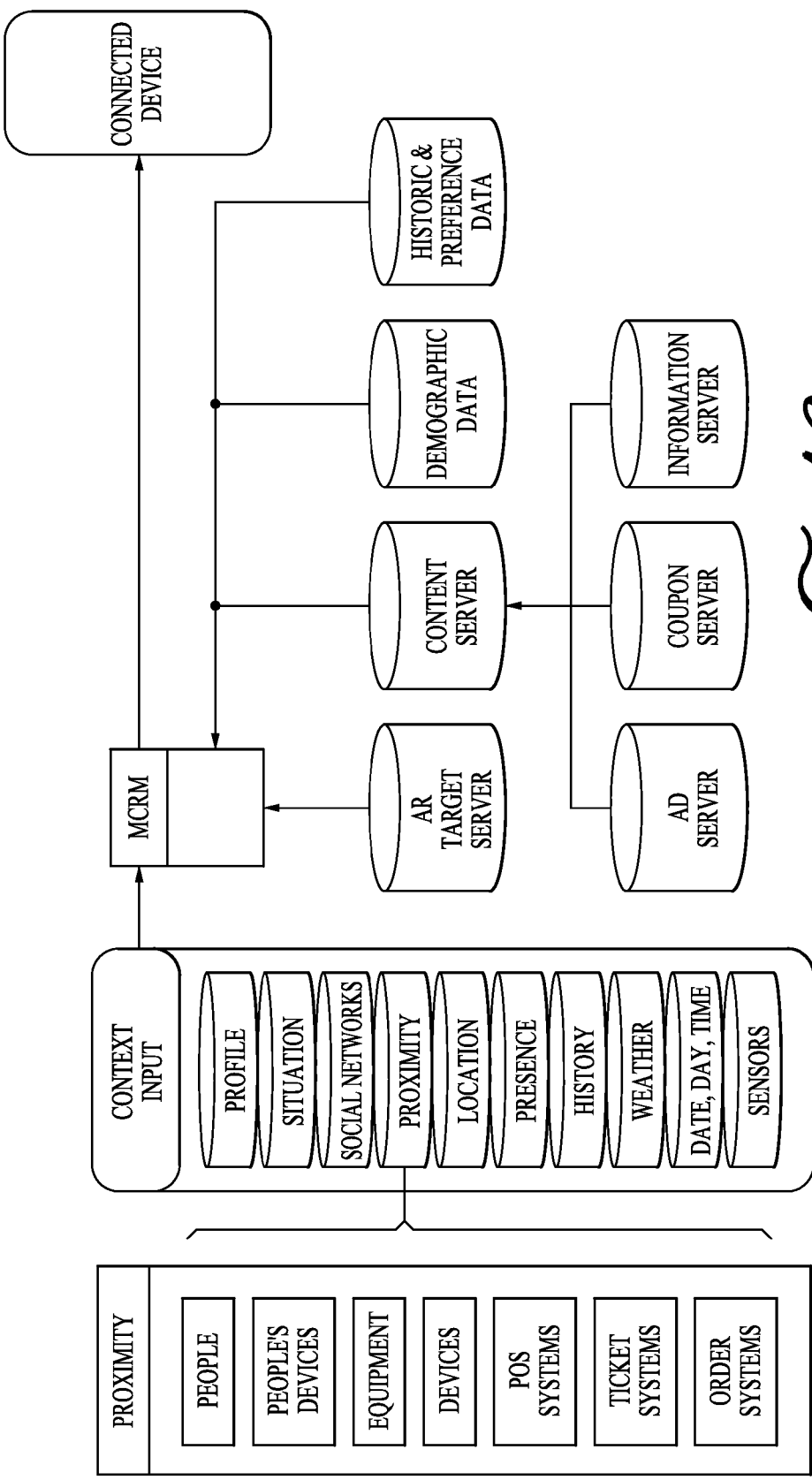
FIG. 13 is a schematic presentation on how the FIG. 12 system interacts with other devices, people, other people's devices, equipment, point of sale (POS) systems, ticket and order systems to deliver content, offers, services and information that is relevant to the mobile device and the items listed that is in its proximity.

It has been recognized that the ability for advertisers, marketers and publishers to monitor interactions with their marketing and advertisement material and images, the owner and/or manufacturer of a product the ability to monitor the interaction between an end user and their products, the ability for the creators and distributors of visual content such as TV broadcasts, video games, mobile applications, web sites and feature films, to verify and identify who is watching and consuming their visual content, that this ability to measure, verify, prove and replay the end user's interactions, is very valuable. This solution enables the advertisers, the marketers, the publishers, the product owners and manufactures, the creators and distributors of video games, TV programming, movies, web sites and mobile apps the ability to do so. FIG. (10) shows how the image recognition software installed on connected devices with cameras such as smart phones, tablet computers with cameras and connectivity and future devices such as augmented reality glasses and contact lenses can provide this as a use case using the invention's architecture. The device's camera is controlled by the image recognition system and will look for a match on objects, printed materials and/or on audio visual displays of video, TV or film content—connection FIG. (10) "1". The Target database FIG. 10) contains the predetermined targets, presents and matches these connection FIG. (10) "2" against the images detected by the device FIG. (10) "3". The Mobile CRM system FIG. (10) is alerted when a match has been made—connection FIG. (10) "4"—and when the Augmented Reality experience is superimposed on the device—connection FIG. (10) "5". The Mobile CRM system FIG. (10) will then connect with the device—connection FIG. (10) "6"—and record contextual information such as the target that the user is interacting with as proven by connection FIG. (10) "1", then log other context such as time, date, location and length of the engagement with the recognized target. Additional contextual data as defined in FIG. (3) and FIG. (4) may also be collected by the Mobile CRM system FIG. (10) "B". There is wide use for the invention as a communication platform as shown in FIG. (17) where an ecosystem of clients, users and use cases are depicted.

Figure 19:
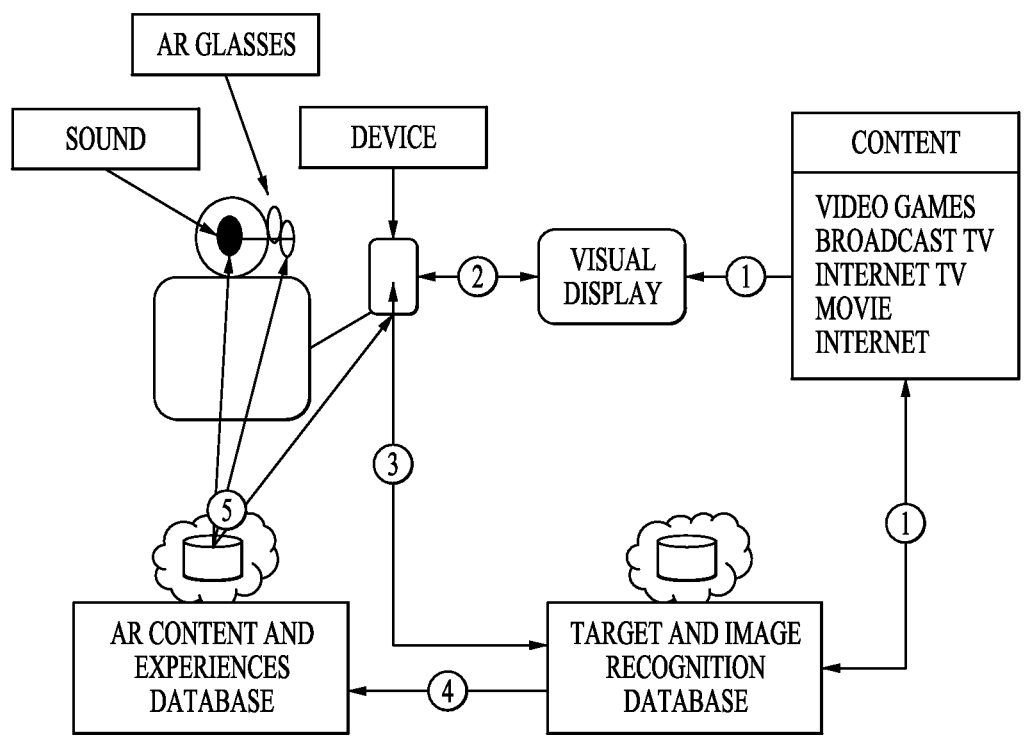

The solution also enables automatic proof of presence where the effectiveness of marketing and advertising campaigns in print and elsewhere that contains images, visual marketing campaigns such as TV commercials, movie trailers, call to action offers, mailed coupons, advertisements in newspapers and circular as well as coupon delivery to the user's mobile device through all delivery mechanism, can be verified and proven without the need for the end user to actively "check-in" to a location. The methodology described can be repeated and used for this purpose as well. FIG. (19) shows how a location FIG. (19) can create a geo fence via a radial virtual fence around its location by defining a radius FIG. (19). This geo fence will in the future be possible to be created in other shapes than a circle around a location. Once a known user with a defined context bubble FIG. (19) enters this geo fence FIG. 19), a notification is sent FIG. (19)—"1" to the mobile customer relationship management system FIG. (19). Once this alert has been matched, the mobile customer relationship management system FIG. (19) searches for the relevant information FIG. (19)—"2" on the content database FIG. (19) to present to the end user.

The solution also calls for a self-learning feature by providing feedback that describes whether a contextually relevant offer presented was acted upon or not. Determining what worked and what did not, the system brings this information back into the past history database. Once a similar context is detected, if the original content presented was proven to provide the desired result, it will be presented again. Conversely, if the original content did not provide the desired result, other content and/or offers will be presented that are still relevant to the user's context. FIG. (14) shows how the results of the content that has been presented to the device from then mobile customer relationship management system (MCRM) FIG. (14) has a feedback loop FIG. (14) that measures the actions taken on the content such as offers accepted or rejected, whether invites, offers or coupons have created the desired result and made the end user go to the desired location and thus creating a proof of presence FIG. (14). The results, both positive and negative, are reported back to the results database FIG. (14). The results are then reported to the current preference database FIG. (14) and then reported as historical demographic data back to the historic and preference database FIG. (14) that is feed to the mobile customer relationship database—MCRM—FIG. (14) thus creating a complete feedback loop and a self-learning system. FIG. (8) shows content FIG. (8) sent to the end user's devices FIG. (8)—"1" inside the user's context bubble FIG. (8) has a feedback loop FIG. (8)—"2" directly to the mobile customer relationship database FIG. (8).

The different ways to determine context may involve different sensor input on a wide diversity of technical capabilities on mobile devices, on peer-to-peer enabled devices, on embedded sensors in accessories, clothing, glasses, microphones, headsets, gloves, shoes, watches, tablets as well as embedded sensors in the surrounding environment, devices in proximity and/or in transportation devices. Some may also include the ability to detect hostile environments such as pollutants and or toxins, unhealthy lighting or sound levels, elevated stress and anxiety levels. Other use cases could thereby be envisioned for the solution. As an example, the security capabilities may be of value to law enforcement, homeland defense, military and/or security forces in monitoring personnel or civilians as they are entering hostile environments, or rescue workers entering dangerous areas hit by natural and other disasters. The contextual information is gathered from the various devices inside the end user's context bubble as shown in FIG. (1) connection "1". The contextual information is then transmitted FIG. (1)—"2" to create current context awareness FIG. (1). FIG. (3) lists a variety of sensor input and information that will be presented to the context input devices FIG. (3) to create current context awareness. The solution may use some, all or a variety of these sensor input, and will include future sensor input as they become available or developed.

Different scenarios for communication between the user's devices and the cloud based databases as well as the MCRM are envisioned. Current Wireless Local Area Network (WLAN) as well as LAN such as Wi-Fi is possible. In addition, the ability for the user's devices to connect with other devices in proximity by establishing ad-hoc peer-to-peer networks, Near Field Communication (NFC) protocols as well as other methods such as Bluetooth™ is included. This enables the solution to be adaptable to any future protocols for communications between devices and the cloud based servers and MCRM as well as other sensors and devices in proximity. Multiple commercially available protocols exist for the establishment of the peer to peer connection and subsequent communication such as BlueTooth™ and Qualcomm's AllJoyn™ technology. A scenario for peer-to-peer communication is depicted in FIG. (9). An end user's context bubble FIG. (9) has been created and defined as a bubble of influence, FIG. (9). Another user or multiple users—other users FIG. (9) enter the bubble of influence with their context bubble—FIG. (9) context bubble. Once inside the bubble of influence of the first end user FIG. (9), a communication link is established between the first user and the other users, peer to peer FIG. (9). Conversely, the process is repeated for any other connected device, other devices FIG. (9) that enters the bubble of influence of the first end user, FIG. (9). A peer to peer communication link is then established between the devices, FIG. (9).

Figure 20:
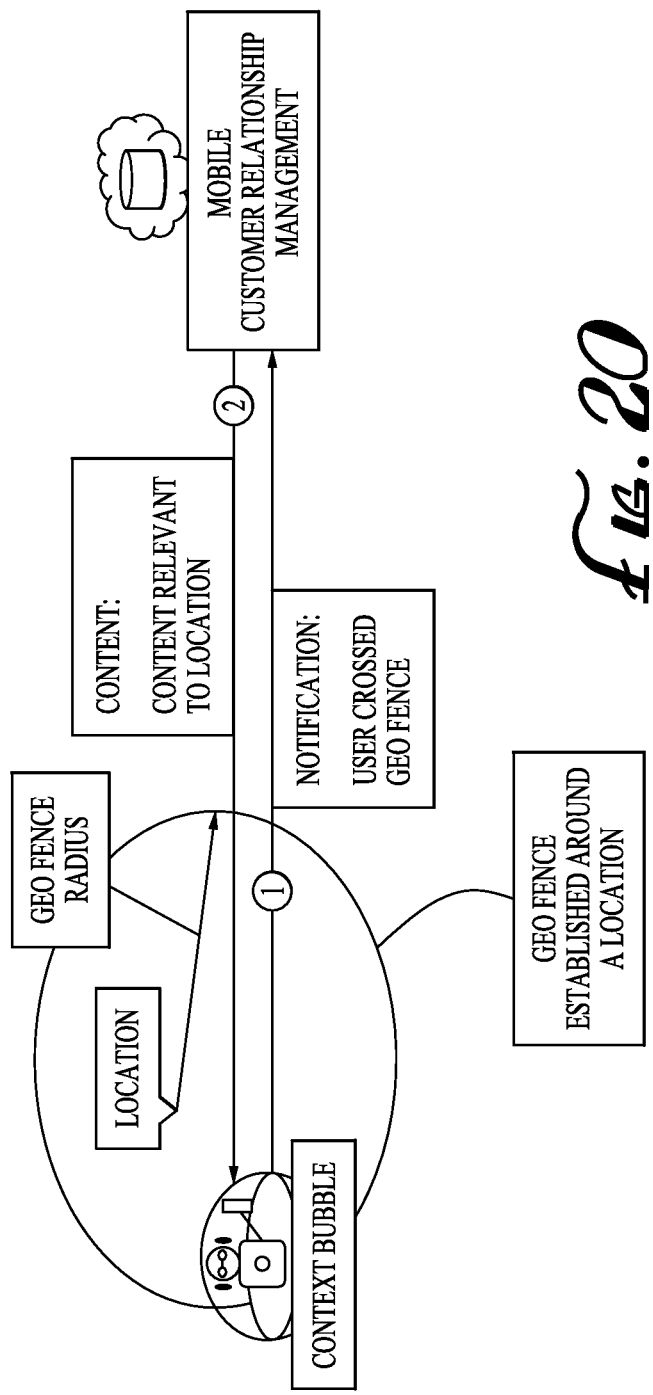
FIG. 20 provides an overview of the user with a defined context bubble as the user enters a location that has established a defined geo-fence and how the event of crossing the border is recorded by the customer relationship management system, which then connects with the content database to present the appropriate content to the user based on the content associated with the location that has established the geo-fence.
Figure 21:
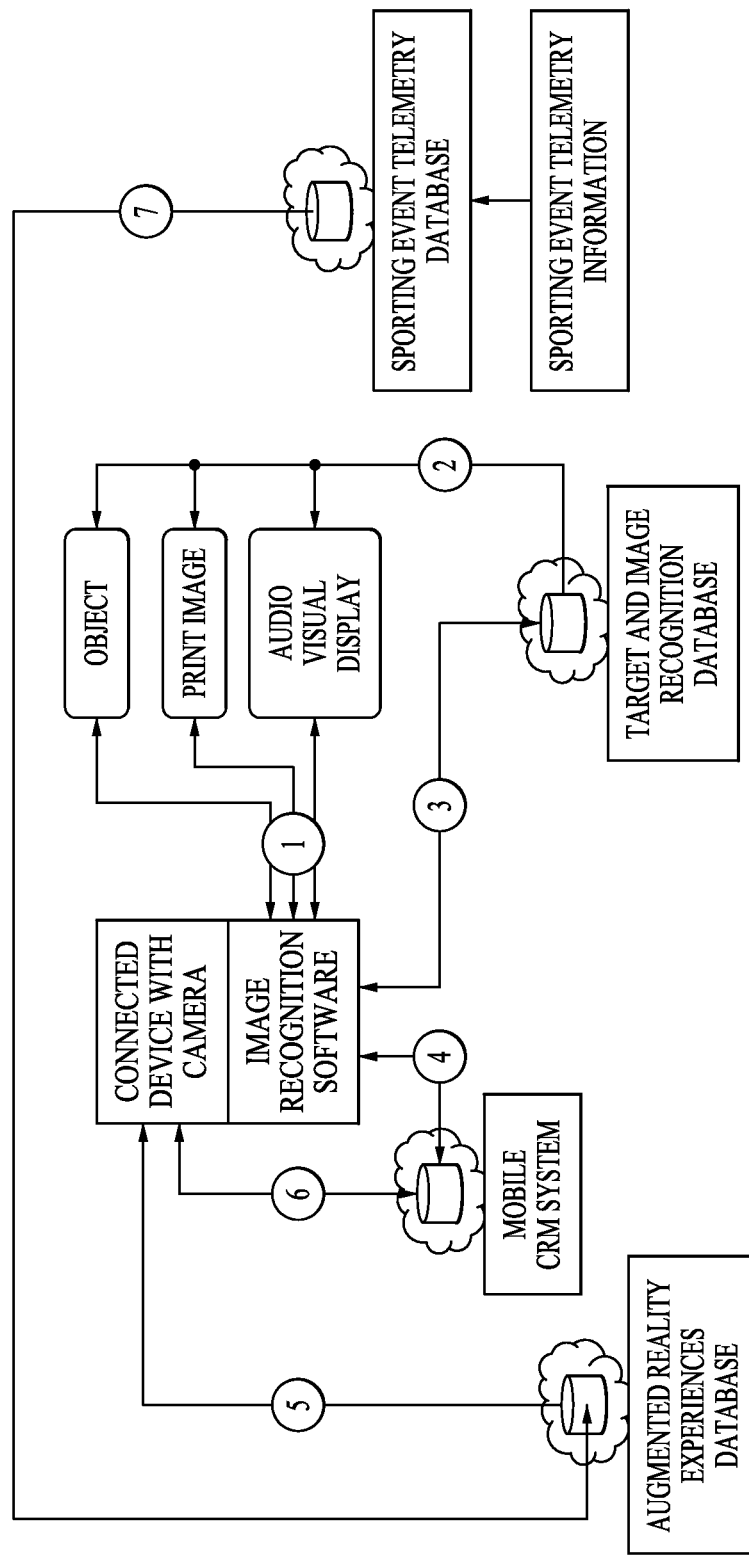
FIG. 21 provides a schematic overview of how the FIG. 10 system is adapted for use to detect, record and report real-life content, images and objects the user of the mobile device and how this can be enhanced by capturing data from a sports event and using this combined information as input to control an augmented reality experience that is superimposed on the content, image or real life object.
Figure 22:
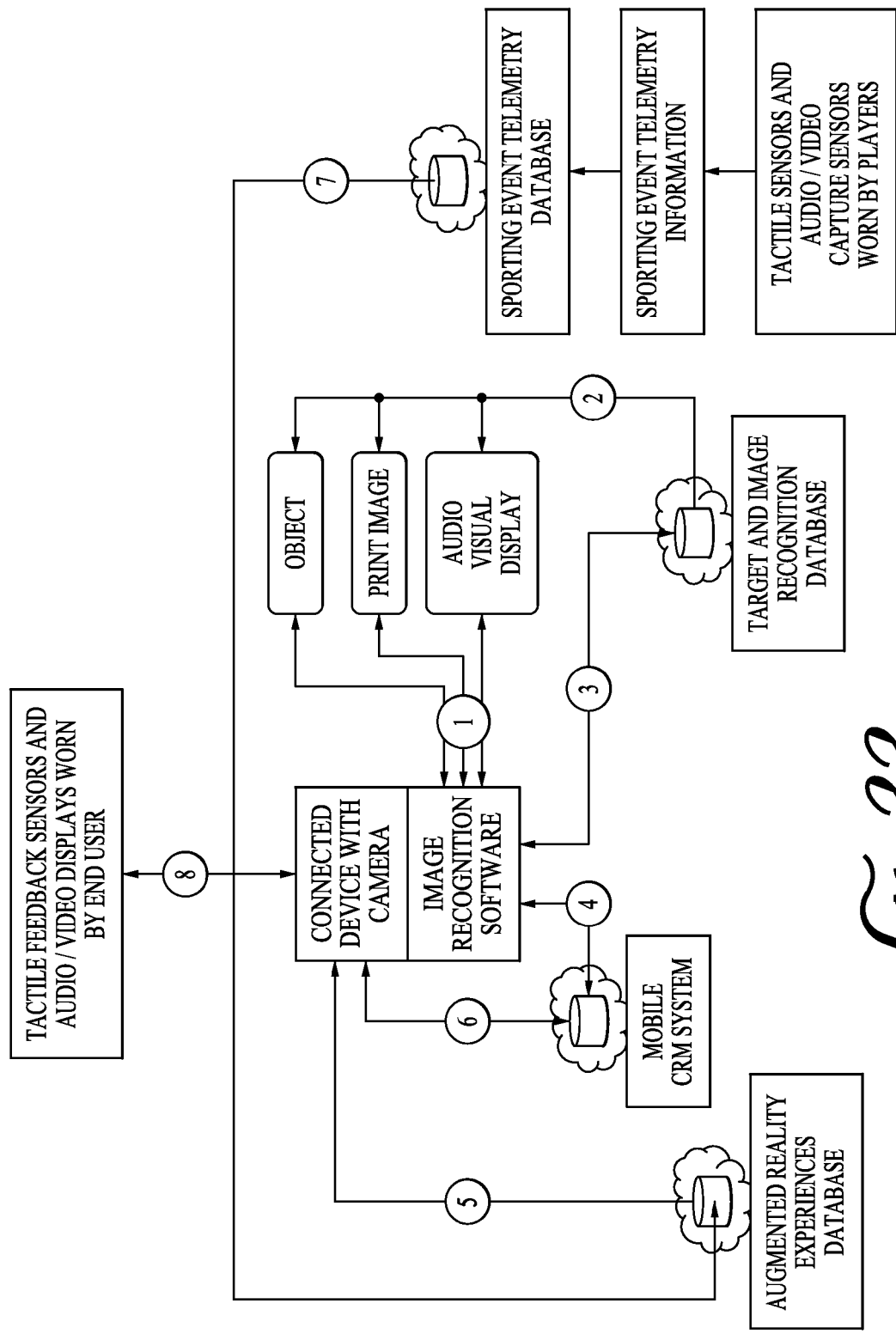
FIG. 22 provides a schematic overview of how the FIG. 20 system is further adapted for capturing information from sensors in a sporting event, sensors on the field and sensors on players, their equipment and protective gear, then gathering this information and providing it as input for playback on devices that can provide tactile feedback to the user of the mobile device and the connected playback devices.

The solution calls for the delivery of content to the user's device to be across multiple methods. The information can be simple push SMS messages, web links, coupon images and simple call to action offers. The information can also be delivered inside video games, AR experiences or other audio visual representations on the user's devices. The information can also be used to control any of the above such as the real time activity of sports athletes and or sporting equipment such as race cars and boats, and/or the real-life ball trajectory of a ball in a sporting game in a stadium. In such a case, real-time telemetry, ball and player tracking, motion traction and other sensor input can be used at the place of game play, on equipment or devices such as cars and boats. In addition, player conditions such as heart rates, hydration levels and more can be collected via embedded sensors, transmitted to a cloud based server, monitored and collected. The data can then be used to control in-game 3D models depicting the actual game play, boat/car motion and telemetry, ball travel and player positions. FIG. (20) depicts such a system. FIG. (20) shows how the image recognition software installed on connected devices with cameras such as smart phones, tablet computers with cameras and connectivity and future devices such as augmented reality glasses and contact lenses can provide this as a use case using the invention's architecture. The device's camera is controlled by the image recognition system and will look for a match on objects, printed materials and/or on audio visual displays of video, TV or film content—connection FIG. (20) "1". The target database FIG. (20) contains the predetermined targets, presents and matches these connection FIG. 20) "2" against the images detected by the device FIG. (20) "3". The Mobile CRM system FIG. 20) is alerted when a match has been made—connection FIG. (20) "4"— and when the Augmented Reality experience is superimposed on the device—connection FIG. (20) "5" with real-time, real life telemetry information collected at the sport event via the sport telemetry information FIG. (20) and presented to the augmented reality experiences database FIG. (20) in connection "7". The data presented from the sporting event telemetry database can be used to control avatars of players and equipment in augmented reality rendering and/or sporting game associated with the sporting event, based on real life actions, movements, speed and locations collected from the real life event. The Mobile CRM system FIG. (20) connects with the device—connection FIG. (20) "6"—and records contextual information such as the target that the user is interacting with as proven by connection FIG. (20) "1", then log other context such as time, date, location and length of the engagement with the recognized target. Additional contextual data as defined in FIG. (3) and FIG. (4) may also be collected by the Mobile CRM system FIG. (20).

The solution calls for the content to be displayed when the user is in the right context, not only location. Hence, information about a specific sporting game with information such as score, player and ball locations, trajectories, activities, player conditions can be delivered to fans that are in the context of the stadium, as well as users that are watching the game on TV away from the stadium as well as fans reading a publication covering the sport anywhere using their connected device. A methodology to connect the fans away from the actual sporting event.

The ability to collect sensor input from a real live event may in the future be able to be used in tactile feedback on the users sensor enabled clothing, seating and or environment. One such use case may be created around a sporting event. As shown in FIG. (21) data collected from a sporting event can be collected and sent to a sporting event telemetry database. The data presented in connection "8" may contain such tactile information as gathered by sensors worn by players and sent as part of the sporting event telemetry information FIG. (21). This information may then be combined with the other information presented by the augmented reality experience database FIG. (21) and presented to the delivered in FIG. (21) to the connected device, FIG. (21) which may be connected with tactile feedback sensors and/or connected via a peer-to-peer communication as shown as connection FIG. (21) "9" to sensors worn by the end user that provides the tactile feedback, tactile feedback sensors and audio/video displays worn by the end user, FIG. (21). The ability to collect visual information from a real life event, combining this with motion tracking and other sensor input will enable a real life reproduction of the event to be presented to the end user when relevant using technologies such as augmented reality, head-up displays, augmented reality enabled glasses and contact lenses as well as permanent installations. FIG. (20) depicts such a system. FIG. (20) shows how the image recognition software installed on connected devices with cameras such as smart phones, tablet computers with cameras and connectivity and future devices such as augmented reality glasses and contact lenses can provide this as a use case using the invention's architecture. The device's camera is controlled by the image recognition system and will look for a match on objects, printed materials and/or on audio visual displays of video, TV or film content—connection FIG. (20) "1". The Target database FIG. (20) contains the predetermined targets, presents and matches these connection FIG. (20) "2" against the images detected by the device FIG. (20) "3". The Mobile CRM system FIG. (20) is alerted when a match has been made—connection FIG. (20) "4"—and when the Augmented Reality experience is superimposed on the device—connection FIG. (20) "5" with real-time, real life telemetry information collected at the sport event via the sport telemetry information FIG. (20) and presented to the augmented reality experiences database FIG. (20) in connection "7". The data presented from the sporting event telemetry database can be used to control avatars of players and equipment in augmented reality rendering and/or sporting game associated with the sporting event, based on real life actions, movements, speed and locations collected from the real life event. The Mobile CRM system FIG. (20) connects with the device—connection FIG. (20) "6"—and record contextual information such as the target that the user is interacting with as proven by connection FIG. (20) "1", then log other context such as time, date, location and length of the engagement with the recognized target. Additional contextual data as defined in FIG. (3) and FIG. (4) may also be collected by the Mobile CRM system FIG. (20).

The solution enables the experiences that are presented to be controlled, the results measured and proven, thus creating an ability to commercialize the communication channels and the activities that are a result of the communication. The client eco system depicted in FIG. (17) shows the wide potential user base of this invention and/or portions of it once it is commercialized and widely available.

The solution creates contextual wisdom be presenting relevant content such as information, entertainment, warnings and/or offers to the right person while they are in the right context. This process is shown in FIG. (15) and FIG. (16). FIG. (15) depicts how contextual information is provided and detected and presented to the MCRM—mobile customer relationship management system FIG. (15) then combined with discovery and historic data. Proximity information is also presented into the MCRM system—FIG. (15) through sensors. Current and future information such as inference and prediction, personalized offer and content is also shown to be connected to the MCRM—FIG. (15). The process of getting information, gather it, match it, refine it and present it is shown to create wisdom by presenting the right information to the right end user, FIG. (15). By providing this information, a contextually intelligent communication is enabled, FIG. (15). The process to collect data, create meaning of information, creating knowledge from the information, combining it with current and past information, understanding value, creating wisdom to present the right information to the right person at the right time and place is shown in FIG. (16).

FIG. (1) depicts an overview of the eco-system architecture. Various devices within the context bubble FIG. (1) gathers information as shown in FIG. (1) connection "1". The information is translated to current context awareness definitions, FIG. (1), connection "2". Past behavior and actions FIG. (1) are determined by combining the current context awareness definitions as transmitted by FIG. (1)—"3" and matched with historical and demographic data as stored in the historical data and demographics database, FIG. (1) and transmitted if a match is made in FIG. (1) "4". Once the historical data FIG. (1)—4 and past behavior FIG. (1) is combined with the current context awareness FIG. (1), decisions on what to predict and present, FIG. (1) can be presented FIG. (1)—6 to a mobile customer relationship management system in the cloud FIG. (1). This mobile customer relationship management system in the cloud FIG. (1) will then bring in relevant content and/or information from the content and experiences database in the cloud FIG. (1) in connection FIG. (1)—"7". The mobile customer relationship management system in the cloud FIG. (1) will then present relevant content and/or information from the content and experiences database in the cloud FIG. (1) in connection FIG. (1) to the end user in the context bubble FIG. (1) "8". The results of the communication presented in communication "8" FIG. (1) is reported back to the mobile customer relationship management server FIG. (1).

FIG. 2 shows the contextual bubble where a user is surrounded by a virtual bubble the is created around the user from the user's various connected devices such as mobile devices, augmented reality visual displays such as AR glasses, audio display devices, body area sensors worn in clothing, accessories and shoes. It also shows that others can be in the same context bubble such as other users or other connected devices. Once these are in the same context bubble, they become part of the bubble of influence and communication between the first user and the other users and or devices can be established via peer-to-peer or any other near field communication. As show in FIG. (2) an end user has a connected device FIG. (2) such as a smart phone and may have a combination of other additional sensors and connected devices such as glasses that are AR displays, FIG. (2), headphones or other sensors that transmit sound—audio input FIG. (2) and a body area network FIG. (2). This creates a context bubble FIG. (2) around the end user and the bubble becomes a bubble of influence, FIG. (2).

FIG. (3) depicts some of the sensors, variables and information that may be collected and used to determine the current context in FIG. (1).

FIG. (4) depicts some of the variables and information that may be collected and used to define the current context and creating current context awareness in FIG. (1)

FIG. (5) depicts some of the variables, input and information that may be collected and used to determine the past behavior and actions in FIG. (1).

FIG. (6) depicts some of the variables and questions that may be posted, collected and used to determine the predictions and what to present next in FIG. (1).

FIG. (7) depicts some of the content, experiences and information that may be gathered, stored and used on the content and experiences database in FIG. (1)

FIG. (8) shows content FIG. (8) sent to the end user's devices FIG. (8)—"1" inside the user's context bubble FIG. (8) has a feedback loop FIG. (8)—"2" directly to the mobile customer relationship database FIG. (8).

FIG. (9). A scenario for peer-to-peer communication is depicted in FIG. (9). An end user's context bubble FIG. (9) has been created and defined as a bubble of influence, FIG. (9). Another user or multiple users—other users FIG. (9) enter the bubble of influence with their context bubble—FIG. (9) context bubble. Once inside the bubble of influence of the first end user FIG. (9), a communication link is established between the first user and the other users, peer to peer FIG. (9). Conversely, the process is repeated for any other connected device, other devices FIG. (9) that enters the bubble of influence of the first end user, FIG. (9). A peer to peer communication link is then established between the devices, FIG. (9).

FIG. (10) shows how the image recognition software installed on connected devices with cameras such as smart phones, tablet computers with cameras and connectivity and future devices such as augmented reality glasses and contact lenses can provide this as a use case using the inventions architecture. The device's camera is controlled by the image recognition system and will look for a match on objects, printed materials and/or on audio visual displays of video, TV or film content—connection FIG. (10) "1". The Target database FIG. (10) contains the predetermined targets, presents and matches these connection FIG. (10) "2" against the images detected by the device FIG. (10) "3". The Mobile CRM system FIG. (10) is alerted when a match has been made—connection FIG. (10) "4"- and when the Augmented Reality experience is superimposed on the device—connection FIG. (10) "5". The Mobile CRM system FIG. (10) will then connect with the device—connection FIG. (10) "6"—and record contextual information such as the target that the user is interacting with as proven by connection FIG. (10) "1", then log other context such as time, date, location and length of the engagement with the recognized target.

FIG. (11) shows a high level overview of the architecture of information from context awareness to content delivery and the interaction with a standard commercially available big data management solution such as Hoodad™ and others.

Figure 14:
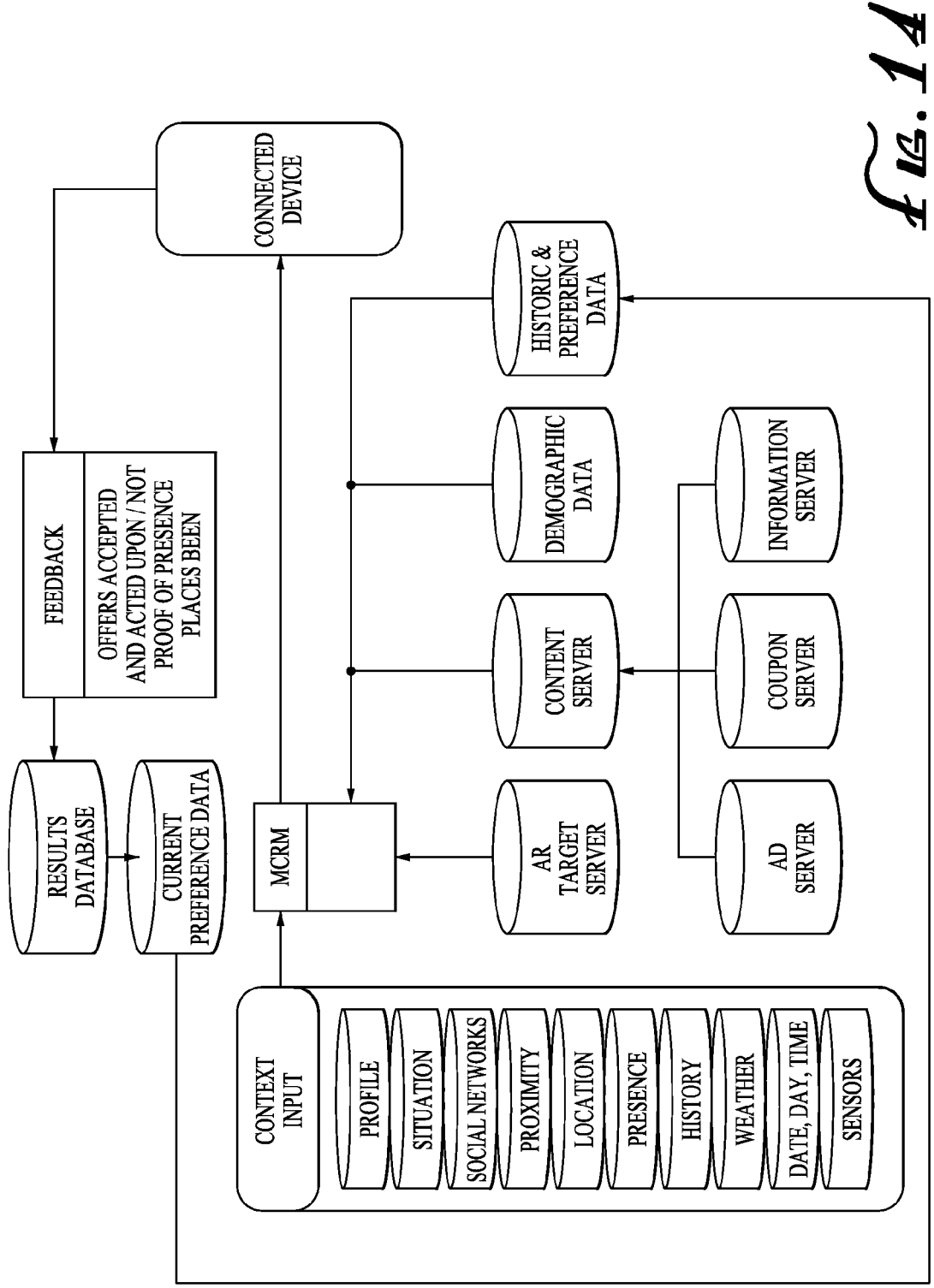
FIG. 14 is a schematic presentation on how the system described in FIG. 12 can become an intelligent and self-learning and continually improving system by providing feedback from the connected device recording the effectiveness of the offers, coupons and information presented to it by the system in FIG. 12, report this into a feedback loop and store this into a result database server which reports this into a database that records this information and combines it with past recorded data and then reports this back into the historic and preference database in the system depicted in FIG. 12 providing a complete feedback loop with each interaction recorded and stored for repeated use when the system is activated again thereby creating self-learning.
Figure 15:
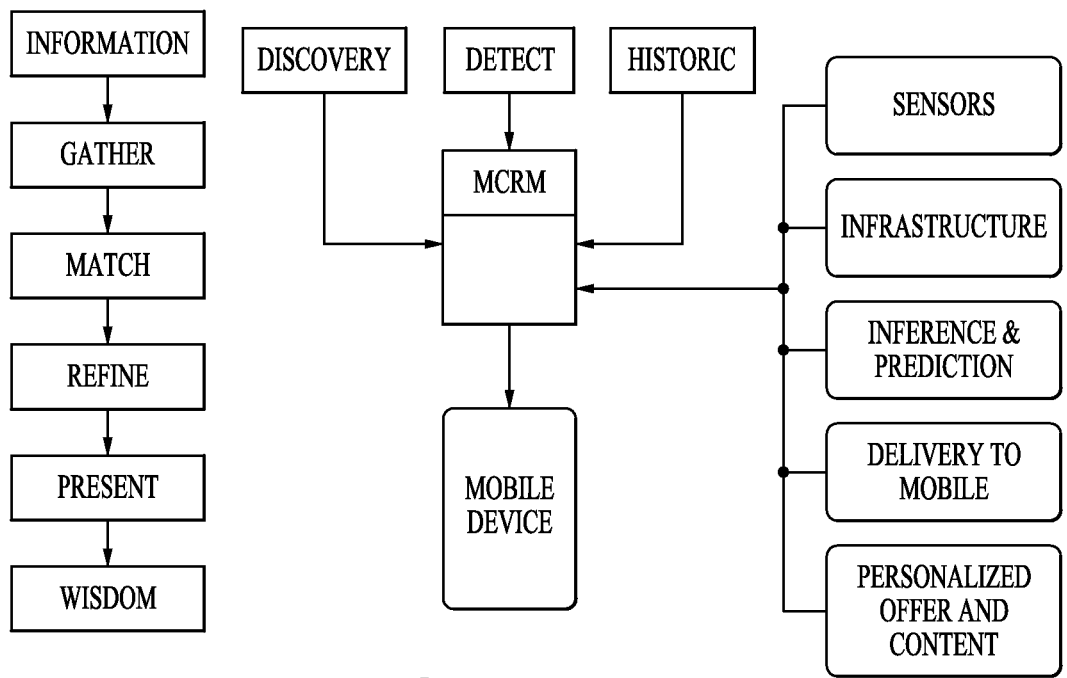
FIG. 15 is a schematic overview of the information flow from context devices such as sensors and infrastructures, past and historical data, combined with context that is detected and discovered with historical data, inference and predicted desired results and personalized offers are flowing in the path of information gathering first, then matching and refining the data, then present it to the device thus creating contextual wisdom.
Figure 16:
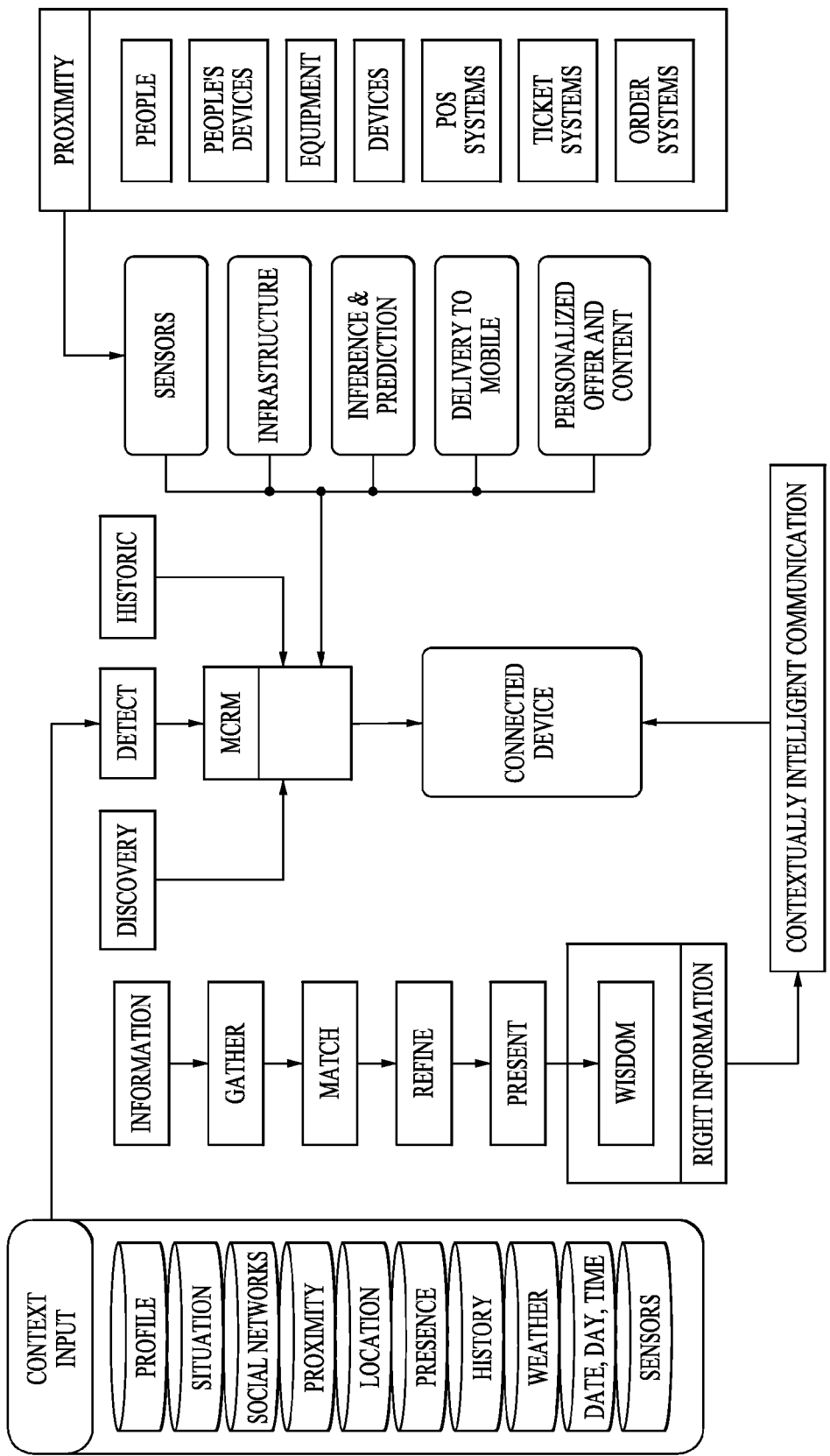
FIG. 16 is a schematic presentation on how the system described in FIG. 14 can become an intelligent, self-learning and continually improving system providing contextually intelligent communication by including collection information such as contextual data and input from devices in the proximity of the mobile device as shown in FIG. 13, gather this by blending this with context input as shown in FIG. 12, match it with past preferences and historical data as described in FIG. 14, adapting and inferring contextual wisdom by refining it further as described in FIG. 14, following the path outlined in FIG. 15, then present the relevant information to the device at the right time, location, while the device is in the right and known proximity to other devices, the right context and the content served is relevant to the user of the device based on the users demographic information, past behavior, learned and captured behavior and preferences, thus creating a contextually intelligent communication.
Figure 17:
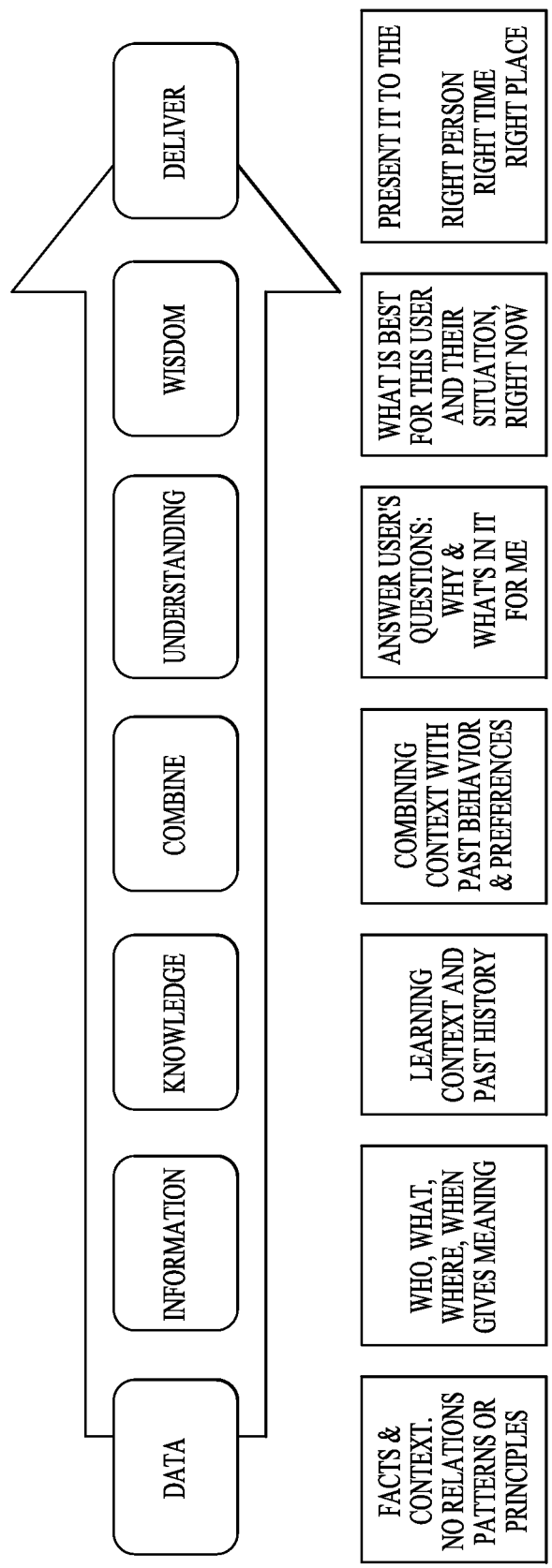
FIG. 17 depicts the steps used to gather data, combine it with information, blend past knowledge, combine to achieve an understanding of the user to derive at wisdom about the user to enable the delivery of the right content to the right user at the right time and place.
Figure 18:
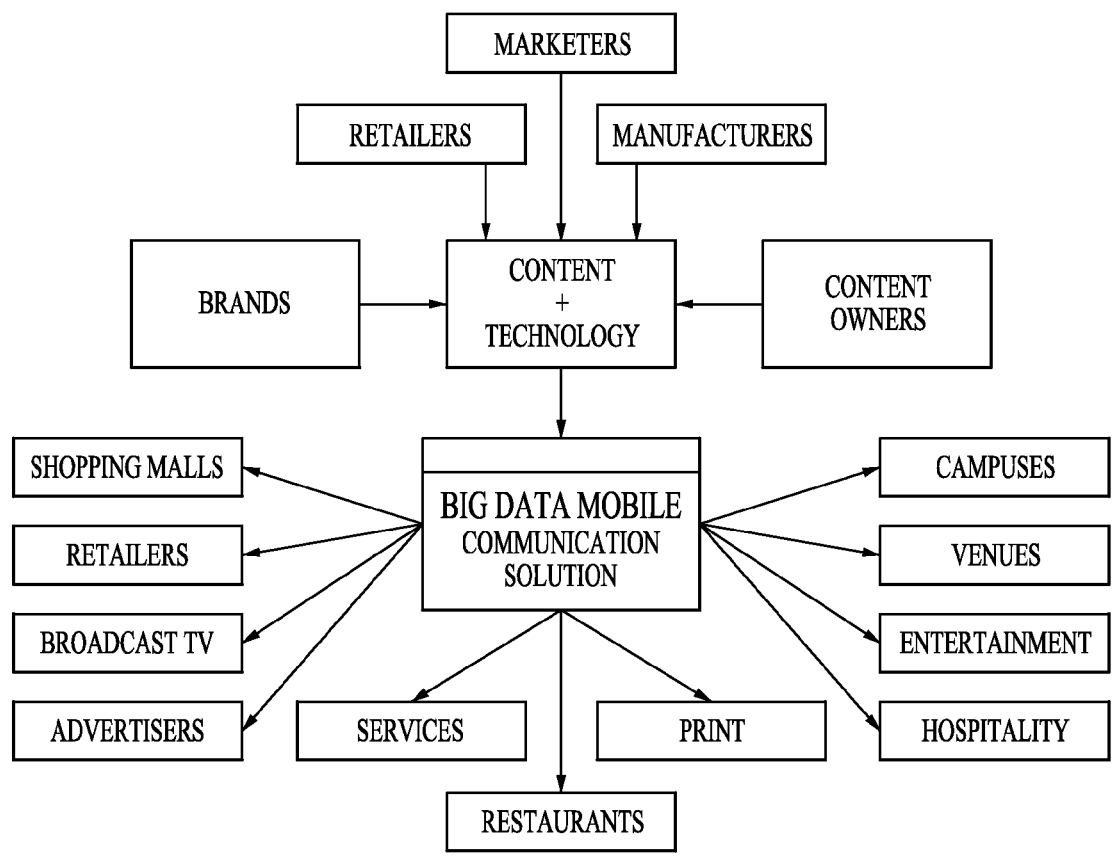
FIG. 18 provides an overview of representative entities and industries that may benefit from use of the invention, where some will provide information and technologies, while others will be using the system for delivery of messages to their patrons, customers, visitors and clients.

FIG. (12) show more details of the various databases and sensor input points between the sensors in the context bubble that determines the user's context and how the various databases feed information into the MCRM system to ensure delivery of the relevant information FIG. (13) show an overview of others and other devices that are determined to be in proximity to the user inside the user's context bubble and then how a connection between these users and or devices can be tied into the MCRM system so that relevant information and content can be delivered to these as well if of relevance FIG. (14) shows how the results of the content that has been presented to the device from then mobile customer relationship management system (MCRM) FIG. (14) has a feedback loop FIG. (14) that measures the actions taken on the content such as offers accepted or rejected, whether invites, offers or coupons have created the desired result and made the end user go to the desired location and thus creating a proof of presence FIG. (14). The results, both positive and negative, are reported back to the results database FIG. (14). The results are then reported to the current preference database FIG. (14) and then reported as historical demographic data back to the historic and preference database FIG. 14) that is feed to the mobile customer relationship database—MCRM—FIG. (14) thus creating a complete feedback loop and a self-learning system.

FIG. (15) shows a schematic overview of the information flow from context devices such as sensors and infrastructures, past and historical data, combined with context that is detected and discovered with historical data, inference and predicted desired results and personalized offers are flowing in the path of information gathering first, then matching and refining the data, then present it to the device thus creating contextual wisdom. The path of information and content flow is to first define and collect information from the variety of input devices both on the mobile device but also in its proximity and context bubble, then gather this information, match the real time contextual data with historical and demographical data as well as past behavior, historical data and preferences both inferred and recorded, then combine this to refine the results of the content and information to be presented to the mobile device, this creating wisdom of the content delivery.

FIG. (16) depicts how contextual information is provided and detected and presented to the MCRM—mobile customer relationship management system FIG. (16) then combined with discovery and historic data. Proximity information is also presented into the MCRM system—FIG. (16) through sensors. Current and future information such as inference and prediction, personalized offer and content is also shown to be connected to the MCRM—FIG. (16). The process of getting information, gather it, match it, refine it and present it is shown to create wisdom by presenting the right information to the right end user, FIG. (16). By providing this information, a contextually intelligent communication is enabled, FIG. (16).

FIG. (17) show an outline of the methodology of evaluations used to perform progressive steps in determining best content to present creating contextual wisdom. The process to collect data, create meaning of information, creating knowledge from the information, combining it with current and past information, understanding value, creating wisdom to present the right information to the right person at the right time and place is shown in FIG. (17).

FIG. (18) depicts and shows that there is wide use for the solution as a communication platform as shown in FIG. (18) where an ecosystem of clients, users and use cases are depicted.

FIG. (19) show an overview of the methodology to a method for determining the context a person is currently in by using object and image recognition system where the augmentation is delivered once the image and/or object has been recognized and matched against a known image and/or object in an image/object server in the cloud. In one embodiment of the solution the method of creating a contextual intelligent communication platform involves image recognition and augmented reality technology commercially available software known to one of skill in the art such as Vuforia™ version 1.0 and more advance forms such as version 1.5 and future versions (Qualcomm, San Diego, Calif.), or similar solutions provided by augmented reality companies such as Aurasma, Blippar, Layar, Stringar and or others.

FIG. (20) shows how a location FIG. (20) can create a geo fence via a radial virtual fence around its location by defining a radius FIG. (20). Once a known user with a defined context bubble FIG. (20) enters this geo fence FIG. (20), a notification is sent FIG. (20)—"1" to the mobile customer relationship management system FIG. (20). Once this alert has been matched, the mobile customer relationship management system FIG. (20) searched for the relevant information FIG. (20)—"2" on the content database FIG. (20) to present to the end user. The virtual fence is depicted as a circle by may also be created in other forms and shapes to better adapt to the physical landscape and buildings around the location.

FIG. (21) shows how the image recognition software installed on connected devices with cameras such as smart phones, tablet computers with cameras and connectivity and future devices such as augmented reality glasses and contact lenses can provide this as a use case using the inventions architecture. The device's camera is controlled by the image recognition system and will look for a match on objects, printed materials and/or on audio visual displays of video, TV or film content—connection FIG. (21) "1". The Target database FIG. (21) contains the predetermined targets, presents and matches these connection FIG. (21) "2" against the images detected by the device FIG. (21) "3". The Mobile CRM system FIG. (21) is alerted when a match has been made—connection FIG. (21) "4"—and when the Augmented Reality experience is superimposed on the device—connection FIG. (21) "5" with real-time, real life telemetry information collected at the sport event via the sport telemetry information FIG. (21) and presented to the augmented reality experiences database FIG. (21) in connection "7". The data presented from the sporting event telemetry database can be used to control avatars of players and equipment in augmented reality rendering and/or sporting game associated with the sporting event, based on real life actions, movements, speed and locations collected from the real life event. The Mobile CRM system FIG. (21) connects with the device—connection FIG. (21) "6"—and record contextual information such as the target that the user is interacting with as proven by connection FIG. (21) "1", then log other context such as time, date, location and length of the engagement with the recognized target. Additional contextual data as defined in FIG. (3) and FIG. (4) may also be collected by the Mobile CRM system FIG. (21).

FIG. (22) shows how data collected from a sporting event can be collected and sent to a sporting event telemetry database. The data presented in connection "8" may contain such tactile information as gathered by sensors worn by players and sent as part of the sporting event telemetry information FIG. (22). This information may then be combined with the other information presented by the augmented reality experience database FIG. (22) and presented to the delivered in FIG. (22) to the connected device, FIG. (22) which may be connected with tactile feedback sensors and/or connected via a peer-to-peer communication as shown as connection FIG. (22) "9" to sensors worn by the end user that provides the tactile feedback, tactile feedback sensors and audio/video displays worn by the end user, FIG. (22).

FIG. (23) In one embodiment of the solution, a complete end-to-end communication solution is envisioned for a stadium owner and the attendees that are attending events in the stadium. FIG. (23) "1" shows how AR and or IR can be used to engage and capture the information about a person who has bought a ticket to the event and plan to attend it while at home or before the event. This is done by creating an AR or IR experience that is triggered by the specific tickets for entrance to the specific event. This can be an AR game such as a soccer penalty kick game, basketball free throw game, or a baseball bating versus pitcher game, basically anything that is related to the sport being played in the stadium that the ticket will provide entrance to. When the user is starting such an application on their mobile device that contains the image of this ticket as part of its image recognition database that serves as the base for the AR experience that is superimposed upon it, it is recognized that the user is interacting with that specific ticket, where the user is located at that given time, and the identification of the device is established. This information is captured and transmitted to the cloud based MCRM system. Once the system recognizes that the user is coming to the event, additional information about the event, reminders, offers, upsell offers such as bring a friend and get a discount, share on Facebook or other social network that you are going and earn rewards. FIG. [23] "2" shows that as the user is in transit on the way to the event. This is done by locating the user via the user's mobile device and matching it with the time and date of the event which is known because of the capture in FIG. [23] "1". As the user is approaching the stadium, offers, coupons, information and encouragements can be delivered. Offers can be for discounts at concessions inside the venue, merchandise, limited time offers, memorabilia and/or items such as clapper or signs that the stadium owner wants their fans to display during the event. Offers can also be delivered on behalf of participating sponsors outside the stadium, such as bars and restaurants. These can be timed so that they are only valid for a certain period before the event, and may offer other limitations such as the requirement to display the ticket to the event in order to redeem the offer. Coupons can be delivered in the same fashion—both for merchandise inside the stadiums as well as outside pre-event. Information can also be delivered as the user approaches the stadium. This can be dynamic updates such as where there is open parking, what entry gate to the stadium has the shortest line, and updates on the status of the home team playing. Encouragements can also be delivered to spur fan excitement such as be loud, chant or other enticement to cheer the home team on. FIG. [23] "3" shows how more specific hyper-location offers can be presented. "Hyper-location" is here defined as the knowledge of a location in a very specific location such as the specific stadium and places within it, and around the stadium. For instance, the system is able to pinpoint where the car was parked. This can be done manually, or used by determining rate of speed and time stationary which can trigger an active response such as a question—"have you parked your car?" Based on hyper location such as which gate the user entered the stadium through, offers that are based on concessions stands that are close by that specific gate can be served as the user enters the gate. Using AR triggers as described elsewhere as directional indicators, directional information can be offered to the user. Excusive content and AR experiences can be presented and used to drive the user to specific locations within the stadium such as the team store, museums or other locations where the stadium owner wants to present enhanced experiences. These can be time dependent and only be active before and after the game play—and/or during breaks. FIG. [22] "4" shows how a game experience and/or AR experience can be enabled that is controlled and limited by time and location. One such embodiment is the ability to take an AR enhanced photo of the user where an avatar image or real life image of one of the home team's star players is superimposed on the photo next to the user making the illusion that the user was standing next to the star. Rewards to the user for sharing this on the user's social networks can be presented. Other game experiences can be triggered as well. These can be location based; proximity based and/or can be games played among and between users. Technologies such as AllJoyn peer-to-peer solutions can be used for this. One aspect could be a game that is played between fans in the stands which is only active during breaks—such as virtual beach ball tossing between fans—those who ends up with it when the music ends wins, and they are displayed on the big score board. Other games could be created to get fans to rally when the team needs support, other games could create images on the phones that when the phones are held up will form a mosaic of a message/image the stadium owner wants to display. Other games could be crowdsourcing photos into a mosaic that is displayed on the scoreboard—and transmitted to those watching the game at home and via the fans social networks. Other embodiments of the solution is where the knowledge that a user is in the stadium, and that the user is approaching a concession stand that has a context beacon as described before, the concession stand's menu can be transmitted and presented on the user's mobile device as the user approaches. The user can then order from the mobile device, the order will be transmitted to the concession stand's POS system and the order filled. When the user goes to an established and dedicated mobile order line, the order is already ready for the user to pick up. The user will be able to use a mobile payment solution to pay for the order without having to present any other form of payment and the concessions stand staff is free to attend to other patrons. In the future, it is envisioned that the device can capture activity levels and noise levels. The stadium owner can thereby measure who is active, and who is loud cheering for the home time, and at what time they are doing so. Those that spur the home team on with chants and active participation can thereby be rewarded for their involvement with the live action game based on their physical activity and noise level. In other instances, as the user moves along in the stadium, contests can be presented and offered at the right time and locations with relevant prizes and offers to the end user. One such envisioned game can be a "scavenger hunt" or "treasure hunt" where the user will be presented quizzes and puzzles that are relevant to the stadium and the team playing and the prizes will provide value to the end user based on their location and activity. These games can only be played while inside the stadium and only when there is a sporting event or other event. As the user travels through the environment and solves the puzzles, riddles and quizzes, new clues will be revealed based on location, whether an image has been found and IR or AR is used to recognize that the user is at that specific location, another clue will be unlocked and the user is presented the opportunity to solve the next quiz, riddle or puzzle. This repeats until the user ends at the final location or has found the right item that triggers the unlocking of the final prize. The final prize can be a ticket to a future event, back-stage passes, VIP treatment, meet players, receive coupons, exclusive content, physical or digital merchandise, games, video or audio content. As the user continues through the physical environment, automatic updates to the user's context and surroundings can be shared with others based on the user's permissions. These can be updates to their social media status such as on Facebook and Twitter for an individual end-user. Should there be other end-users in the proximity to an end-user and all have at one time downloaded one of the applications that use the invention's methodology, an ad-hoc peer-to-peer communication can be established using technologies such as Qualcomm's "AllJoyn" solution. Another embodiment of the solution is the use of this technology for visitors to stadiums where there is a long line waiting to enter or line up for special events, greet the players or locker-room access. In such a context, a location based game can be triggered and end users that have the solution on their devices can be connected and start playing against each other. The winner may get a front of the line pass if he wins. As people move away from the location, they will drop out of the game, and others will be invited to join as they come into proximity. The game can only be played by users that are in the specific location, which is the context defined by the back-end MCRM system. Another use is for the user who is in the stadium and has had the application downloaded and is approaching a concession stand, the ad hoc proximity peer-to-peer system will create a connection with the concessions stand's mobile device/and or connected point of sale (POS) system. The menu from the concessions stand will be displayed on the user's mobile device. The user can select the menu items and the order will be transmitted to the concessions stand's mobile device and/or connected POS system. Once the order has been placed, a cloud based mobile payment system such as Qualcomm, Inc.'s "PAY" solution or near field communication (NFC) payment solution such as Google "Wallet" can be used to complete the transaction. When "PAY" is used, the user's purchase is captured and retained in the MCRM system. In other instances as a person is moving around their surroundings, images can become roadmaps and markers. These can offer directional feedback to the end-user. They can be simple logos, arrows, or any images that the IR/AR technology recognizes as a directional sign as matched against the cloud based target database. The image can indicate to one end user to go left based on that person's desired destination, the same image can indicate to another user to go right based on the person's desired destination that differs from the first person's destination. Content that is captured in the stadium by various cameras can be transmitted directly to the devices in the stadium. This can be imagery such as alternative camera angles, re-play, re-wind, or alternative point of view from embedded cameras on referee's caps or players helmets. Once sensors are placed and embedded in player's gear such as shoes, helmets, protective gear or equipment, information from these sensors can also be transmitted to the user's device while inside the stadium through WiFi, WLAN, LAN and or Distributed Antenna Systems (DAS). Since broadcasting only inside the stadium to fans in the stands, this should not interfere or violate broader broadcasting rights held by others. Another embodiment of the application is to use the AR targets as communication channels. Images placed on items such as, but not limited to, apparel, photos, ads, logos, products, packaging, posters will become a distribution channel of digital content that can be superimposed onto the target. This information can be content such as news, updates, announcements, entertainment, encouragement, supportive messages, reminders and alerts that are relevant to the product that has the image on it or is depicted in the image or is associated with the image. Personalization of the content can be created by the MCRM backend system that drives and delivers the messaging in the AR experience from the AR database, combined with the user's current and past contexts and past behavior, preferences and behavior. Traditional maps for stadiums can also serve as dynamic AR targets. A use of the solution is the ability to create interactive, dynamic and personalized AR experiences superimposed on the printed map. This can feature information, offers, coupons and details about locations and concessions stands, it can provide directions to locations and present high lights on the route chosen. The AR map can then be ported onto the device and remain on the device with the user's location updated as the user proceeds along the selected route. The solution can also be used to create automatic check-in and registration for users that enters a specific location where a payment, registration or notification of the user's presence is required. One such use may be for attendees at the stadium. Here the user would have registered prior to arriving by purchasing the entry ticket, experienced an AR enhancement associated with the ticket as mentioned before.

The MCRM system registers this booking, and when the user crosses the geo-fence established by the location, the MCRM registers this and sends a message to the order, booking, and registration and/or ticket office system at the physical location. In certain physical locations where GPS signals are weak—such as indoors, event centers, casinos and in large shopping malls—the solution enables AR/IR targets to become virtual guides and sign posts. By recognizing targets that are placed in a known physical location, the MCRM system will capture the target and match it against the target database. Since the physical location of the target is known, the user's location is also known since the user needs to be in front of the target for the AR/IR to recognize it. The MCRM system can then send information about other known physical places in proximity to the current AR/IR target. Information such as directions, landmarks, distance, features of the location and offers from the location can be displayed. These will be superimposed on a digital map unlike the traditional AR experiences where you hold your phone up against the horizon. These systems are typically dependent on GPS coordinates of the user and the AR overlays and do not work indoors. The solution uses a combination of the user's known location, the MCRM database of known and defined locations, the MCRM's knowledge of AR/IR target's locations, and if a known number of these AR/IR targets are recognized as dynamic directional markers, directional arrows can appear as the user moves through the environment guiding the user to the desired end location. The solution also enables digital signs to display relevant information as a user moves through the stadium. The display sign is connected with the MCRM system in the cloud. Once a user's context bubble enters the "sphere of influence" of the digital sign, the user's mobile device will recognize the event. The MCRM system will recognize the event from both the digital display as well as the user. The MCRM will send an appropriate message to be displayed on the display based on the users past preferences, current state of mind, the user's likely next destination as well as any recorded activities in the future. A user's current context can also be defined by the user's location. There are numerous means to define and record this, and the solution is not dependent upon any specific method. As the user is moving about in the physical world, the user's context will constantly change. The user can use the MCRM to specifically record certain aspects of the context and share it with others. One such embodiment is to place a tag on the specific location a user is in, and then share this location with others either directly to one other person, or to that person through social media, or share with a group of others. Another embodiment of the solution is the use for live performances such as concerts, circus acts and theater performances within the stadium. Aspects within the performance, game or event such as props, stands, displays, mannequins, statues, dolls can serve as AR markers and pre-recorded acts can be superimposed on them before, during and after the sporting event. This can be AR overlay that is common and seen the same way by all in the audience, or it can be customized to be randomly displayed or specifically presented based on the end user's demographics such as age and or gender. The stadium sporting event can also be enhanced with AR superimposed content that can be same for all the users in the audience, randomly presented or customized for specific audience members. Certain locations can be enhanced with contextually specific features. One such example is an AR experience that enables and enhances betting and wagering within horse race tracks, stadiums and/or casinos. Offers that are specific to such locations can be automatically presented to users that are in such a context and have a desire to receive them. Within other venues, behavior that is beneficial to the venue can be rewarded. Loyalty programs, special front of the line entrance and other VIP treatment can be awarded to users that are in the context and promote to their social network that they are there. Should their friends respond in a way that is beneficial to the venue owner, such user will receive the benefits, status and loyalty rewards FIG. [23] "5" shows that as the user is leaving the stadium, rewards for specific behavior can be presented. The action of leaving can be determined by crossing the geo-fence as well as time. Activities such as sharing the experience with others, participating in games, chanting and spurring the home team on can be rewarded. The rewards can be for offers to get a product such as team merchandise on the way out, or get a bottle of water for the ride home. Information can also be presented at this time such as traffic updates, where the car was parked, crowds on public transportations, altercations and traffic accidents. FIG. [23] "6" shows when the user is in transit on the way away from the stadium, information, content and offers can be presented. They can be a "thank you for coming" note, can be exclusive high light videos and content from the game or offers to go to participating restaurants, bars or retailers on the way home. These can all be sponsored by the team, the stadium owner or their sponsors. They can be for products, discount offers or merchandise from the team. FIG. [23] "7" shows that when the user is back at the location as detected in FIG. [23] "1" or another location that has been determined to be the user's home, additional offers, coupons, information and content can be presented by the team and/or stadium owners. This can updates on the next time the team is playing in the stadium, discount offers such as bring a friend and get 50% off or other enticement offers to return to the stadium. This complete solution thereby enables the stadium owner and/or team to communicate with their fans from the moment they purchase their tickets, as they are coming to the stadium, while they are attending the sporting event at the stadium, as they are returning on the way home and after they have returned home, thus creating loyalty between the fan and the stadium/team.

FIG. [24] In one embodiment of the solution, a complete end-to-end communication solution is envisioned for a theme park owner/operator and the attendees that are attending the park. FIG. [24] "1" shows how AR and or IR can be used to engage and capture the information about a person who has bought a ticket to the park and plan to attend it while at home or before the event. This is done by creating an AR or IR experience that is triggered by the specific tickets for entrance to the specific theme park. This can be an AR game that is related to the theme park that the ticket will provide entrance to. When the user is starting such an application on their mobile device that contains the image of this ticket as part of its image recognition database that serves as the base for the AR experience that is superimposed upon it, it is recognized that the user is interacting with that specific ticket, where the user is located at that given time, and the identification of the device is established. Once the system recognizes that the user is coming to the park, additional information about the event, reminders, offers, upsell offers such as bring a friend and get a discount, share on Facebook or other social network informing others that the user is going and the user will earn rewards for this. FIG. [23] "2" shows that as the user is in transit on the way to the park. This is done by locating the user via the user's mobile device and matching it with the time and date of the ticket which is know because of the capture in FIG. [24] "1". As the user is approaching the park, offers, coupons, information and encouragements can be delivered. Offers can be for discounts at concessions inside the park, restaurants, merchandise, limited time offers, memorabilia and/or items such as dolls, mascots, hats and masks. Offers can also be delivered on behalf of participating sponsors outside the park, such as hotels, bars and restaurants. These can be timed so that they are only valid for a certain period before the park opens, and may offer other limitations such as the requirement to display the ticket to the park to redeem the offer. Coupons can be delivered in the same fashion—both for merchandise inside the park as well as outside pre-entry. Information can also be delivered as the user approaches the park. This can be dynamic updates such as where there is open parking, what gate has the shortest line, and updates on the status of length of lines at different lines. FIG. [24] "3" shows how more specific hyper-location offers can be presented. "Hyper-location" is here defined as the knowledge of a location in a very specific location such as the specific park and places within it. The system can pin-point where the car was parked. This can be done manually, or used by determining rate of speed and time stationary which can trigger an active response such as a question—"have you parked your car?" Based on hyper location such as which gate the user entered the park through, offers that are based on concessions stands that are close by that specific gate can be served as the user enters the gate. Using AR triggers as described elsewhere as directional indicators; directions can be offered to the user while inside the park. Excusive content and AR experiences can be presented and used to drive the user to specific locations within the park such as the specific rides, restaurants, concession stands or other locations where the park owner wants to present enhanced experiences. These can be time dependent and only be active before and after the game play—and/or during breaks. FIG. [24] "4" shows how a game experience and/or AR experience can be enabled that is controlled and limited by time and location. One such embodiment is the ability to take an AR enhance photo of the user where an avatar image of one of the parks mascots or action figure is superimposed on the photo next to the user making the illusion that the user was standing next to the mascot or action figure. Rewards for sharing this on the user's social networks can be presented. Other game experiences can be triggered as well. These can be location based and/or proximity based and can be games between users. Other games could be crowdsourcing photos into a mosaic that is displayed on a digital scoreboard. Other embodiments of the invention is where the knowledge that a user is in the park, and that the user is approaching a concession stand that has a context beacon as described before, the concession stand's menu can be transmitted and presented on the user's mobile device as the user approaches. The user can order from the mobile device, the order will be transmitted to the concession stand's POS system and the order filled. When the user goes to the dedicated mobile order line, the order is already ready for the user to pick up. The user will be able to use a mobile payment solution to pay for the order without having to present any other form of payment and the concessions stand staff is free to attend to other patrons. As the user moves along in the park, contests can be presented and offered at the right time and location with relevant prizes and offers to the end user. One such game can be a "scavenger hunt" or "treasure hunt" where the user will be presented quizzes and puzzles that are relevant to the park and the prizes will provide value to the end user based on their location and activity. As the user travels through the environment and solves the puzzles, riddles and quizzes, new clues will be revealed based on location, whether an image has been found and IR or AR is used to recognize that the user is at that specific location, another clue will be unlocked and the user is presented the opportunity to solve the next quiz, riddle or puzzle. This repeats until the user ends at the final location or has found the right item that triggers the unlocking of the final prize. The final prize can be a ticket to a future visit, front of line passes, VIP treatment, receive coupons, exclusive content, physical or digital merchandise, games, video or audio content. As the user continues through the physical environment, automatic updates to the user's context and surroundings can be shared with others based on the user's permissions. These can be updates to their social media status such as on Facebook and Twitter for an individual end-user. Should there be other end-users in the proximity to an end-user and all have at one time downloaded one of the applications that use the solution's methodology, an ad-hoc peer-to-peer communication can be established using technologies such as Qualcomm's "AllJoyn" solution. One embodiment of the solution is the use of this technology for visitors inside the park where there are long lines waiting to enter rides or special events. In such a context, a location based game can be triggered and end users that have the solution on their devices can be connected and start playing against each other. The winner may get a front of the line pass if he wins. As people move away from the location, they will drop out of the game, and others will be invited to join as they come into proximity. The game can only be played by users that are in the specific location, which is the context defined by the back-end MCRM system. As the user who is in the park and has had the application downloaded approaches a concession stand, the ad hoc proximity peer-to-peer system will create a connection with the concessions stand's mobile device/and or connected point of sale (POS) system. The menu from the concessions stand will be displayed on the user's mobile device. The user can select the menu items and the order will be transmitted to the concessions stand's mobile device and/or connected POS system. Once the order has been placed, a cloud based mobile payment system such as Qualcomm, Inc.'s "PAY" solution or near field communication (NFC) payment solution such as Google "Wallet" can be used to complete the transaction. When "PAY" is used, the users purchase is captured and retained in the MCRM system. As a person is moving around their surroundings inside the park, images can become roadmaps and markers. These can offer directional feedback to the end-user. They can be simple logos, arrows, or any images that the IR/AR technology recognizes as a directional sign as matched against the cloud based target database. The image can indicate to one end user to go left based on that person's desired destination, the same image can indicate to another user to go right based on the person's desired destination that differs from the first person's destination. In certain physical locations where GPS signals are weak—such as indoors, event—the solution enables AR/IR targets to become virtual guides and sign posts. By recognizing targets that are placed in a known physical location, the MCRM system will capture the target and match it against the target database. Since the physical location of the target is known, the user's location is also known since the user needs to be in front of the target for the AR/IR to recognize it. The MCRM system can then send information about other known physical places in proximity to the current AR/IR target. Information such as directions, rides, distance to these, features of the location/ride and offers from the location can be displayed. These will be superimposed on a digital map unlike the traditional AR experiences where you hold your phone up against the horizon. These systems are typically dependent on GPS coordinates of the user and the AR overlays and do not work indoors. The solution uses a combination of the user's known location, the MCRM database of known and defined locations, the MCRM's knowledge of AR/IR target's locations, and if a known number of these AR/IR targets are recognized as dynamic directional markers, directional arrows can appear as the user moves through the environment guiding the user to the desired end location. As the user moves into an environment where there are display devices that are connected, a connection directly between the hub and the devices will be established by a variety of methods, and information from the hub and the cloud based databases can be displayed on the displays. The solution also enables digital signs to display relevant information as a user moves through an environment. The display sign is connected with the MCRM system in the cloud. Once a user's context bubble enters the "sphere of influence" of the digital sign, the user's mobile device will recognize the event. The MCRM system will recognize the event from both the digital display as well as the user. The MCRM will send an appropriate message to be displayed on the display based on the users past preferences, current state of mind, the user's likely next destination as well as any recorded activities in the future. A user's current context can also be defined by the user's location. There are numerous means to define and record this, and the solution is not dependent upon any specific method. As the user is moving about in the physical world, the user's context will constantly change. The user can use the MCRM to specifically record certain aspects of the context and share it with others. One such embodiment is to place a tag on the specific location a user is in, and then share this location with others either directly to one other person, or to that person through social media, or share with a group of others. Another embodiment of the solution is the use for live performances such as concerts, circus acts and theater performances inside the park. Aspects within the performance such as props, stands, displays, mannequins, statues, dolls can serve as AR markers and pre-recorded acts can be superimposed on them during the performance. This can be AR overlay that is common and seen the same way by all in the audience, or it can be customized to be randomly displayed or specifically presented based on the end user's demographics such as age and or gender. The theater or venue that the live performance is in can also be enhanced with AR superimposed content that can be same for all the users in the audience, randomly presented or customized for specific audience members. Certain locations can be enhanced with contextually specific features. Offers that are specific to such locations can be automatically presented to users that are in such a context and have a desire to receive them. Within other venues, behavior that is beneficial to the venue can be rewarded. Loyalty programs, special front of the line entrance and other VIP treatment can be awarded to users that are in the context and promote to their social network that they are there. Should their friends respond in a way that is beneficial to the park owner/operator, such user will receive the benefits, status and loyalty rewards. The scavenger and treasure hunt games can also be used to control crowds and/or drive traffic to certain parts of the park during certain times. For instance, a treasure hunt game can be initiated at 4 pm and the final clue can be presented right at the center of the park at 5 pm. As the participants are starting to look for exits of the park, offers to restaurants they pass on their way out can be presented as they walk by enticing the visitor to dine at the restaurant rather than exiting and eating outside the park. FIG. [24] "5" shows that as the user is leaving the theme park, rewards for specific behavior can be presented. The action of leaving can be determined by crossing the geo-fence as well as time. Activities such as sharing the experience with others, participating in games, can be rewarded. The rewards can be for offers to get a product such as park merchandise on the way out, or get a bottle of water for the ride home. Information can also be presented at this time such as traffic updates, where the car was parked, crowds on public transportations, altercations and traffic accidents. FIG. [24] "6" shows when the user is in transit on the way away from the park, information, content and offers can be presented. They can be a "thank you for coming" note, or offers to go to participating restaurants, bars, hotels or retailers on the way home. These can all be sponsored by the theme park or their sponsors. They can be for products, discount offers or merchandise from the park. FIG. [24] "7" shows that when the user is back at the location as detected in FIG. [24] "1" or another location that has been determined to be the user's home, additional offers, coupons, information and content can be presented by the theme park. This can discount offers such as bring a friend and get 50% off, or other enticement offers to return to the park. This complete solution thereby enables the park owner/operator to communicate with their fans from the moment they purchase their tickets, as they are coming to the park, while they are inside the stadium, as they are returning on the way home and after they have returned home, thus creating loyalty between the fan and the park.

Figure 23:
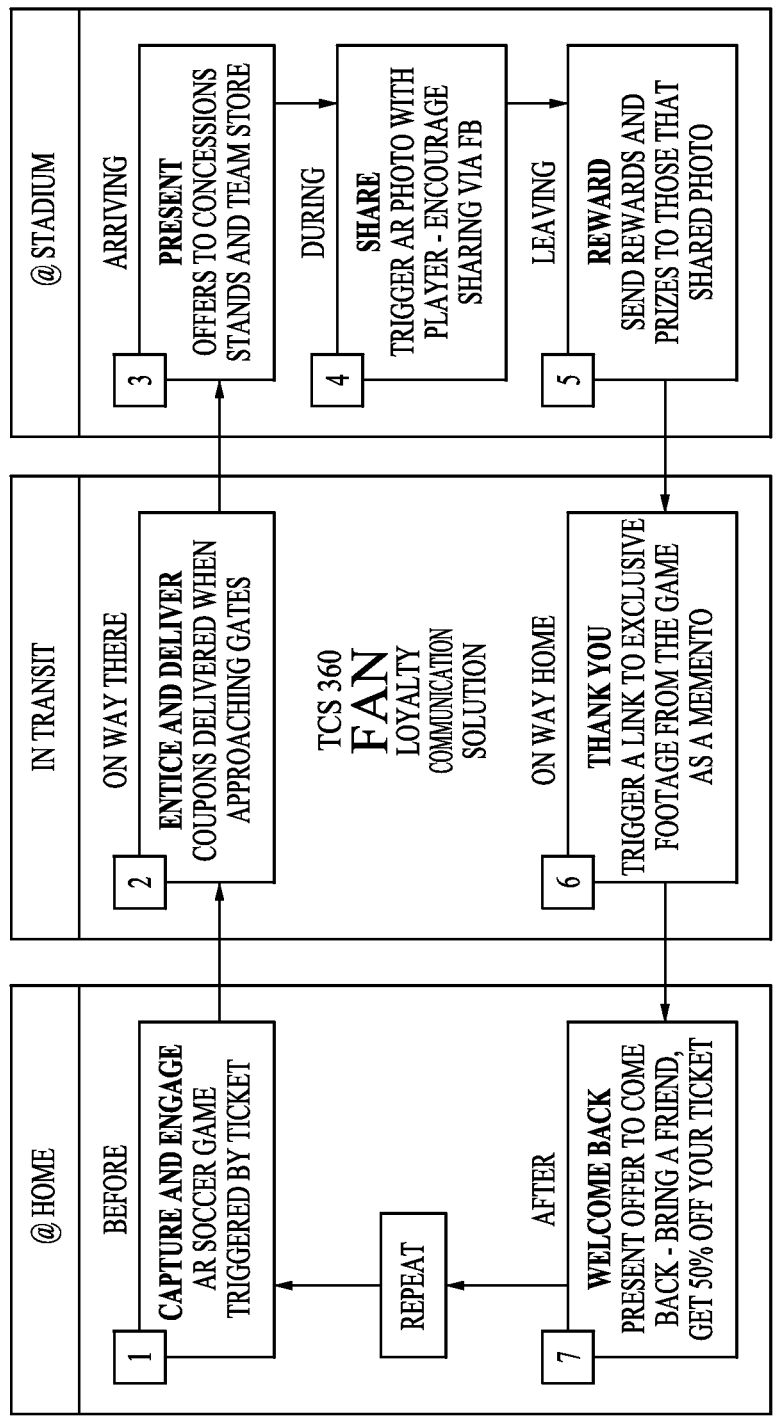
FIG. 23 provides an overview of a system embodiment adapted for use by a stadium owner or operator where the system determines the user's intent to attend an event at the stadium, verifies and records this information, then enables communication of relevant offers to the user as the user approaches the stadium on the way to the event, how the user can be engaged, encouraged to participate, entertained and rewarded for sharing the experience with others while at the stadium, then acknowledges and thanks the user for attending as the user is leaving, then rewarded, enticed and promoted to return for another future event when returning home.
Figure 24:
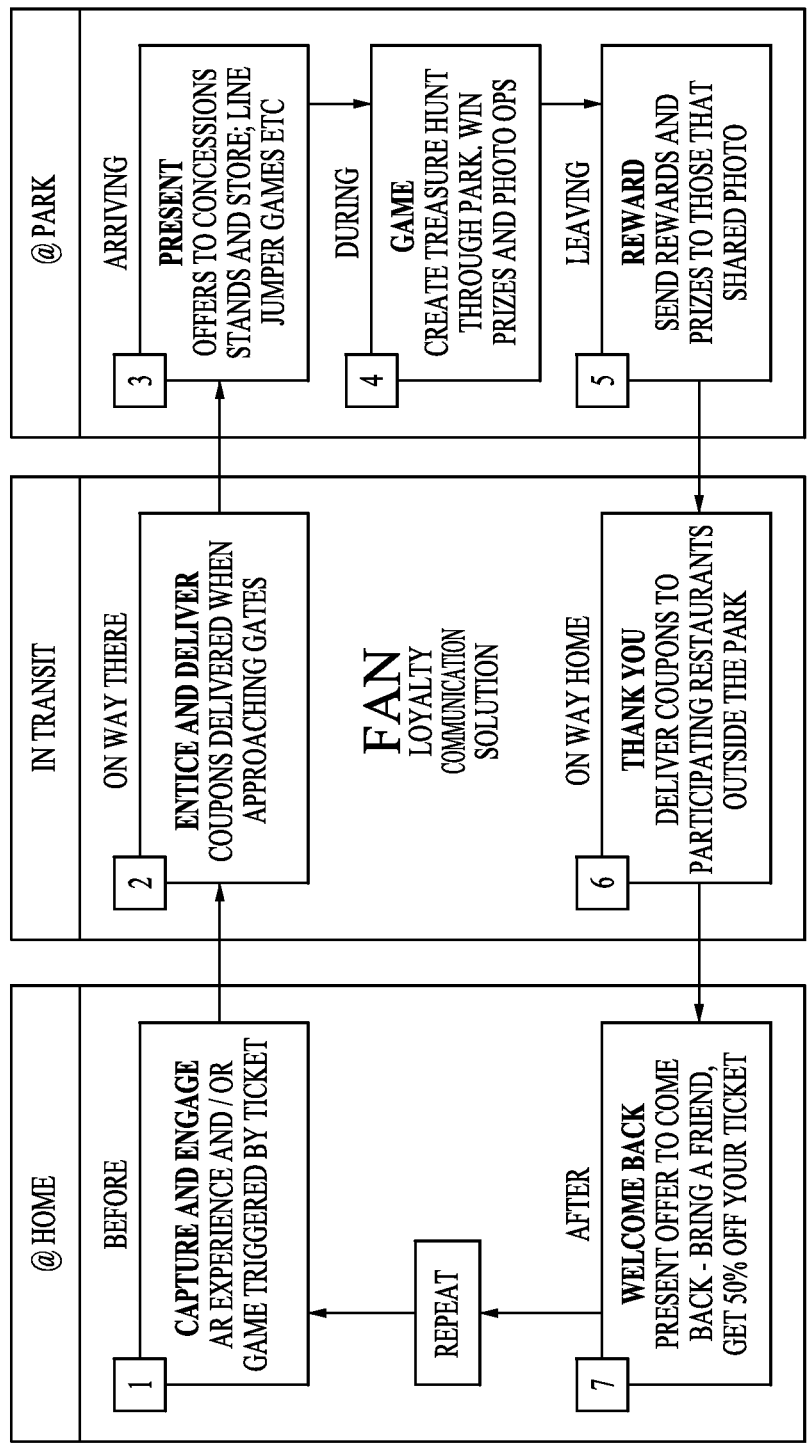
FIG. 24 provides a version of the FIG. 23 system that is customized for a theme park owner where in addition to the features in the FIG. 23 system the system is adapted to entertain visitors to the park while they are waiting in lines to go on rides, and for the park owner/operator to entice the visitors to remain in the park as long as possible by providing time enticements, such as restricted treasure hunts and scavenger hunt games.
Figure 25:
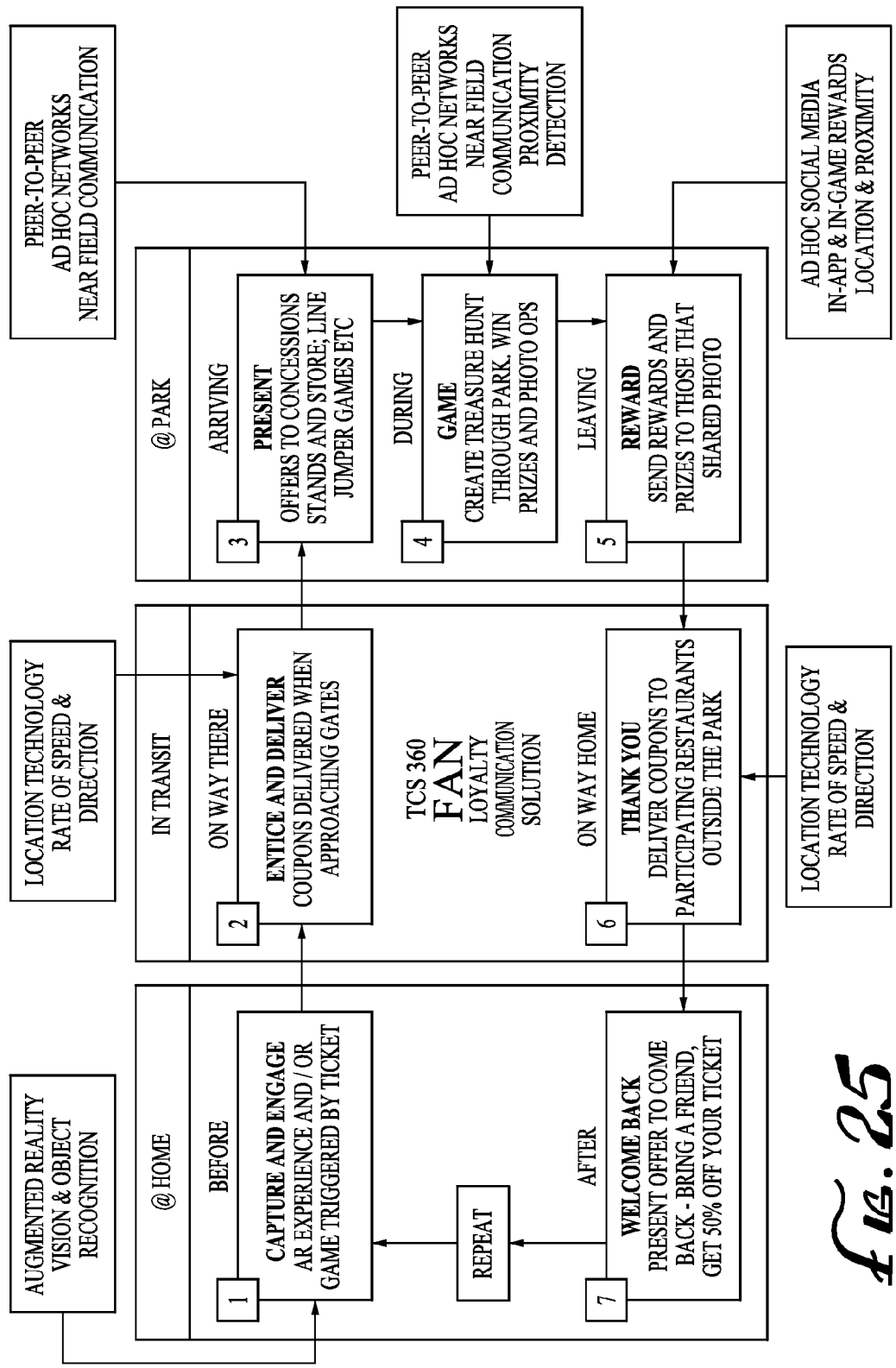
FIG. 25 shows the technologies and sensor input needed at the various stages of the FIGS. 23 and 24 embodiments.

FIG. 25 depicts the solutions described in FIG. 23 and FIG. 24 and shows the various technologies used in each aspect of the solution. FIG. 25 shows that AR and IR is used at the home to capture and verify that the user has purchased a ticket. Location and GPS coordinates are used to verify rate of speed, location and direction in FIG. 25 to determine that the user is en-route to the location. When arrived, peer-to-peer technologies and near field communication can be used to create ad-hoc networks and communication as shown in FIG. 25. These technologies can continue to create the experiences while the user is in the location as shown in FIG. 25. Ad hoc social media and network interaction with in-app and in-game rewards can be triggered by location and proximity as the user is leaving the location as shown in FIG. 25. As the user is departing the location, rate of speed, direction and dynamic locations will be used to determine that the user is in the process of leaving the location as shown in FIG. 25.

Figure 26:
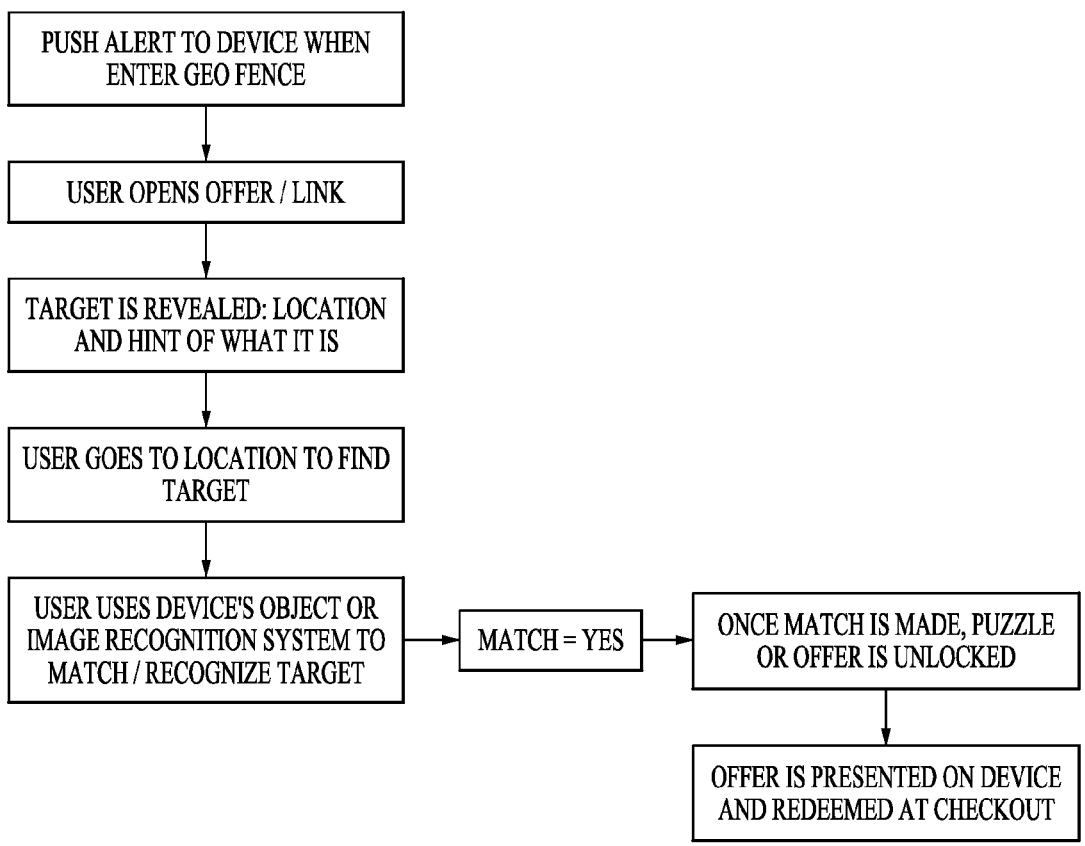
FIG. 26 is a schematic overview of an exemplary flow of actions and events that occur when a mobile device has a treasure hunt application with augmented reality and geographically located triggers, targets and puzzles.

FIG. 26 depicts the process used for a scavenger hunt game and treasure hunt game controlled by an MCRM back-end and featuring AR experiences, puzzles, clues and hints. The game starts when a user enters the initial start zone that has been established as a geo fenced area within the MCRM system. An alert is automatically sent to the mobile device as the user crosses the fence and the game is triggered and started. The user opens the link and offer that has been pushed to the device by the MCRM system. The next AR target is revealed once the user solves the puzzle, hint or quiz that is included in the offer or link. A hint or clue on where that next target may be located is presented. The user will then move towards that target. An AR compass can be superimposed on the user's mobile device as the user moves through the real world towards the next target. Once there, the user will use the camera on the user's mobile device to seek to locate the next AR target and once found, the image recognition system on the AR enabled device will recognize the target and serve up an AR overlay on the target. This can be another AR puzzle, quiz, test, hint or offer. Once this is unlocked, the user will be presented another clue, hint or direction to the next location where another AR target and its associated puzzle, quiz or hint is located. The MCRM system maps the user as the user proceeds through the physical world, and verifies that the user has been at certain locations by recording when the AR experiences has been activated as these can only be triggered by the target that is located at a specific location. The system will also measure and ensure that the targets are opened in the right sequence. Once the user has competed all the steps, solved all the puzzles, quizzes and questions, located all the AR targets and activated all the AR experiences, the user will be presented with a prize and or reward based on their ranking such as time to complete, first to complete, effectiveness, shortest route taken or other pre-determined parameters.

Figure 27:
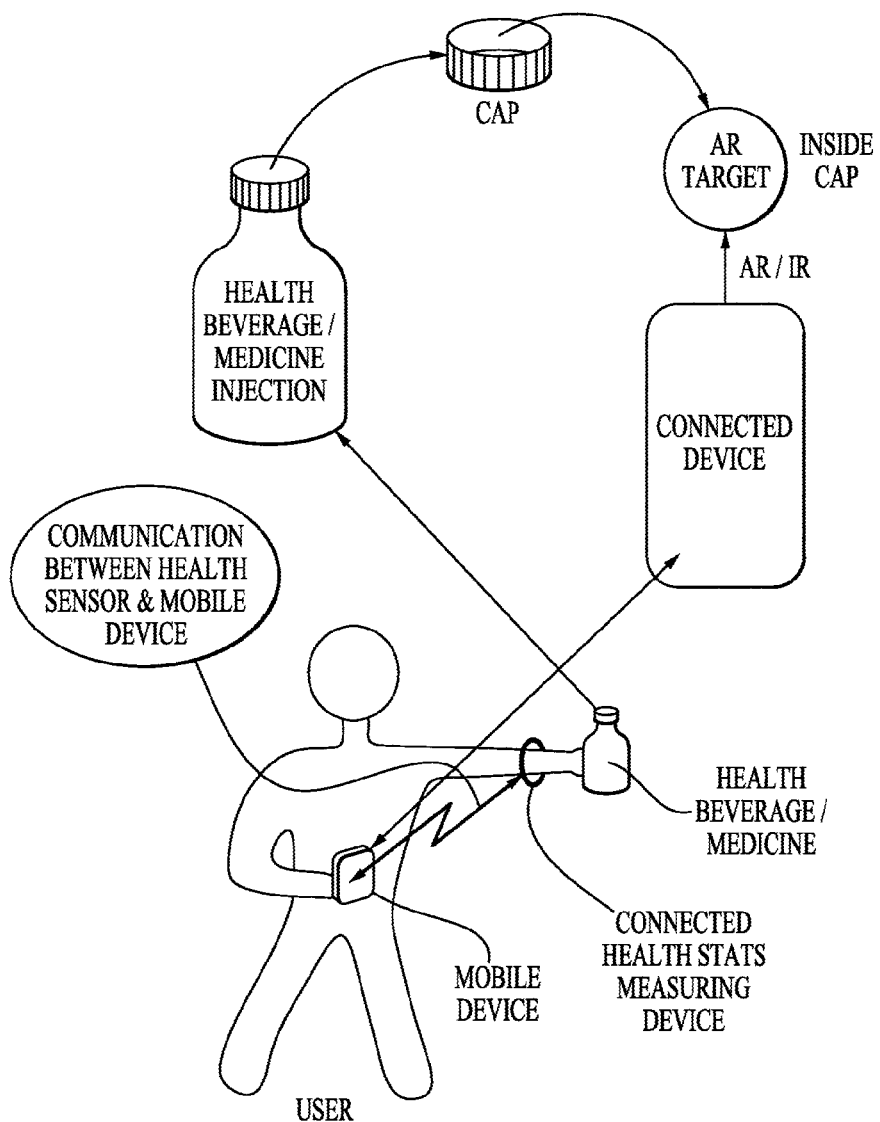
FIG. 27 is a schematic overview of an exemplary information flow for a health benefit embodiment in which a user wearing a sensor device communicates with the user's connected mobile device and the sensor device measures health and medical data, such as blood pressure, blood sugar levels, cholesterol and heart rate for example.

FIG. 27 depicts a user that is wearing a sensor device on the arm that is able to communicate with the users connected mobile device. This sensor device is envisioned to measure health and medical stats such as but not limited to blood pressure, blood sugar levels, cholesterol, heart rate and other medical stats. It is able to communicate with the mobile device through Wi-Fi, blue tooth or a combination of other communication platforms. There are numerous such devices in the marketplace and more being introduced. In the future, it is envisioned that these sensors can be embedded in clothing, shoes, Band-Aids, jewelry, accessories and dedicated devices, as well as embedded in the user's body. The user is about to consume a health related product. This can be medication, vitamins, pills, liquid, healthy juice or other consumer products that has a health benefit. Once the user is using AR to trigger an experience that is superimposed on the packaging of the health related product, the AR experience triggers the mobile device to activate the sensor system and record its first set of health data. This pre-consumption health condition is recorded by the sensor device and transmitted to the mobile device. Once the user opens the packaging of the health related product another AR target is exposed. This can be located under the lid of a juice bottle or pill bottle. Another AR experience is superimposed on that target that entertains, informs or encourages the user to consume the product. Shortly after this, the AR experience will present an activation asking the user to verify that they have consumed the product. When this is confirmed and after a preset time, the sensor is reactivated by the mobile device. Another measurement is taken and transmitted to the mobile device, recorded and stored.

Figure 28:
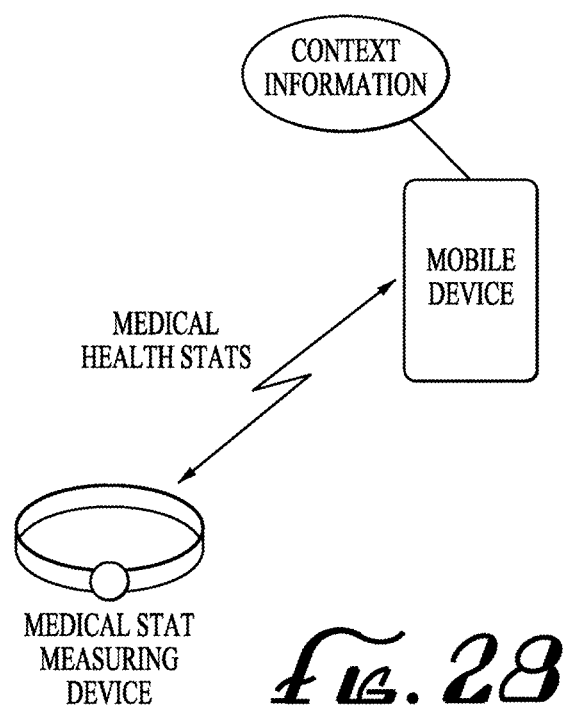
FIG. 28 provides a schematic depiction of the system adapted for use in a medical application wherein the device captures, records and transmits medical and health data, as further shown and described with respect to the FIG. 27 embodiment.

FIG. 28 depicts that as the medical sensor device is capturing, recording and transmitting medical and health data to the mobile device as described in FIG. 27, the mobile device is also capturing contextual data at the same time. This contextual data is captured, recorded and stored on the mobile device.

Figure 29:
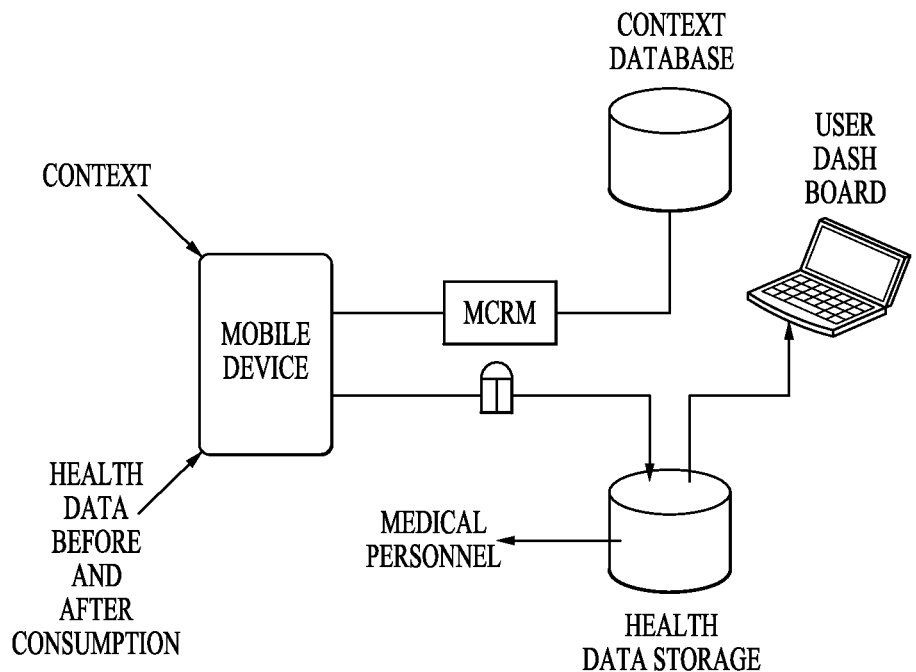
FIG. 29 is a schematic depiction of the system adapted for use to collect and process health data before and after the consumption of a health product.

FIG. 29 depicts that the mobile device collects the health data before and after the consumption of the health product and combines real time simultaneously contextual data, records and stores this information. It then transmits the health data that has been encrypted to an approved cloud based database that has been approved to contain, protect and store medical health records. The contextual data that has been gathered is transmitted to the MCRM context database. The health data records can be displayed to authorized medical and health personnel as well as to the user through other connected devices or the user's mobile device through pre-designed dashboards.

Figure 30:
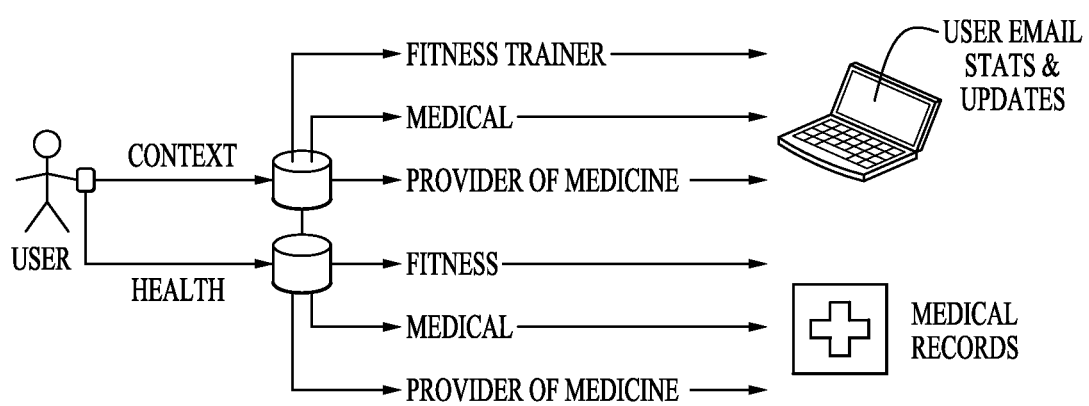
FIG. 30 is a schematic, exemplary depiction of how data collected is stored on the contextual database, may be combined and accessed by select individuals and organizations, and further used.

FIG. 30 depicts how the data collected that is stored on the contextual database can be combined and accessed by select individuals and organizations that are involved in maintaining, monitoring and improving the health of the user. These individuals and organizations may include the user's fitness trainers, their medical doctors as well as the provider and manufacturer of the product consumed. Each will have various levels of access to the contextual and matching medical data. All medical data will be maintain, stored, shared and displayed in accordance with local and global laws and regulations governing such issues at the location of the user and the location of the storage facility. By reviewing the user's context and activity as the user goes through the day, behavior and activity levels are captured, recorded and reported to the context CRM system. If the user is not active enough, is not consuming the health product, is not following health advice, is not going to the gym as prescribed, messages can automatically be sent to the user to entice, remind and encourage the user to change behavior. Conversely, rewards and encouragement can be automatically sent to the users who participate and is leading a healthy life style. The system can also be used to verify that patients are consuming the right medication, when they are doing so and in what context they are while doing so. Benefits—or lack thereof—from the consumption of the health product can also be measured, verified and recorded. Corrective actions can be performed if the desired results are not obtained. These can be behavioral or dosage related.

Figure 31:
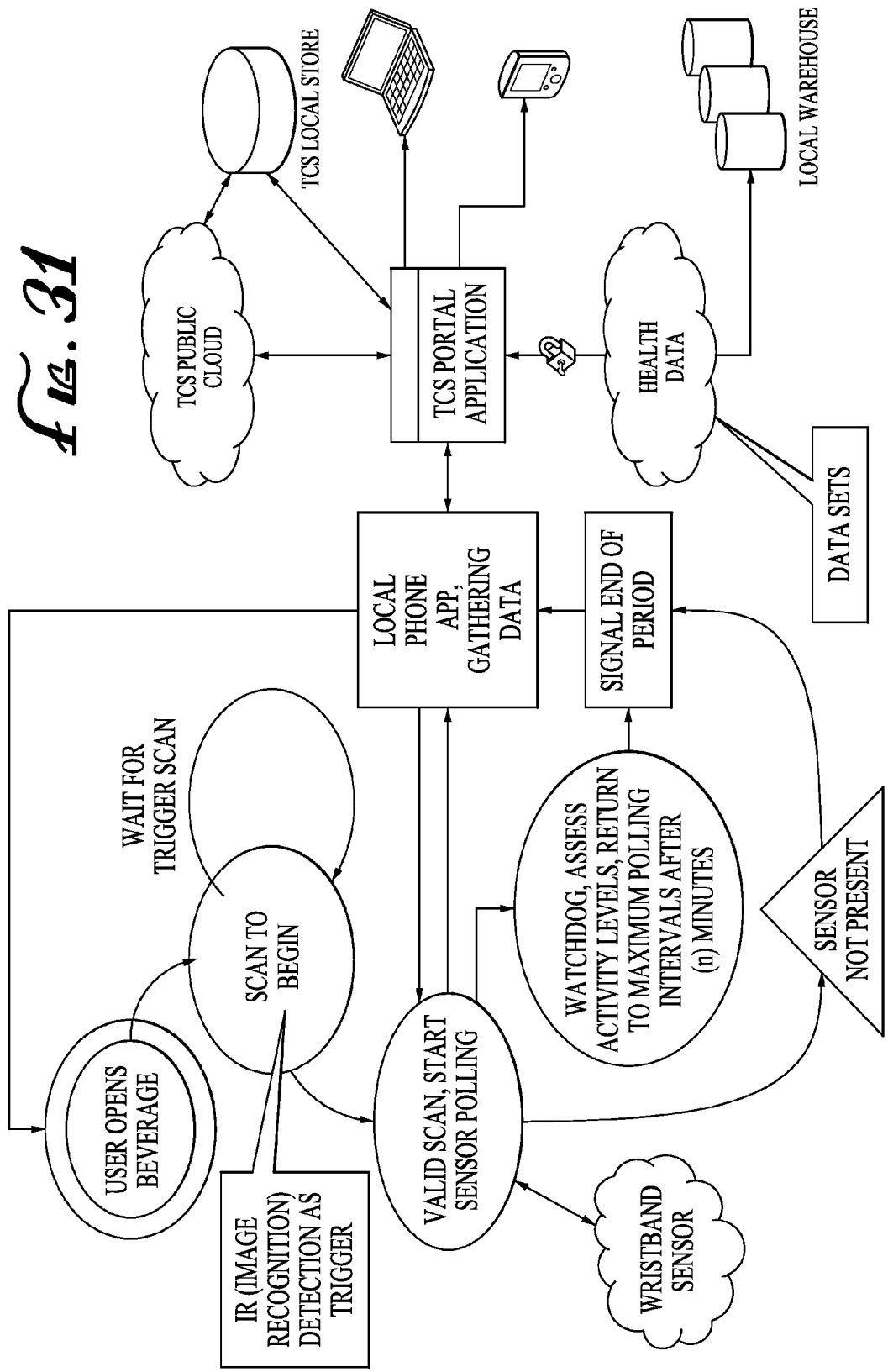
FIG. 31 is a schematic depiction overview of processing steps and information flow paths of the FIGS. 27, 28, 29 and 30 embodiments.

FIG. 31 depicts an overview of the steps and information flows described in FIGS. 27, 28, 29 and 30.

Figure 32:
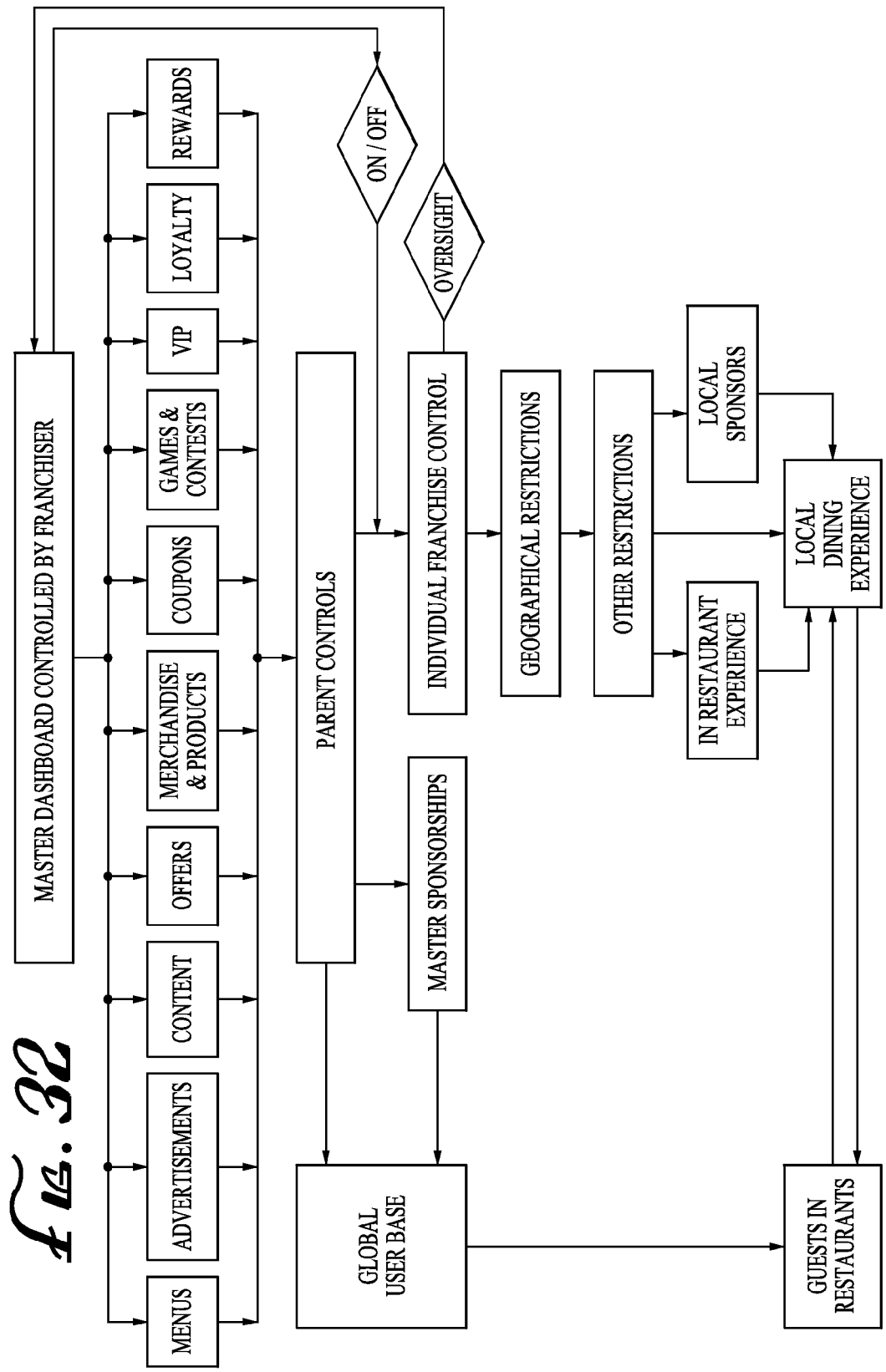
FIG. 32 is a schematic depiction of a preferred mobile customer relationship management system (MCRM) embodiment that is customized for an organization that operates a franchise business with numerous franchisees at various physical locations.

FIG. 32 depicts the mobile customer relationship management system (MCRM) customized for an organization that operates a franchise business with numerous franchisees at various physical locations. The MCRM master dashboard interface is created so that only the owner organization has access to the complete solution. This interface controls advertisements, content, offers, merchandise, coupons, games and contests, VIP offers and benefits, rewards, loyalty programs and product offerings such as menus. The corporation controls the delivery of all of these to the global universe of users of the company's enabled apps on the user's mobile devices. The company also can send master and global offers for master sponsors, such as a franchise organization of fast food restaurants can send an offer sponsored by Coca Cola to all its mobile app users. The organization will also enable its franchisees to access a sub directory of the MCRM with limited features and abilities. These will have restrictions such as only be able to deliver messages in a specific geographical area. They can deliver experiences that are targeted and only enabled inside the franchisees own restaurants. They can deliver messages and offers for local sponsors. The franchisor organization has real time overview of the activities and offers that the franchisee sends, with immediate reporting and oversight. Any unwanted, ineffective or incorrect activity can immediately be terminated via a "kill switch" feature in the system that will immediately suspend the activity and replace it with approved offers and content. The master franchise owner can also send messages and record when a user is in any of their restaurants and can communicate with those at that very moment. The users in the restaurant will therefore be able to be rewarded with an enhanced dining experience that is locally tailored as well as managed, approved and supervised by the franchise organization.

Figure 33:
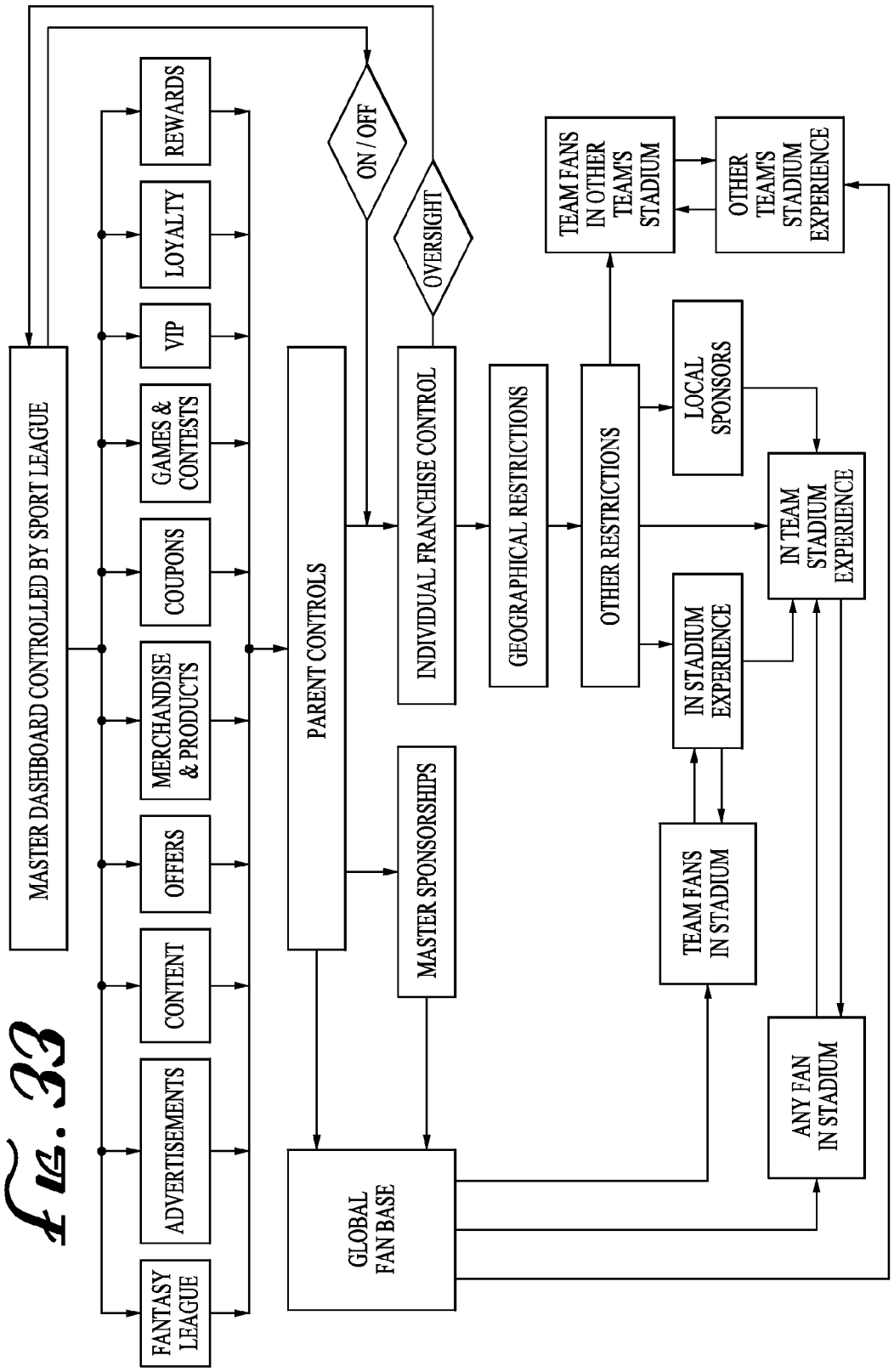
FIG. 33 is a schematic depiction of a preferred mobile customer relationship management system (MCRM) customized for a sport league that operates a franchise-like business with numerous sport team franchisees at various physical locations.
Figure 34:
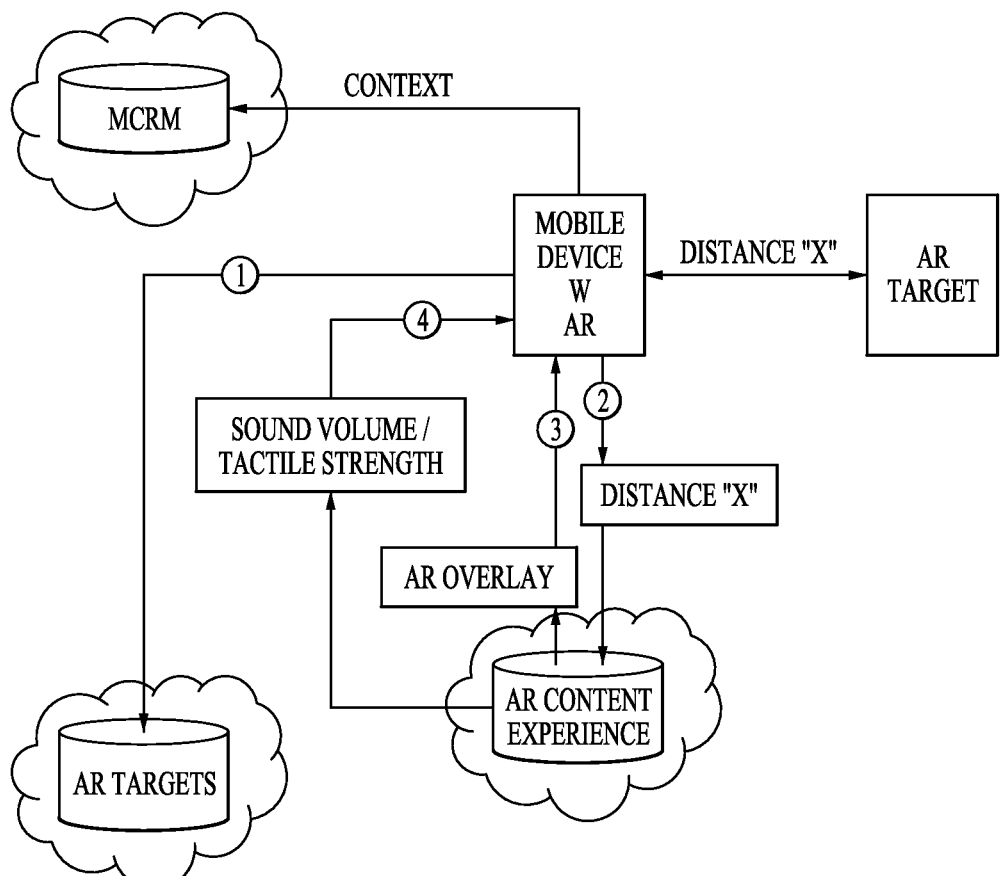
FIG. 34 is a schematic depiction of how the distance between a device that displays an AR or IR overlay and the physical target that triggers the experience can control the volume of audio included in the AR experience or the strength and intensity of any tactile feedback included in the experience.

FIG. 33 depicts the mobile customer relationship management system (MCRM) customized for a sport league that operates a franchise like business with numerous sport team franchisees at various physical locations. The MCRM master dashboard interface is created so that only the owner organization has access to the complete solution. This interface controls advertisements, content, offers, merchandise, coupons, games and contests, VIP offers and benefits, rewards, loyalty programs and product offerings such as league wide game schedules and fantasy leagues. The corporation controls the delivery of all of these to the global universe of the sport fans using the leagues enabled apps on the user's mobile devices. The league also can send master and global offers for master sponsors, such as a franchise organization such as the NFL can send an offer sponsored by Papa Johns to all its mobile app users. The organization will also enable its franchisees to access a sub directory of the MCRM with limited features and abilities. These will have restrictions such as only be able to deliver messages in a specific geographical area and to confirmed and verified fans in other cities. They can deliver experiences that are targeted and only enabled inside the team's stadiums. They can deliver messages and offers for local sponsors. The league has real time overview of the activities and offers that the teams send, with immediate reporting and oversight. Any unwanted, ineffective or incorrect activity can immediately be terminated via a "kill switch" feature in the system that will immediately suspend the activity and replace it with approved offers and content. The league can also send messages and record when a user is in any of the stadiums and can communicate with those at that very moment. The fans in the stands will therefore be able to be rewarded with an enhanced stadium experience that is locally tailored as well as managed, approved and supervised by the league. Compete stadium enhanced experiences depicted in FIG. 23, controlled and monitored using this system.

As may be appreciated from the above written description and figures the numerous systems, architectures and processes have been described and are summarized as follows:

1. Overall Architecture of Contextually intelligent communication platform.

2. Personal communication hub.

3. Data collected by devices and sensors in an area surrounding the user, captured by and on a communication device.

4. Collecting contextual data and replaying the data later.

5. Using distance between an AR target and the device overlaying the AR experience as a means to control the volume of sound and the level of other feedback system.

6. Using AR and IR as a means to detect, verify and capture a user's context.

7. Using AR and IR as a means to detect, verify and record the effectiveness of advertising.

8. Using AR and IR for location based scavenger and treasure hunts.

9. Using AR and IR for location based scavenger and treasure hunts with puzzles and quizzes.

10. Using AR and IR for location based scavenger and treasure hunts with puzzles and quizzes that unlocks coupons and offers when completed.

11. Sharing a user's context using social networks.

12. AR targets that are discovered and made available to select user.

13. Sensing and monitoring context for law enforcement and military where detectable events such as gunshot triggers an alarm while capturing the user's real-time context.

14. Using AR and IR as a means to detect, verify and record what the user is watching on TV.

15. Using AR and IR as a means to detect, verify and record what the user is watching on TV, record and verify the user's context at that moment.

16. Using AR and IR as a means to detect, verify and record what the user is watching on TV, record and verify the user's context at that moment, then present additional information that is relevant to what is on the TV directly to the user's mobile device.

17. Using AR and IR as a means to detect, verify and record what the user is watching on TV, record and verify the user's context at that moment, then offer alternative and/or relevant content and present this directly to the user's mobile device.

18. Using aspects of merchandise such as product labels and hang tags as virtual displays via AR overlays enabling the designer, manufacturer or owner of the product to present, demonstrate, showcase, explain and market the product directly to an end user's mobile device.

19. Means of using location as a trigger for communication between a mobile device and a retailer's POS systems via cloud or peer to peer communication.

20. Means of using location as a trigger for communication between a mobile device and a retailer's POS systems via cloud or peer to peer communication to initiate a mobile payment transaction.

21. Using proximity based and peer-to-peer communication to initiate and enable location specific game play between user's mobile devices while in a specific location.

22. Using proximity based and peer-to-peer communication to initiate and enable location specific game play between user's mobile devices while in a specific location and rewarding the winner with a location specific prize or benefit.

23. The use of images and targets that triggers dynamic, interactive and personalized directional signs and guidance in AR enabling navigation.

24. Development of specific fonts, images and signs that are efficiently recognized by IR and can be interpreted to create dynamic and personalized AR experiences.

25. Method to customize and personalize static print, products, images using AR and MCRM.

26. Sensor network worn by participants of sporting events used to re-create the game experience to viewers of the game.

27. G-force and impact sensor, strap connector sensor and communication device on sporting helmets to measure impact and warn if strap is not on or when impacts have exceeded acceptable levels.

28. Method for re-creating real life sport events in AR representation of the game.

29. AR use for corporate promotions and message delivery.

30. 3-D AR representation of complex organizational charts.

31. Capturing context to enable communication between devices in the proximity to each other.

32. Method of communication between a sport franchise team and its fans before, during and after a sporting event to enhance the fan experience and secure fan loyalty.

33. Method of communication between a retailer and its customers before, during and after the customer comes to the retailer's location to enhance the shopping experience and establish loyalty and frequent purchases.

34. Game play on mobile devices in specific locations such as stadiums with results replayed and displayed on large in stadium monitors.

35. Using location and proximity to deliver exclusive content to a mobile device that is in a specific location.

36. Using AR to create virtual photos and rewarding the users who share these on social networks.

37. Using peer-to-peer communication to present a restaurant's interactive menus to mobile devices that are in proximity to the restaurant.

38. Using peer-to-peer communication to present a restaurant's interactive menus to mobile devices that are in proximity to the restaurant, enabling the mobile device to place the order and pay for the order, communication with the restaurant's order taking system via peer to peer, mobile network, near field communication or Wi-Fi.

39. Using AR to present a story that is initiated off an advertisement, continue the story triggered by AR targets inside a retailer and completing the story off AR triggers inside the product.

40. Using AR to tag items and merchandise on a user's virtual wish list.

41. Using AR to identify items and merchandise that is on a different user's virtual wish list.

42. Using AR and mobile devices ability to detect location to verify that an advertisement has succeeded in presenting a viewer of the advertisement to the location that was in the advertisement.

43. Using AR and scavenger hunt games for crowd control and management.

44. UI: AR half mode—superimposing a virtual game on top of the real world without the use of markers.

45. UI: AR search mode—display a transparent representation of the target, once a match has been found, create "lock-on" animation.

46. UI: AR porting mode—once a target has been found, the AR experience is initiated, and then when the target is lost, the AR game is ported upon the device and continues until the target is re-connected.

47. AR Posters; printed posters that are personalized for users via AR experiences.

48. AR Posters; printed posters that feature call to action, buy now and information such as locations of theaters nearby showing a movie, the times of the showing, movie trailer and the ability to purchase tickets.

49. AR trading cards; avatars are superimposed in AR with characteristic and features based on dynamic data such as NFL player's real life stats.

50. AR targets; using a frame to create an AR experience that is superimposed upon a user's drawn representation of the AR.

51. AR education; using AR 3-d puzzles to educate and teach.

52. AR education; using AR 3-d puzzles to educate and teach, record progress, report results to teacher and caregiver.

53. AR social games; using one target as the trigger for a game played by users in proximity to each other.

54. AR books; enhancing books with AR such as 3D games, puzzles, quizzes and tests, recording the interactions, rewarding for success.

55. AR weather forecast; using static weather page in newspapers to present AR overlay that is hyper local for the user's current location.

56. AR dynamic print; using AR to update and present dynamically personalize content on printed materials.

57. AR dynamic catalogs; using AR generated avatars as guides and personalized.

shopping assistants in catalogs, with buying recommendations, wish lists and retailer interaction.

58. AR communication channel; the use of printed material such as ads, markers on clothing, product packaging to present dynamic and personalized content, offers, entertainment and information.

59. AR maps; use of traditional maps with AR enhancements to showcase locations.

60. AR interactive maps; use of traditional maps with interactive dynamic and personalized AR content including directional overlays, "you are here" pin points and highlights along the selected route with the map ported on the device when tracking is lost.

61. Contextual check-in: once a user enters a context where there is a check-in required, this is performed automatically.

62. AR for indoor navigation; use of AR targets enables dynamic interactive and personalized navigation.

63. Personal communication hub; central hub that collect information from various sensor systems and displays information on a selection of connected display devices.

64. Personal communication hub; central hub that collect information from various sensor systems and stores information on a cloud based server.

65. Digital signs; display signs presents digital personalized content that is appropriate for users that are close by.

66. Contextual search; the method to search for physical location that has the desired context.

67. Health; Use of AR, IR and contextual awareness to measure, track and verify the consumption of health and medical related products.

68. Health; Use of AR, IR and contextual awareness and sensors worn by the user to measure, track and verify the consumption of health and medical related products and their effect on the user.

69. Health; Use of AR, IR and contextual awareness to measure, track and verify the consumption of health and medical related products and verify the behavior of the user while offering advice, recommendations and reminders about behaviors that are beneficial to the user.

70. Health; Use of AR, IR and contextual awareness to measure, track and verify the consumption of health and medical related products and verify the behavior of the user while offering advice, recommendations and reminders about behaviors that are beneficial to the user storing all health related information on compliant servers.

71. Context replay; the ability to record a user's actions, activities and context during a time period for replay and review at a later time.

72. Contextual AR; the ability to superimpose context upon digital avatars that replay the context in AR.

73. Hyper Location; the use of known sensor systems in a known environment to define, verify and report a specific location.

74. Hyper Location; the use of known sensor systems in a known environment such as a motor vehicle to define, verify and report a specific location inside the vehicle such as driver seat 75. Sharing of Contextual information; the ability to share the context a user is currently in or was in at a given moment of time when the context was recorded.

76. AR overlay of environments; interiors and locations that are enhanced by AR that can be same for all, or customized and personalized to adapt to specific user as they enter the environment.

77. AR enhancement of events and performances; use of AR targets in live and recorded performances.

78. Location based and contextually restrictive features on mobile phones; betting and wagers at specific locations by authorized users.

79. Location based and contextually dependent rewards; based on location, context and the user's sharing of this information, presentation of offers, rewards and loyalty benefits and privileges that are relevant to the location and context based on the user's promotion of the experience through social networks.

80. Context recording; the future use of context recording and replay in specific environments.

81. Context alerts; method for defining context where the user of a mobile device notify that the user does not want to be interrupted.

82. Contextually enhanced 3D video recording and replay; by capturing the context of a user created 3D video, the replay of said 3D video in a contextual replay environment will include the context that was captured while recording.

83. Use of a contextually intelligent mobile marketing system for fund raising efforts.

84. Contextual Intelligence; method for developing.

85. Contextual Wisdom; method for developing.

86. Master system for a franchisor to manage communication with its end customers while enabling individual franchisees to communicate with customers in their geographical area and locations under the oversight and control of the master franchisor.

87. Master system for a sports league to manage communication with its fans of the sports league while enabling individual teams to communicate with their fans in their geographical area and locations as well as team fans in other areas under the oversight and control of the master sport league owner.

What is claimed is:

1. A computer-implemented process for providing predictably useful, contextually intelligent information to a first user as said first user moves from a first user current context to a first user new context comprising:
    providing a first user mobile communication device;
    associating said device with a first user;
    providing a server that is in communication with said device;
    providing a relationship management system that resides in said server and populating said relationship management system with historical demographic data for said first user;
    providing sensor input data from said first user mobile communication device to said server when said first user is in said first user current context;
    said sensor input data including:
        data corresponding to a current location of said first user mobile communication device and at least data corresponding to one or more of the group consisting of:
            current activity of said first user, mental state of said first user, physical state of said first user, mode of travel of said first user, direction of travel of said first user, speed of travel of said first user, level of engagement of said first user in said first user current context, surrounding environment of said first user in said first user current context, identity of one or more persons in addition to said first user and who are nearby said first user in said first user current context, identity of at least one mobile device other than said first user mobile communication device and that is nearby said first user mobile communication device in said first user current context;
    providing said sensor input data from said first user mobile communication device to create acquired first user current data;
    capturing, by said first user mobile communication device through an image recognition application, real-time image data to create first user captured real-time image data for said first user current context;
    generating first user current contextual data for said first user from said acquired first user current data and from said first user captured real-time image data for said first user current context;
    gathering said first user current contextual data to create said first user current contextual data corresponding to said first user's current context;
    uploading said first user current contextual data corresponding to said first user's current context via a wide area mobile communication network to said server;
    matching said first user current contextual data corresponding to said first user's current context with said first user historical, demographic and environmental data;
    combining and processing in the relationship management system the first user current contextual data, current environmental data and historical demographic data to define a message relevant to the first user while the first user is in the current context;
    generating feedback data for said first user that is contextually relevant to said first user's current context and that is predictably useful to said first user as said first user enters a said new context to form first user useful feedback data; and,
    transmitting to and displaying on said first user mobile communication device said first user useful feedback data to provide said contextually intelligent mobile information.

2. The process of claim 1 wherein said first user current contextual data and said feedback data are communicated between said first user mobile communication device and said server.

3. The process of claim 1 further comprising:
    providing at least one additional mobile communication device;
    associating each additional mobile communication devices with an additional user; and,
    wherein each additional mobile communication device is able to communicate with each other additional mobile communication device, with said first user mobile communication device and with said server.

4. The process of claim 1 further comprising:
    providing mobile communication equipment;
    providing at least one additional mobile communication device;
    associating each additional mobile communication devices with an additional user; and,
    wherein each additional mobile communication devices is able to communicate with each other additional mobile communication device; with said first user mobile communication device, with said mobile communication equipment and with said server.

5. The process of claim 1 further creating a sphere of influence context bubble for n+1 users, where n is an integer, by:
    providing an additional mobile communication device for each of n additional users, each additional user having a current context;
    associating each said additional mobile communication device with each corresponding one of said n additional users;
    generating current contextual data for each one of said n additional users by;
        populating said relationship management system with historical and demographic data for each one of said n additional users;
        providing sensor input data from each of said n additional user's mobile communication device to said server for each of said n additional user when said n additional user's communication device is in proximity to said first user's mobile communication device;
        said sensor input data including:
            data corresponding to a current location of each one of said n additional user mobile communication devices and at least data corresponding to one or more of the group consisting of:

current activity of each one of said n additional users, mental state of each one of said n additional users, physical state of each one of said n additional users, mode of travel of each one of said n additional users, direction of travel of each one of said n additional users, speed of travel of each one of said n additional users, level of engagement of each one of said n additional users in said first user current context, surrounding environment of each one of said n additional users in said first user current context, identity of one or more persons in addition to said first user and who are nearby said first user in said first user current context, identity of at least one mobile device other than said first user mobile communication device and that is nearby said first user mobile communication device in said first user current context;

providing sensor input data from each one of said n additional mobile communication devices to create acquired user current data for each one of said additional users;

capturing, by each of said n additional user mobile communication devices through an image recognition application, real-time image data to create n additional user captured real-time image data for each one of said n additional user's current context;

generating for each of said n additional users current contextual data from said acquired n additional user current data and from said n additional user captured real-time image data for each one of said n additional user's current context;

gathering said current contextual data for each of said n additional users to create for each of said additional user's current contextual data corresponding to each of said n additional user's current context;

uploading said n additional user's current contextual data corresponding to each of said n additional user's current context via a wide area mobile communication network to said server;

establishing communication among said first user mobile communication device, said server and any of said n additional mobile communication devices when said first user mobile communication device is in proximity to any of said n additional communication devices.

6. The process of claim 1 further comprising:
creating a sphere of influence context bubble for n+1 users, where n is an integer, by:
providing n additional mobile communication devices for n additional users, each additional user having a current context;
associating each of said n additional mobile communication devices with at least one of the n additional users;
generating current contextual data for each one of the n additional users; and,
establishing communication among any of said n+1 user mobile communication devices, said server and any of said n additional mobile communication devices when any of said n+1 communication devices is in proximity to any other of said n+1 communication devices.

7. The process of claim 1 further comprising:
providing m current context input devices, where m is an integer, said m current context input devices comprise any of the following types of devices:
augmented reality glasses;
augmented reality displays;
interactive displays;
vending machines with interactive displays;
fixtures and product displays that incorporate interactive and connected devices that include image recognition capability;
headphones;
sensors that transmit real-time sounds;
sensors that transmit real-time images;
sensors that transmit current data about the physical condition of the first user; and,
devices that provide any of the first user's acquired first user current data.

8. The process of claim 1 wherein the first user mobile communication device comprises any of a smart phone, a tablet, augmented reality glasses, contact lenses, personal communication hubs, connected clothing, connected jewelry, connected shoes, connected accessories and any embedded communication device.

9. The process of claim 1 wherein the first user mobile communication device includes a sensor that comprises any device capable of sensing and providing to the first user mobile communication device data representative of any of a location, a time, an activity, a speed of travel, a direction of travel, an anxiety level, a social media status, a gender, a relationship status, an ambient sound, an ambient light level, an air quality or other environmental aspect in proximity to the first user.

10. The process of claim 1 wherein the first user mobile communication device includes a sensor that comprises any device capable of image recognition and of providing to the first user mobile communication device data representative of the image recognized.

11. The process of claim 1 wherein the first user mobile communication device includes a sensor that comprises an image recognition system capable of capturing and providing to the first user communication device data representative of any of a product, image, ad, video, TV broadcast, billboard, poster, and other display with which the first user is interacting.

12. The process of claim 1 wherein the first user mobile communication device includes a sensor comprises any device capable of providing augmented reality data to the first user mobile communication device.

13. The process of claim 1 wherein said contextual data comprises data representative of any of activity, location, mental state, physical state, mode direction of travel, speed of travel and level of engagement of the first user in an activity.

14. The process of claim 1 wherein said contextual data comprises data representative of any of the first user's surrounding environment, a nearby other person's surrounding environment and a nearby other mobile device's surrounding environment.

15. The process of claim 14 wherein said nearby other mobile device comprises any of other connected devices, equipment, vehicles, tools, computers, displays, point of sale systems, ticketing systems, inventory systems, video and audio capture sensors, ball(s), object and other tracking systems and other sensor system(s), devices and equipment that have capability to communicate via a wide area network or any other methodology directly to one or more end users through a back-end cloud based network connected to a cellular or WiFi network or any future method of communication capable of such communication.

16. The process of claim 1 further comprising updating said first user's current contextual data and said first user's environmental data as the first user enters said new context, and so on as the first user continues to move from said new context to another context.

17. The process of claim 1
wherein said relationship management system further includes content comprising any of offers, videos, audio files, augmentations, 3D models, games, coupons and advice.

18. The process of claim 1 wherein said message comprises any of feedback information, experiences, recommendations, offers, coupons, advice, tactile feedback, visual and audio representations, augmented and audio/visual displays.

* * * * *